US011117743B2

(12) United States Patent
MacDonald et al.

(10) Patent No.: US 11,117,743 B2
(45) Date of Patent: Sep. 14, 2021

(54) STORAGE AND RETRIEVAL SYSTEM

(71) Applicant: Symbotic, LLC, Wilmington, MA (US)

(72) Inventors: Edward A MacDonald, Somerville, MA (US); Forrest Buzan, Dunstable, MA (US); John F. Keating, Billerica, MA (US); Juergen D. Conrad, York, PA (US); Armin Ataei-Esfahani, Medford, MA (US)

(73) Assignee: Symbotic LLC, Wilmington, MA (US)

( * ) Notice: Subject to any disclaimer, the term of this patent is extended or adjusted under 35 U.S.C. 154(b) by 55 days.

(21) Appl. No.: 16/144,668

(22) Filed: Sep. 27, 2018

(65) Prior Publication Data
US 2019/0092570 A1  Mar. 28, 2019

Related U.S. Application Data

(60) Provisional application No. 62/564,568, filed on Sep. 28, 2017.

(51) Int. Cl.
*B65G 1/04* (2006.01)
*B65G 1/137* (2006.01)
(Continued)

(52) U.S. Cl.
CPC ......... *B65G 1/0492* (2013.01); *B65G 1/1373* (2013.01); *G05D 1/0217* (2013.01);
(Continued)

(58) Field of Classification Search
CPC .... B65G 1/0492; B65G 1/1373; B65G 1/065; G05D 1/0217; G05D 1/0234;
(Continued)

(56) References Cited

U.S. PATENT DOCUMENTS 5,002,145 A   3/1991  Wakaumi et al.
5,456,332 A  10/1995  Borenstein
(Continued)

FOREIGN PATENT DOCUMENTS

JP        0231210       2/1990

OTHER PUBLICATIONS

Tamba, Tua et al (2009), A Path Following Control of an Unmanned Autonomous Forklift, International Journal of Control, Automation, and Systems, 113-122.
(Continued)

*Primary Examiner* — Michael Collins
(74) *Attorney, Agent, or Firm* — Perman & Green, LLP

(57) ABSTRACT

A storage array system including an open undeterministic transport surface, a navigation array disposed in connection with the transport surface, the navigation array includes a distributed feature, a first waypoint at a first position of the distributed feature, a second waypoint displaced from the first waypoint along the distributed feature and offset with respect to the first waypoint in a direction angled to the distributed feature, and a guided bot, arranged to traverse the transport surface, with a non-holonomic steering system, the guided bot having a bot pose determination system employing sensor data detecting the distributed feature, wherein the guided bot includes a controller configured to generate a substantially smooth curved bot traverse path on the transport surface connecting the first and second waypoints with a predetermined optimal trajectory of the guided bot along the traverse path determined based on a bot dynamic model.

30 Claims, 27 Drawing Sheets

(51) Int. Cl.
*G06N 7/00* (2006.01)
*G05D 1/02* (2020.01)
*G06Q 10/08* (2012.01)
*B65G 1/06* (2006.01)

(52) U.S. Cl.
CPC ......... *G05D 1/0234* (2013.01); *G05D 1/0297* (2013.01); *G06N 7/00* (2013.01); *G06Q 10/087* (2013.01); *B65G 1/065* (2013.01); *G05D 2201/0216* (2013.01)

(58) Field of Classification Search
CPC ......... G05D 1/0297; G05D 2201/0216; G06N 7/00; G06Q 10/087
USPC .................................................. 700/213–230
See application file for complete search history.

(56) References Cited

U.S. PATENT DOCUMENTS

| | | | |
|---|---|---|---|
| 8,224,525 | B1 | 7/2012 | Rapoport et al. |
| 8,229,595 | B2 | 7/2012 | Seelinger et al. |
| 8,589,012 | B2 | 11/2013 | Wong et al. |
| 9,884,719 | B2 * | 2/2018 | Pankratov ............ B65G 1/1378 |
| 10,207,595 | B2 * | 2/2019 | Sullivan ............... B65G 1/0492 |
| 10,589,931 | B2 * | 3/2020 | Jarvis ................... G01C 21/206 |
| 10,683,171 | B2 * | 6/2020 | Jarvis ................... B65G 1/0492 |
| 2013/0204430 | A1 * | 8/2013 | Davey ................. B65G 1/1373 700/216 |
| 2015/0073589 | A1 * | 3/2015 | Khodl ................. B65G 1/1378 700/218 |
| 2016/0167880 | A1 | 6/2016 | Pankratov et al. |
| 2016/0185526 | A1 * | 6/2016 | Lert ..................... B65G 1/1373 414/273 |

OTHER PUBLICATIONS

Tamba, Tua et al (2008), Trajectory Generation of an Unmanned Forklift for Autonomous Operation in Material Handling System, SICE Annual Conference 2008, Aug. 20-22, 2018, 1800-1805.
International Search Report, International Application No. PCT/US2018/053307 dated Feb. 2, 2019.

* cited by examiner

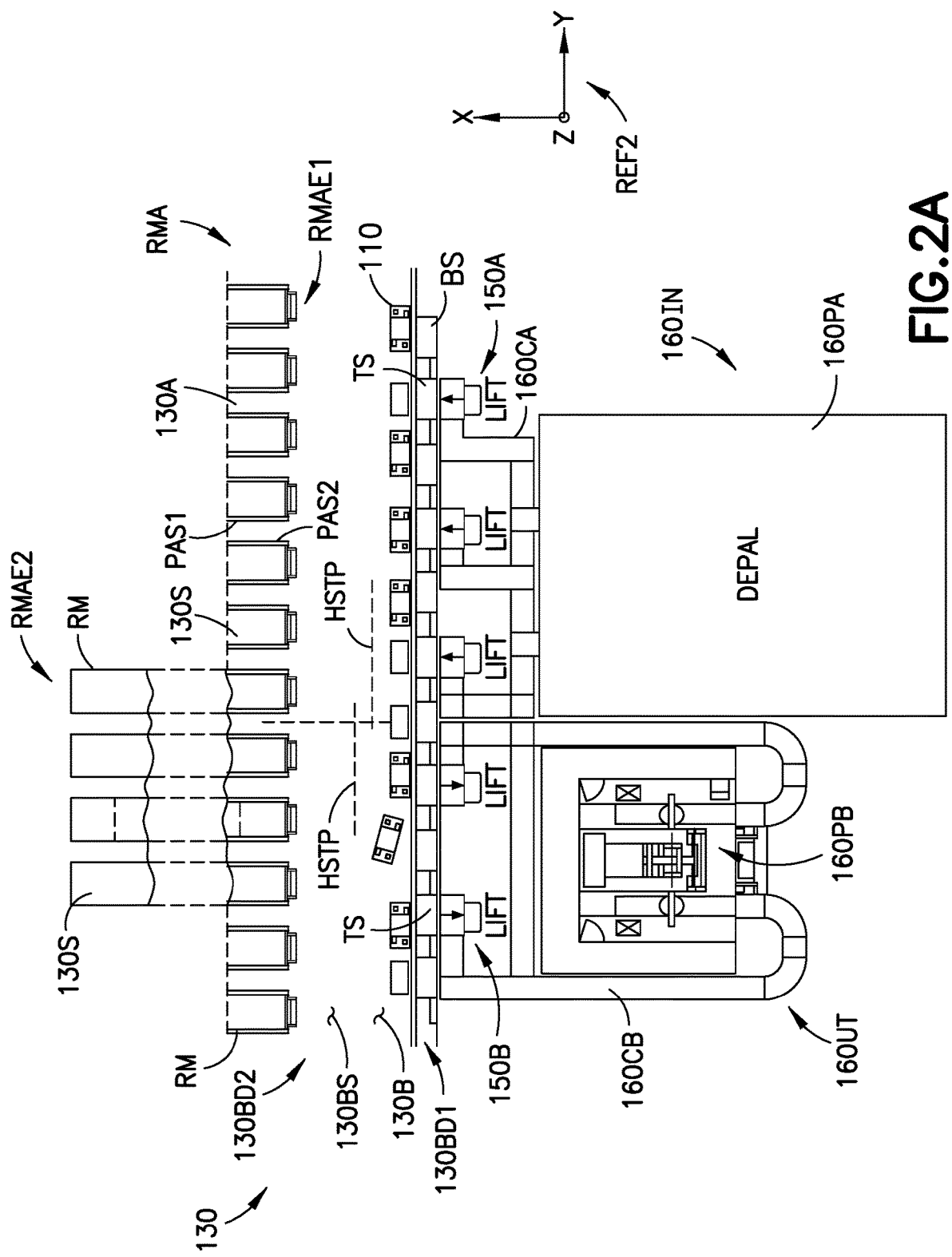

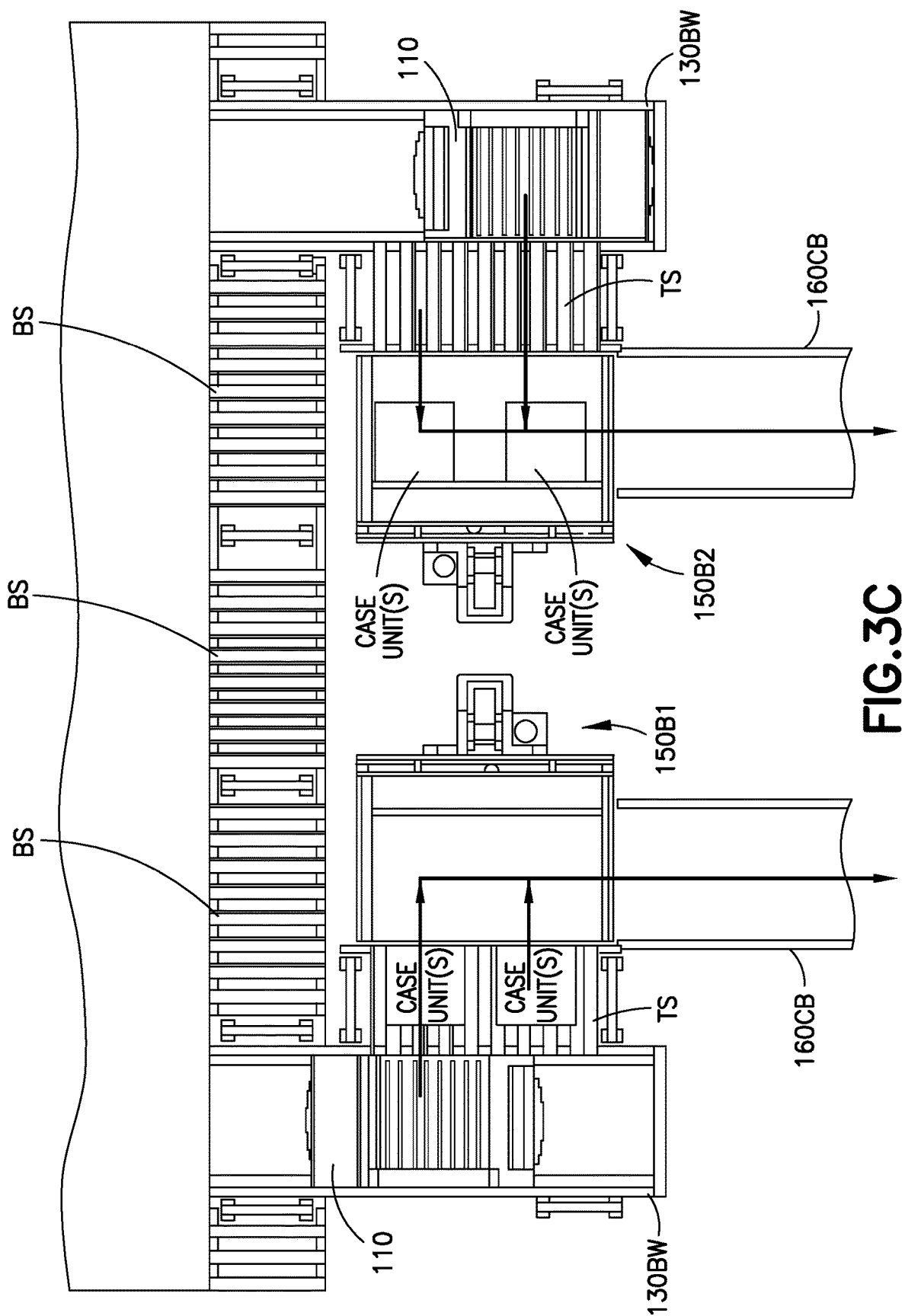

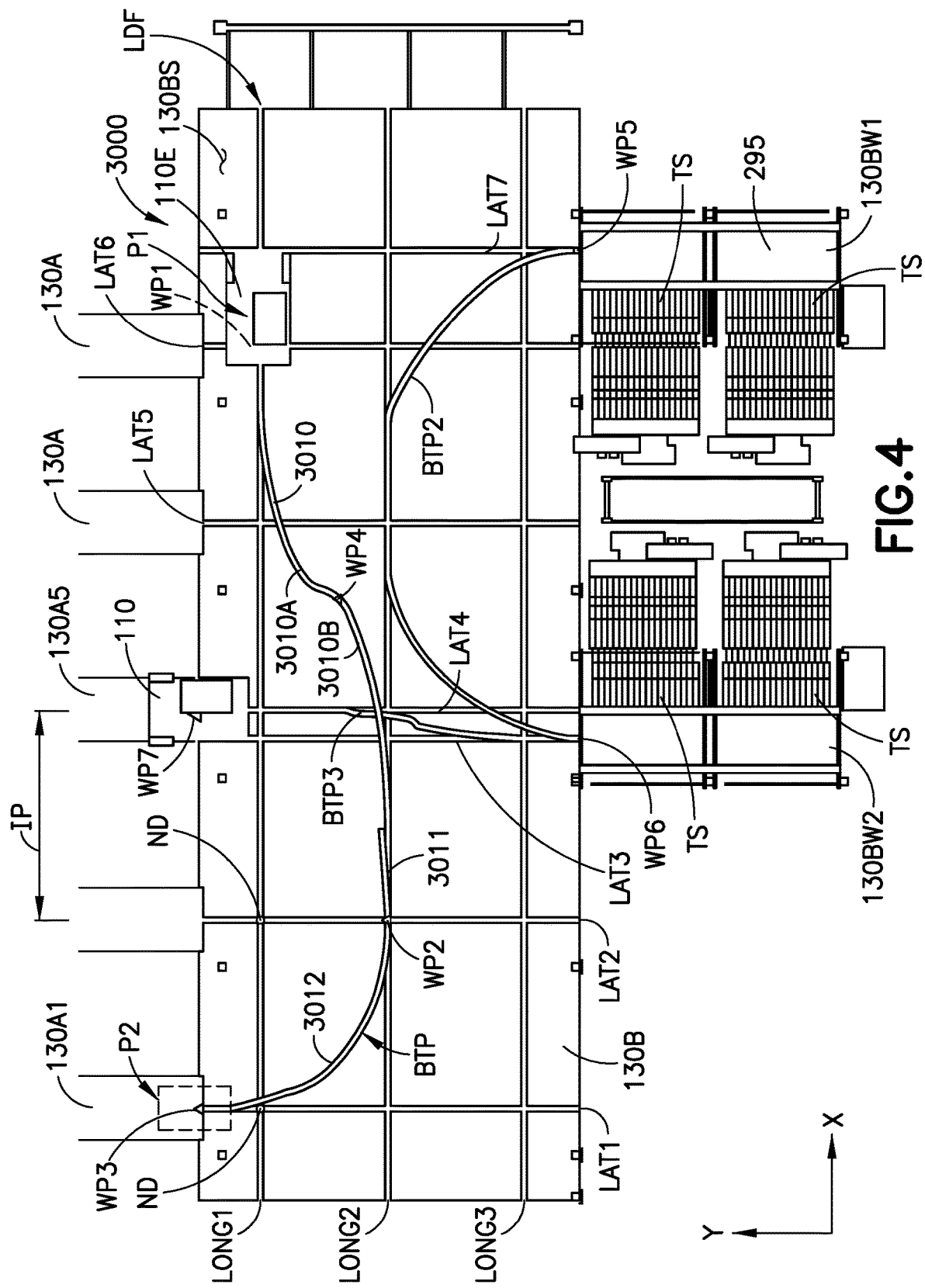

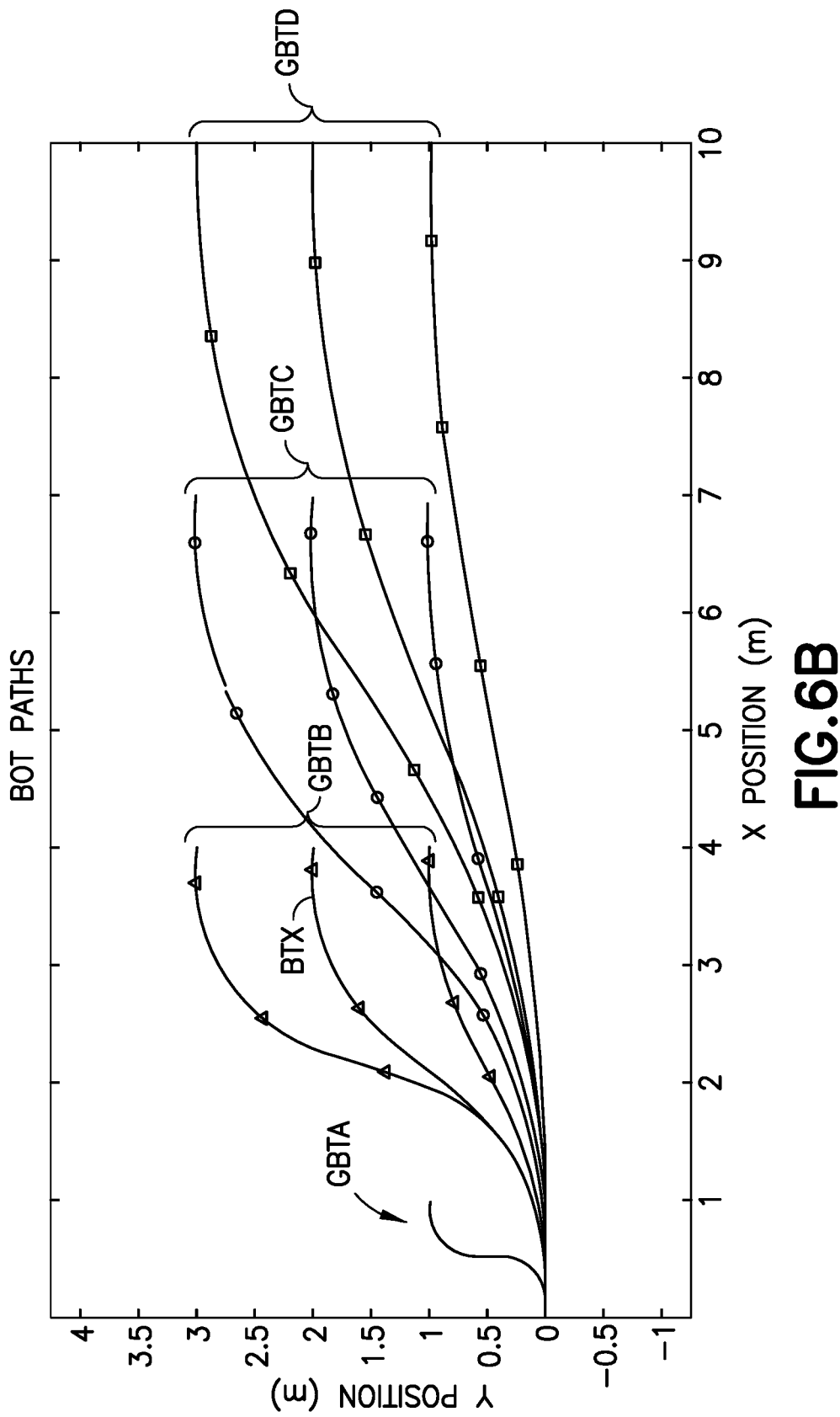

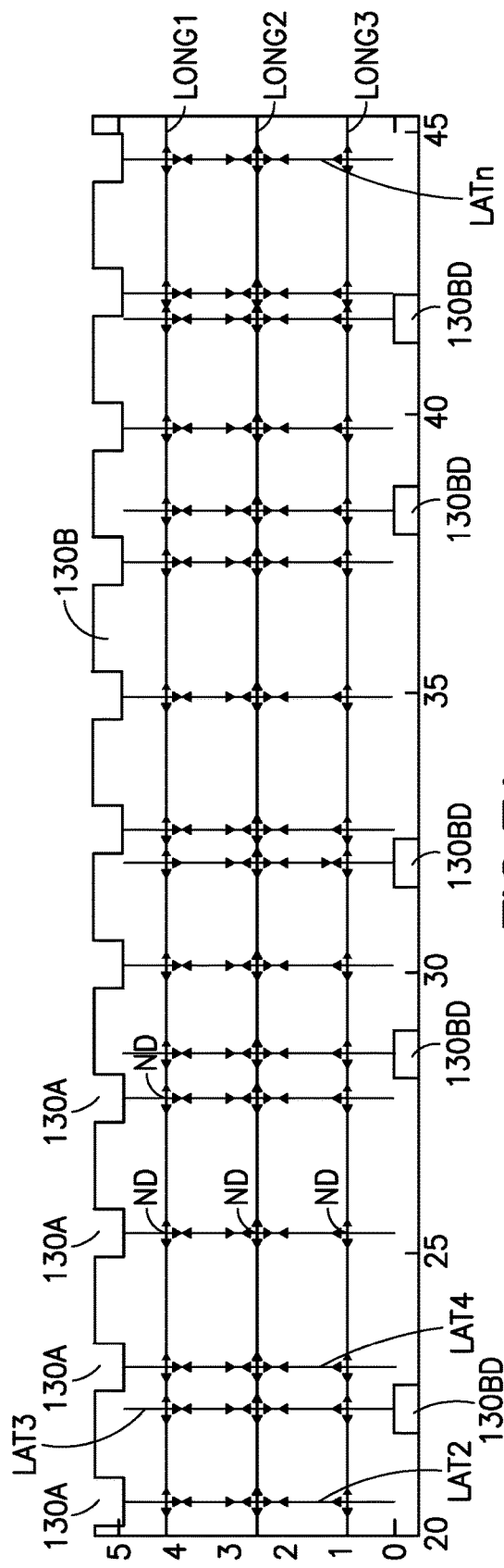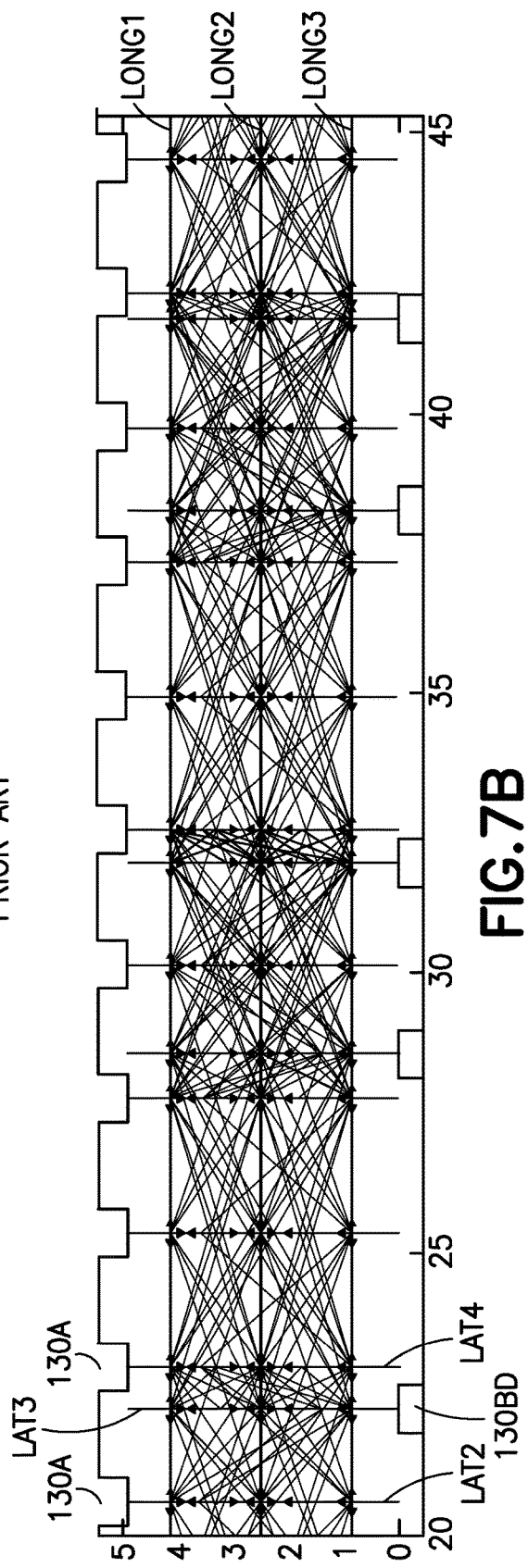

STORAGE AND RETRIEVAL SYSTEM

CROSS-REFERENCE TO RELATED APPLICATIONS

This application is a non-provisional of and claims the benefit of United States provisional patent application No. 62/564,568 filed on Sep. 28, 2017, the disclosure of which is incorporated herein by reference in its entirety.

BACKGROUND

1. Field

The exemplary embodiments generally relate to material handling systems and, more particularly, to transport and storage of items within the material handling system.

2. Brief Description of Related Developments

Conventional holonomic and non-holonomic autonomous vehicles in a storage and retrieval system travel along a network formed from guide features. These guide features include parallel and angled (e.g., forking and crossing) guide features that are arranged relative to each other to form the guide network. The autonomous vehicles navigate by, in effect, following the guide features using sensors, such as line following sensors that are continuously or substantially continuously sensing the guide features as the autonomous vehicle navigates. Further, conventional autonomous vehicle navigation relies on continuous or substantially continuous sensing of the guide features where the autonomous vehicles are restricted to travel only along (so that the sensor may continue sensing) the network of guide features which by nature of such restriction increases autonomous vehicle travel time through the storage and retrieval system. Such restriction in travel is of particular disadvantage to non-holonomic autonomous vehicles resulting in limited availability of travel paths and speeds (e.g., through 90° turns at corners or intersections) especially on traverse surfaces with restricted turning space. As may be realized, to make the sharp turns at the intersections of the guide features the autonomous vehicle must slow down to make turns which also increases autonomous vehicle travel time through the storage and retrieval system.

It would be advantageous to provide non-holonomic autonomous vehicle navigation that allows for a more direct routing of the autonomous vehicle from one location in the storage and retrieval system to another location so as to decrease autonomous vehicle travel times.

BRIEF DESCRIPTION OF THE DRAWINGS

The foregoing aspects and other features of the disclosed embodiment are explained in the following description, taken in connection with the accompanying drawings, wherein:

FIGS. 2A, 2B and 2C are schematic illustrations of portions of the storage and retrieval system in accordance with aspects of the disclosed embodiment;

FIGS. 3A, 3B and 3C are schematic illustrations of portions of the storage and retrieval system in accordance with aspects of the disclosed embodiment;

FIG. 4 is a schematic illustration of a portion of the automated storage and retrieval system in accordance with aspects of the disclosed embodiment;

FIG. 6B is a diagram showing exemplary bot paths in accordance with aspects of the disclosed embodiment;

FIG. 7A is a schematic illustration of conventional non-holonomic transport paths and FIG. 7B is a schematic illustration of non-holonomic transport paths in accordance with aspects of the disclosed embodiment;

DETAILED DESCRIPTION

Figure 1:
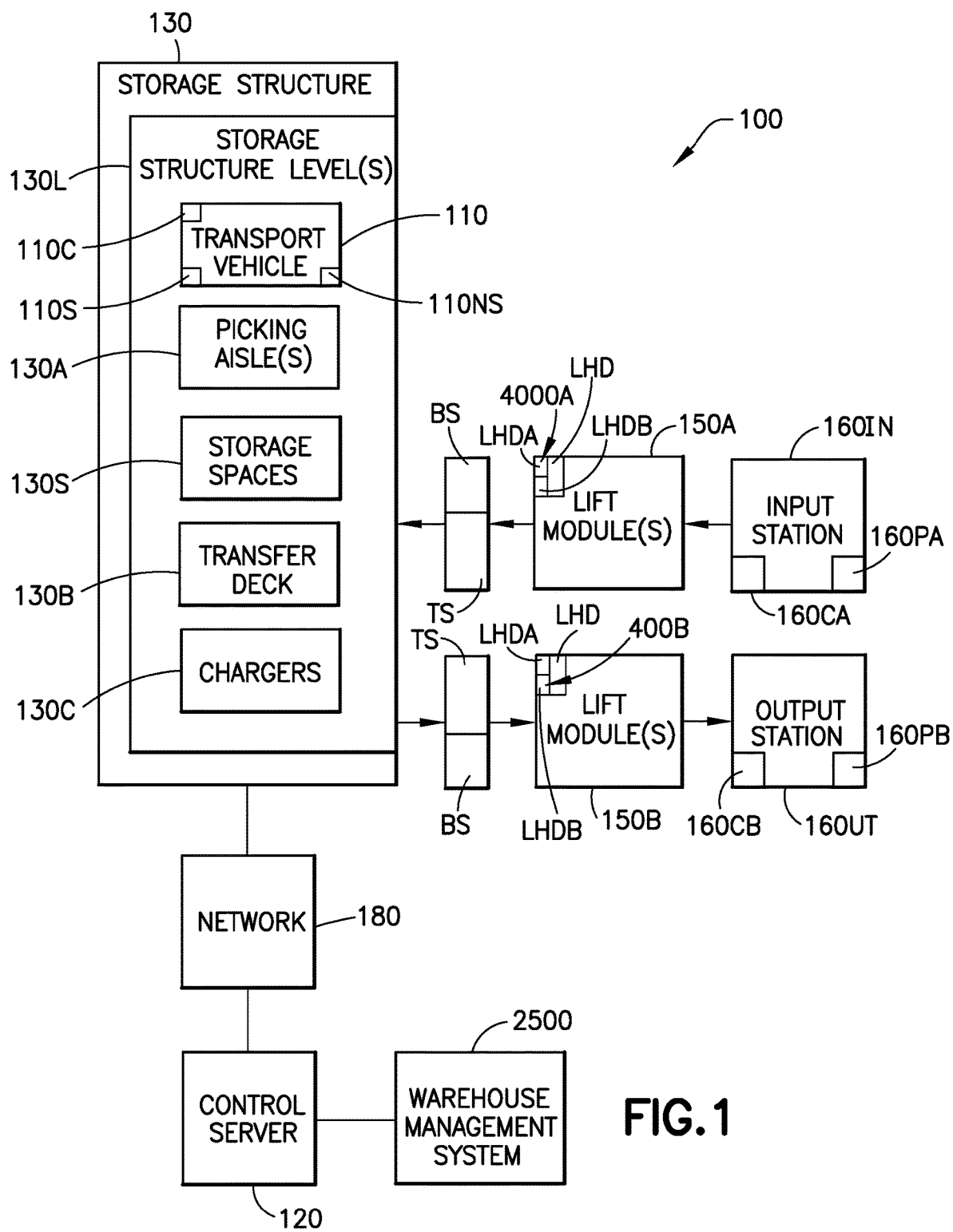
FIG. 1 is a schematic illustration of an automated storage and retrieval system in accordance with aspects of the disclosed embodiment.

FIG. 1 is a schematic illustration of an automated storage and retrieval system 100 in accordance with aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used.

In accordance with aspects of the disclosed embodiment the automated storage and retrieval system 100 may operate in a retail distribution center or warehouse to, for example, fulfill orders received from retail stores for case units such as those described in U.S. patent application Ser. No. 13/326,674 filed on Dec. 15, 2011, the disclosure of which is incorporated by reference herein in its entirety. For example, the case units are cases or units of goods not stored in trays, on totes or on pallets (e.g. uncontained). In other examples, the case units are cases or units of goods that are contained in any suitable manner such as in trays, on totes or on pallets. In still other examples, the case units are a combination of uncontained and contained items. It is noted that the case units, for example, include cased units of goods (e.g. case of soup cans, boxes of cereal, etc.) or individual goods that are adapted to be taken off of or placed on a pallet. In accordance with the aspects of the disclosed embodiment, shipping cases for case units (e.g. cartons, barrels, boxes, crates, jugs, or any other suitable device for holding case units) may have variable sizes and may be used to hold case units in shipping and may be configured so they are capable of being palletized for shipping. It is noted that when, for example, bundles or pallets of case units arrive at the storage and retrieval system the content of each pallet may be uniform (e.g. each pallet holds a predetermined number of the same item—one pallet holds soup and another pallet holds cereal) and as pallets leave the storage and retrieval system the pallets may contain any suitable number and combination of different case units (e.g. a mixed pallet where each mixed pallet holds different types of case units—a pallet holds a combination of soup and cereal) that are provided to, for example the palletizer in a sorted arrangement for forming the mixed pallet. In the embodiments the storage and retrieval system described herein may be applied to any environment in which case units are stored and retrieved.

Figure 1A:
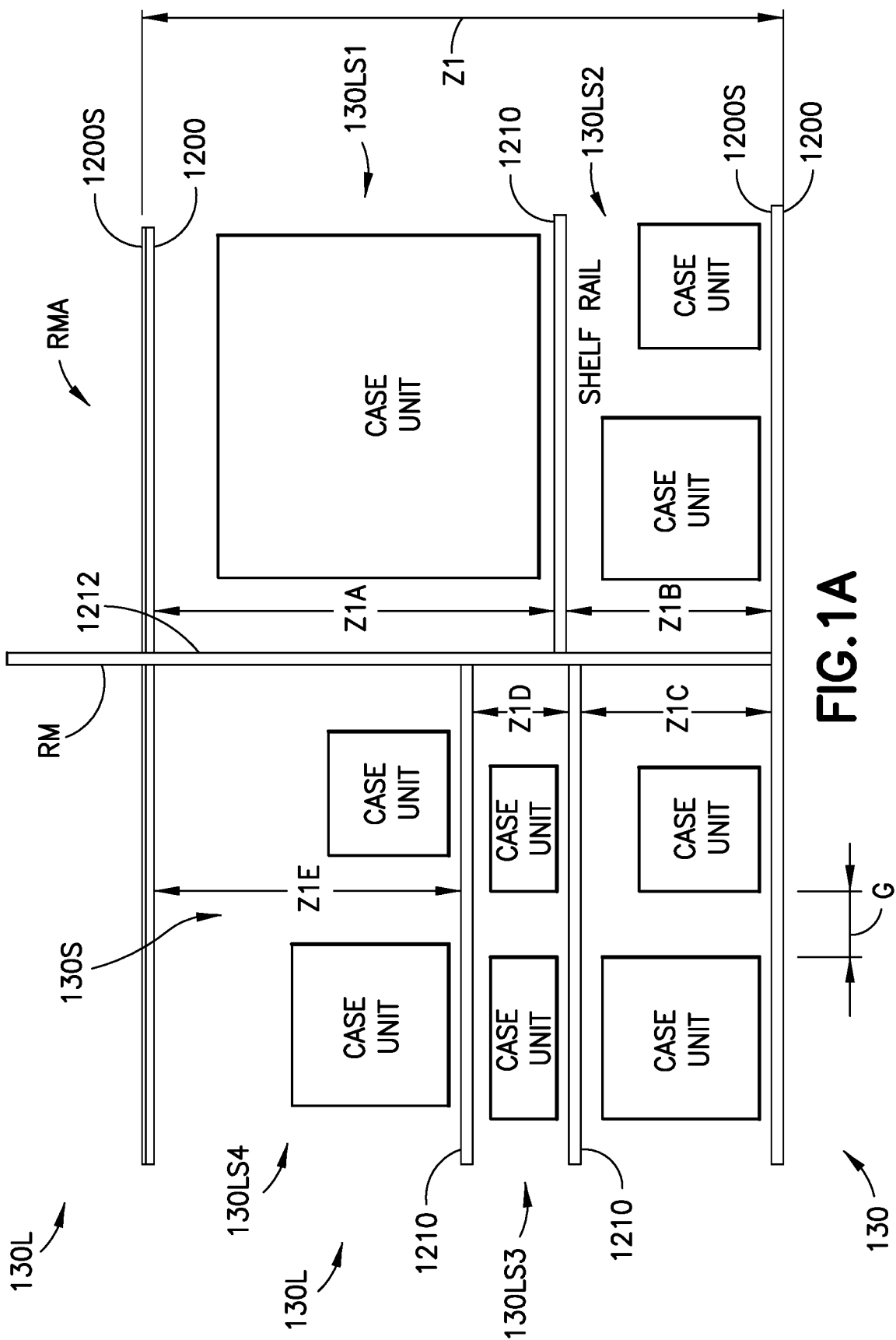
FIGS. 1A and 1B are schematic illustrations of portions of the automated storage and retrieval system in accordance with aspects of the disclosed embodiment.
Figure 1B:
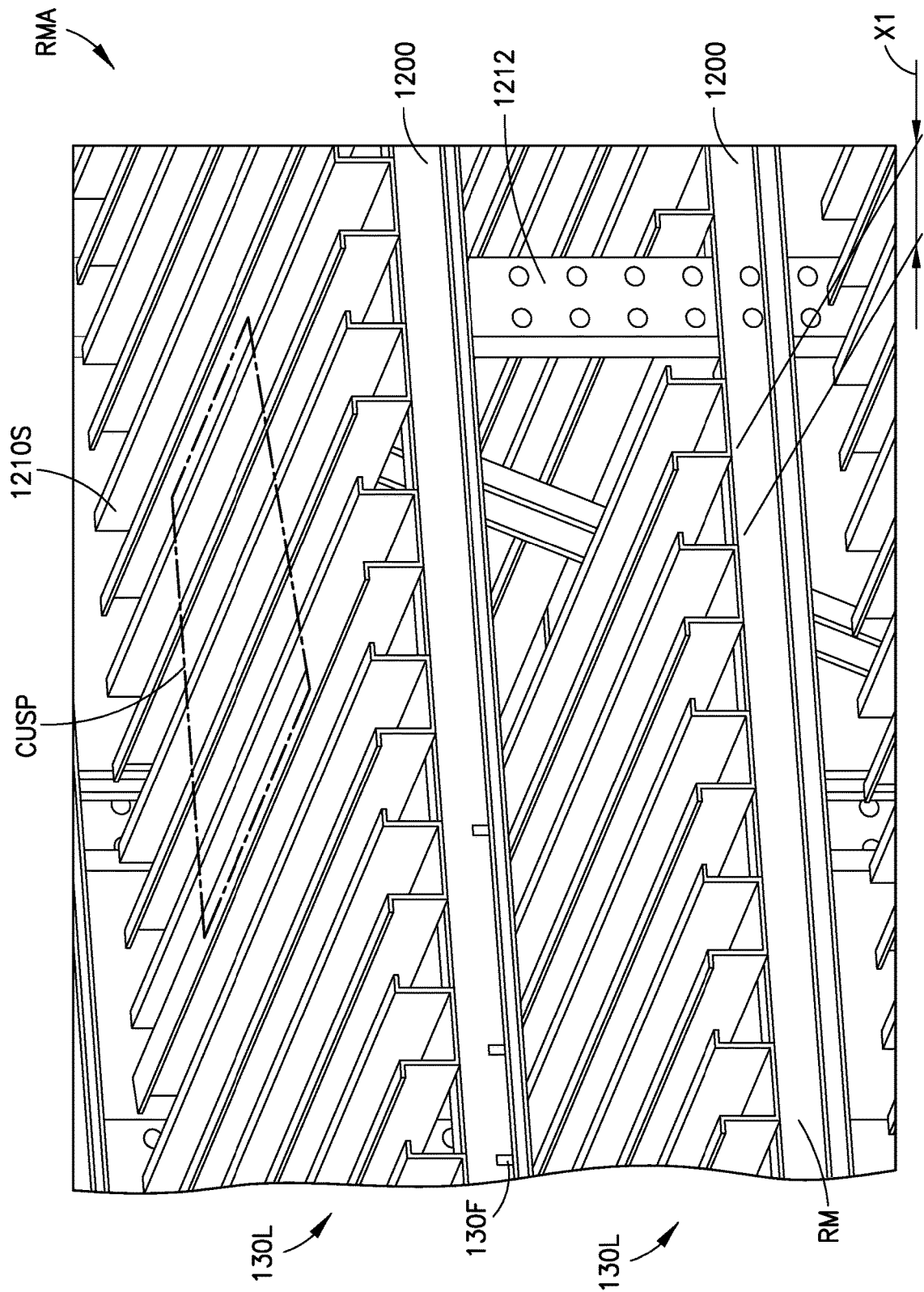
Figure 1C:
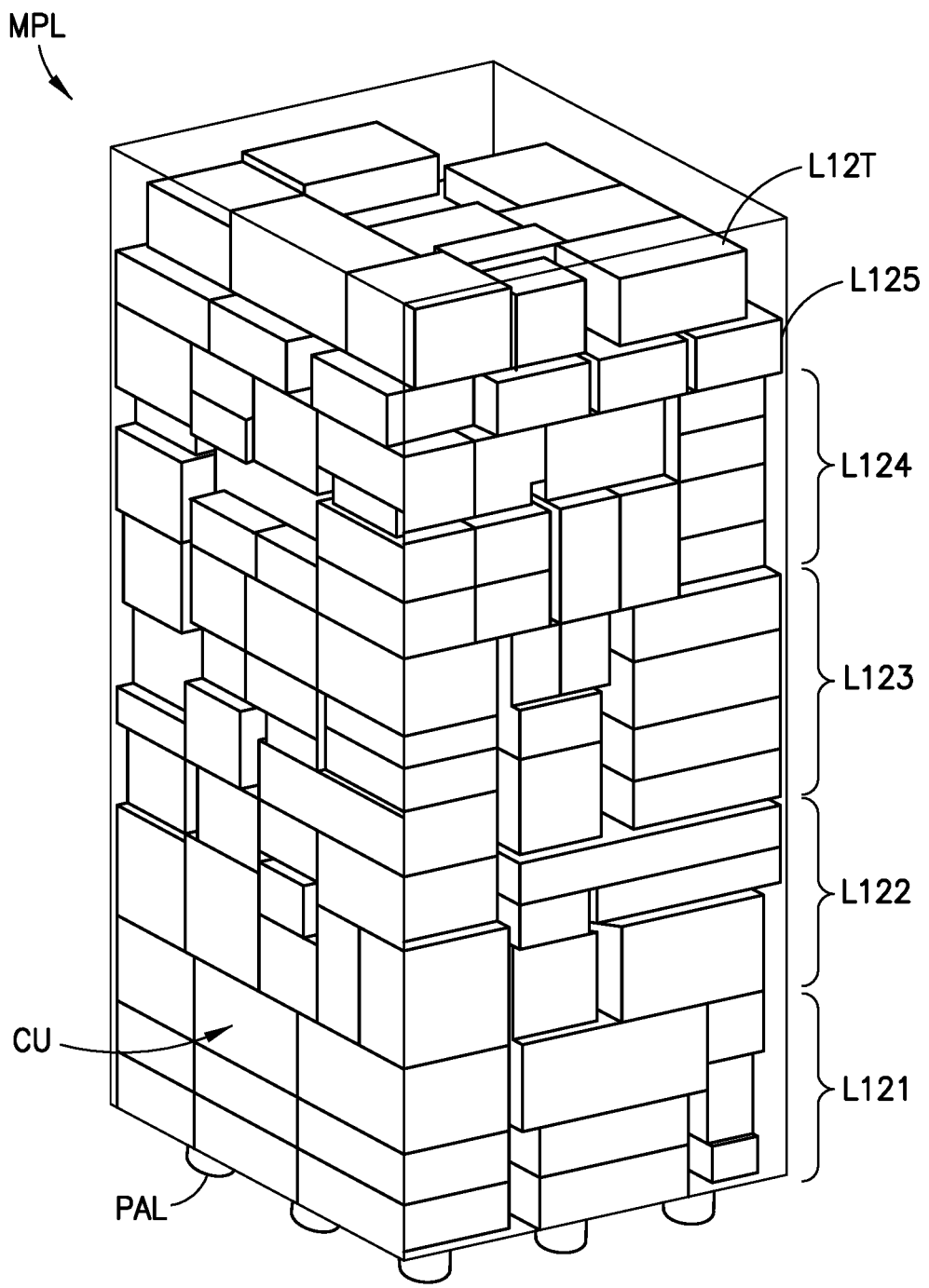
FIG. 1C is a schematic illustration of a mixed pallet load formed by the automated storage and retrieval system in accordance with aspects of the disclosed embodiment.

Also referring to FIG. 1C, it is noted that when, for example, incoming bundles or pallets (e.g. from manufacturers or suppliers of case units arrive at the storage and retrieval system for replenishment of the automated storage and retrieval system 100, the content of each pallet may be uniform (e.g. each pallet holds a predetermined number of the same item—one pallet holds soup and another pallet holds cereal). As may be realized, the cases of such pallet load may be substantially similar or in other words, homogenous cases (e.g. similar dimensions), and may have the same SKU (otherwise, as noted before the pallets may be "rainbow" pallets having layers formed of homogeneous cases). As pallets PAL (or suitable outbound loads such as unpalletized trailer or truck loads) leave the storage and retrieval system 100, with cases filling replenishment orders, the pallets PAL may contain any suitable number and combination of different case units CU (e.g. each pallet may hold different types of case units—a pallet holds a combination of canned soup, cereal, beverage packs, cosmetics and household cleaners). The cases combined onto a single pallet may have different dimensions and/or different SKU's. In one aspect of the exemplary embodiment, the storage and retrieval system 100 may be configured to generally include an in-feed section, a storage and sortation section (where, in one aspect, storage of items is optional) and an output section as will be described in greater detail below. As may be realized, the system 100 operating for example as a retail distribution center may serve to receive uniform pallet loads of cases, breakdown the pallet goods or disassociate the cases from the uniform pallet loads into independent case units handled individually by the system, retrieve and sort the different cases sought by each order into corresponding groups, and transport and assemble the corresponding groups of cases into what may be referred to as mixed case loads MPL (illustrated in FIG. 1C as a pallet load for example purposes, though the outbound loads of mixed cases may be assembled in similar fashion but without the pallet, such as with a truck fill). The in-feed section may generally be capable of resolving the uniform pallet loads to individual cases, and transporting the cases via suitable transport, for input to the storage and sortation section (also individual or unpalletized cases may be received such as product returns). The storage and sortation section in one aspect receives individual cases, stores them in a storage area (for example, in a random access storage area) and retrieves (for example, with high speed transport configured for random access to the storage area as described further below) desired cases individually, or in groups, in accordance with commands generated in accordance to orders entered into a warehouse management system, such as warehouse management system 2500, for transport to the output section. In other aspects, the storage and sortation section receives individual cases, sorts the individual cases (utilizing, for example, the buffer and interface stations described herein) and transfers the individual cases (singly or in groups) to the output section in accordance to orders entered into the warehouse management system. The sorting and grouping of cases according to order (e.g. an order out sequence) may be performed in whole or in part by either the storage and retrieval section or the output section, or both, the boundary between being one of convenience for the description and the sorting and grouping being capable of being performed any number of ways. The intended result is that the output section assembles the appropriate group of ordered cases, that may be different in SKU, dimensions, etc. into mixed case pallet loads in the manner described in, for example, U.S. patent application Ser. No. 13/654,293 filed on Oct. 17, 2012 (now U.S. Pat. No. 8,965,559 issued on Feb. 24, 2015) the disclosures of which are incorporated herein by reference in their entireties.

In the exemplary embodiment, the output section generates the pallet load in what may be referred to in this example as a structured architecture of mixed case stacks. The structured architecture of the pallet load described herein is representative and in other aspects the pallet load may have any other suitable configuration. For example, the structured architecture may be any suitable predetermined configuration such as a truck bay load or other suitable container or load container envelope holding a structural load. The structured architecture of the pallet load may be characterized as having several flat case layers L121-L125, L12T, at least one of which is formed of non-intersecting, free-standing and stable stacks of multiple mixed cases. The mixed case stacks of the given layer have substantially the same height, to form as may be realized substantially flat top and bottom surfaces of the given layer, and may be sufficient in number to cover the pallet area, or a desired portion of the pallet area. Overlaying layer(s) may be orientated so that corresponding cases of the layer(s) bridge between the stacks of the supporting layer. Thus, stabilizing the stacks and correspondingly the interfacing layer(s) of the pallet load. In defining the pallet load into a structured layer architecture, the coupled 3-D pallet load solution is resolved into two parts that may be saved separately, a vertical (1-D) part resolving the load into layers, and a horizontal (2-D) part of efficiently distributing stacks of equal height to fill out the pallet height of each layer. As will be described below, the storage and retrieval system outputs case units to the output section so that the two parts of the 3-D pallet load solution are resolved. The predetermined structure of the mixed pallet load defines an order of case units, whether the case units are a singular case unit pickface or a combined case unit pickface provided by the sortation and output sections to a load construction system (which may be automated or manual loading). The storage and retrieval system, in one aspect, is configured to output cases in an ordered sequence to form the mixed pallet loads in a manner substantially similar to that described in U.S. provisional patent application No. 62/091,162 filed on Dec. 12, 2014, now U.S. patent application Ser. No. 14/966,978 filed on Dec. 11, 2015; U.S. provisional patent application No. 62/104,513 filed on Jan. 16, 2015, now U.S. patent application Ser. No. 14/997,892 filed on Jan. 18, 2016; U.S. provisional patent application No. 62/104,552 filed on Jan. 16, 2015, now U.S. patent application Ser. No. 14/997,902 filed on Jan. 18, 2016; U.S. provisional patent application No. 62/104,531 filed on Jan. 16, 2015, now U.S. patent application Ser. No. 14/997,925 filed on Jan. 18, 2016); and U.S. provisional patent application No. 62/104,520 filed on Jan. 16, 2015, now U.S. patent application Ser. No. 14/997,920 filed on Jan. 18, 2016; the disclosures all of which are incorporated by reference herein in their entireties.

In accordance with aspects of the disclosed embodiment, referring again to FIG. 1, the automated storage and retrieval system 100 includes input stations 160IN (which include depalletizers 160PA and/or conveyors 160CA for transporting items to lift modules for entry into storage) and output stations 160UT (which include palletizers 160PB and/or conveyors 160CB for transporting case units from lift modules for removal from storage), input and output vertical lift modules 150A, 150B (generally referred to as lift modules 150—it is noted that while input and output lift modules are shown, a single lift module may be used to both input and remove case units from the storage structure), a storage structure 130, and a number of non-holonomic autonomous transport vehicles 110 (referred to herein as "bots"). As used herein the lift modules 150, storage structure 130 and bots 110 may be collectively referred to herein as the storage and sorting section noted above for placing pickfaces and storage and outputting pickfaces in a predetermined ordered sequence. It is also noted that the depalletizers 160PA may be configured to remove case units from pallets so that the input station 160IN can transport the items to the lift modules 150 for input into the storage structure 130. The palletizers 160PB may be configured to place items removed from the storage structure 130 on pallets PAL (FIG. 1C) for shipping.

Figure 2B:
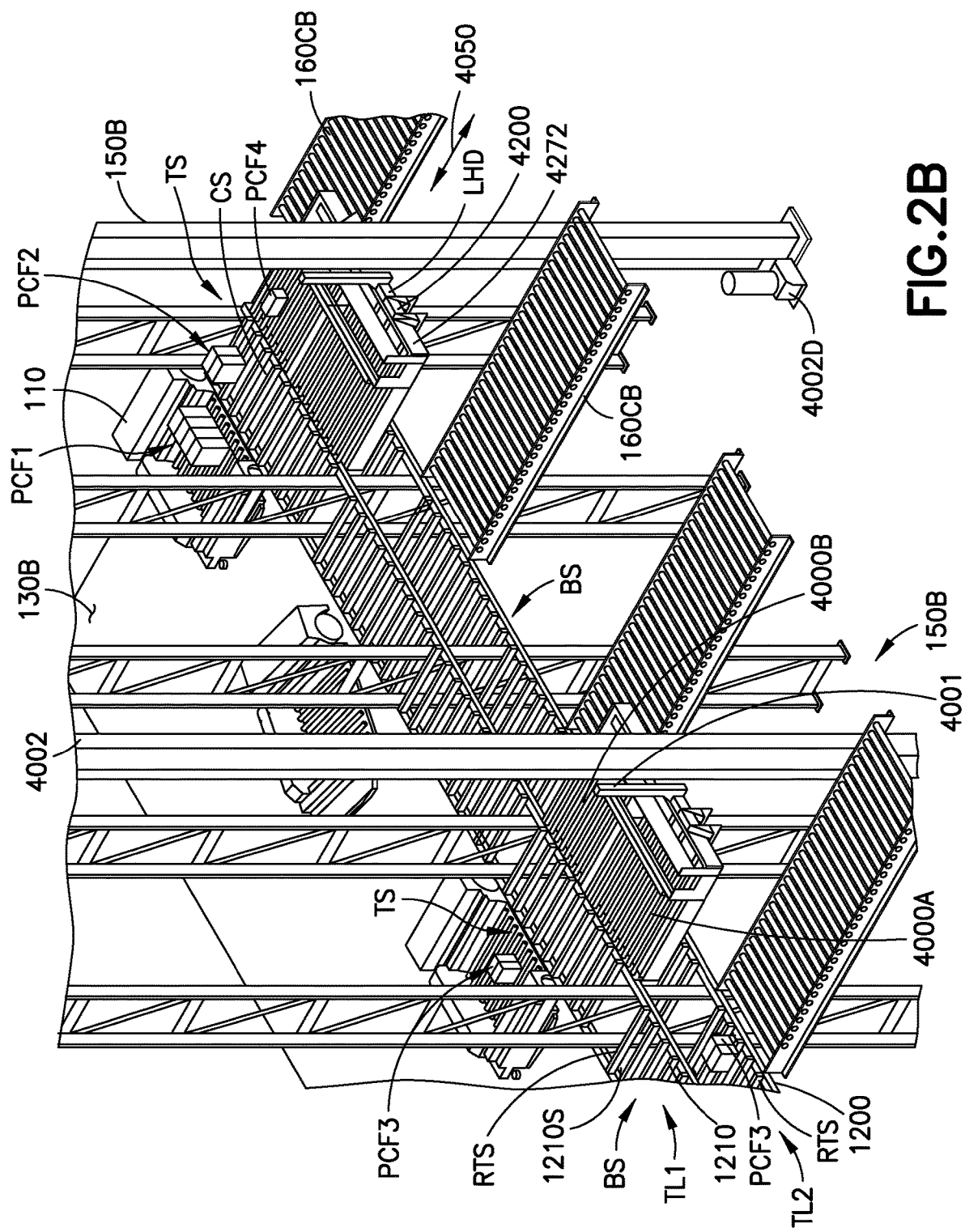
Figure 3A:
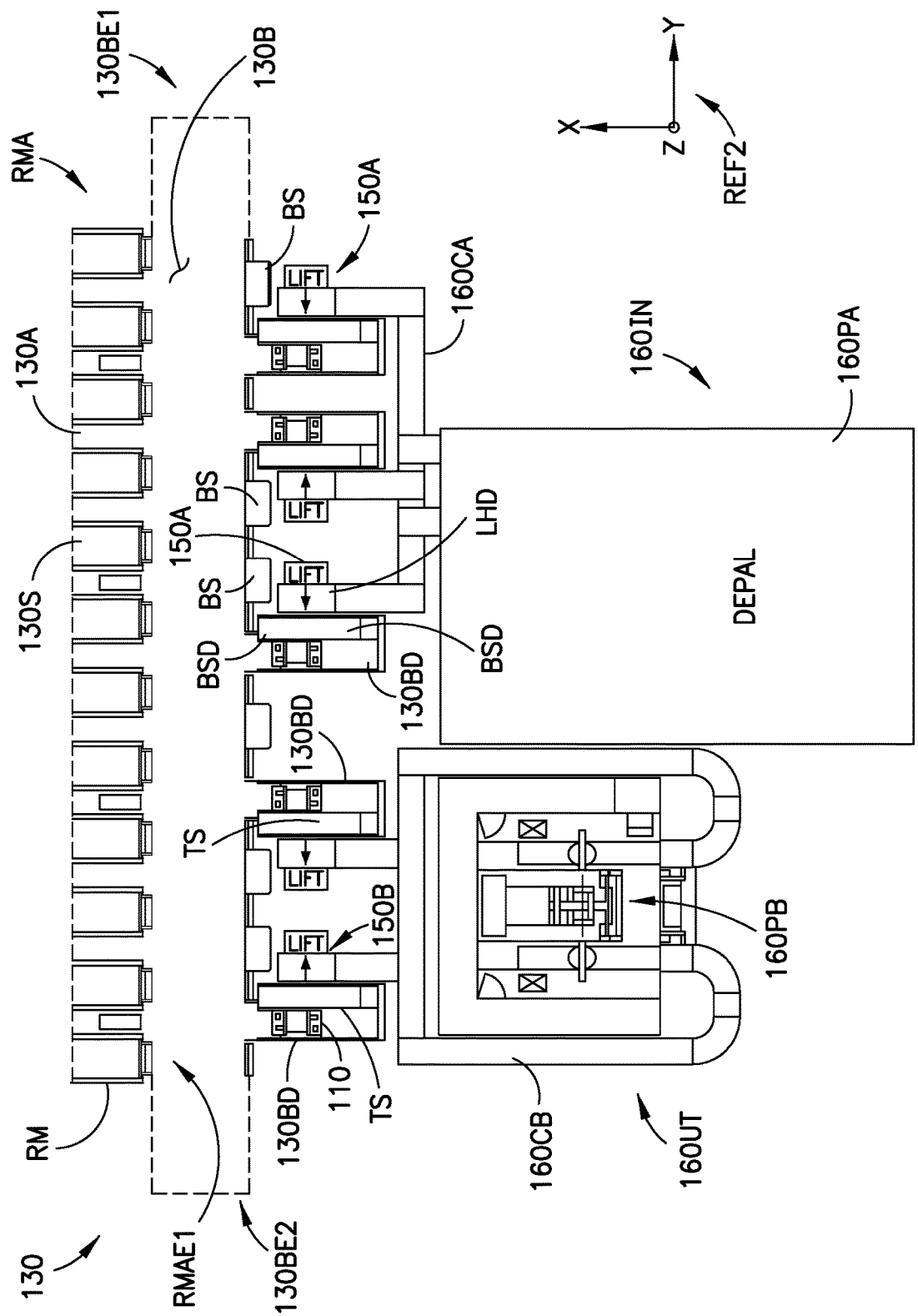
Figure 3B:
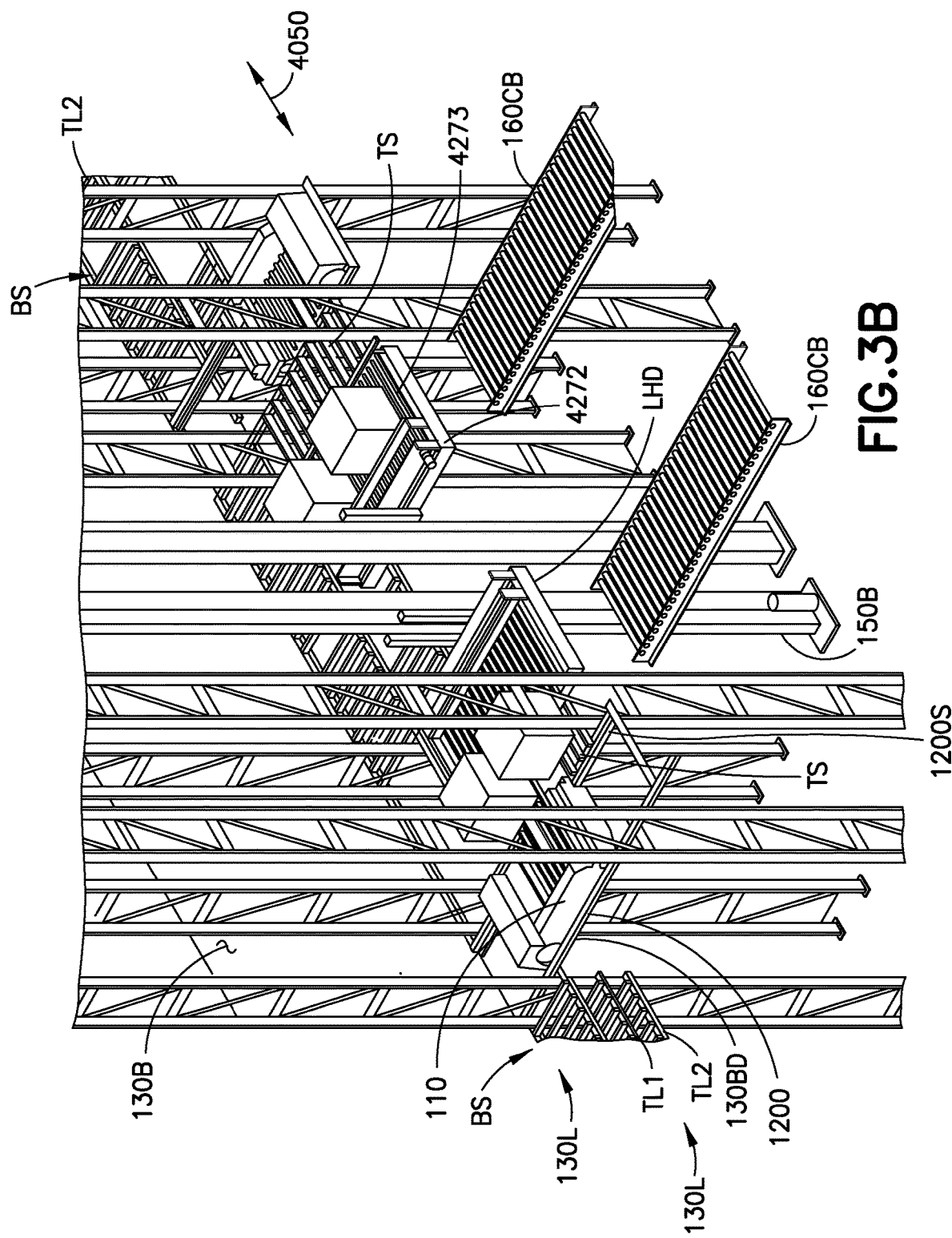

Also referring to FIGS. 2A and 3A, the storage structure 130 includes multiple storage rack modules RM, configured in a three dimensional array RMA, that are accessible by storage or deck levels 130L. Each storage level 130L includes pickface storage/handoff spaces 130S (referred to herein as storage spaces 130S) formed by the rack modules RM where the rack modules include shelves that are disposed along storage or picking aisles 130A which, e.g., extend linearly through the rack module array RMA and provide access to the storage spaces 130S and transfer deck(s) 130B over which the bots 110 travel on a respective storage level 130L for transferring case units between any of the storage spaces 130S of the storage structure 130 (e.g. on the level which the bot 110 is located) and any of the lift modules 150 (e.g. each of the bots 110 has access to each storage space 130S on a respective level and each lift module 150 on a respective storage level 130L). The transfer decks 130B are arranged at different levels (corresponding to each level 130L of the storage and retrieval system) that may be stacked one over the other or horizontally offset, such as having one transfer deck 130B at one end or side RMAE1 of the storage rack array RMA or at several ends or sides RMAE1, RMAE2 of the storage rack array RMA as described in, for example, U.S. patent application Ser. No. 13/326,674 filed on Dec. 15, 2011 the disclosure of which is incorporated herein by reference in its entirety.

The transfer decks 130B have a substantially open undeterministic bot travel surface that is configured for the undeterministic traversal of bots 110 across and along the transfer decks 130B. The bots 110, are non-holonomic and are configured so as to be capable of traversing the transfer decks 130B at high speed, wherein the high speed is such that bot 110 inertial effects (for an empty bot 110 and/or carrying a payload having a weight as described below) at speed and motion dynamics assert substantial effects on control of bot traverse path, kinematic trajectory/state (position (P), velocity (V), acceleration (a), and time (t), where the position, velocity, and acceleration are within a frame of reference) along the path. For example, bot high speed may be greater than about 1 m/sec or more with the bot 110 carrying a payload of about 60 lbs (about 27 kg) to about 90 lbs (about 41 kg) (in other aspects the payload may be less than about 60 lbs or more than about 90 lbs). In accordance with another example, the bot high speed may be in excess of about 20 km/hr (e.g. about 5.6 m/sec) and more particularly about 32 km/hr (e.g. about 9.144 m/sec) or about 36 km/hr (e.g. about 10 m/sec) with the bot 110 carrying a payload of about 60 lbs (about 27 kg) to about 90 lbs (about 41 kg) (in other aspects the payload may be less than about 60 lbs or more than about 90 lbs). As may be realized, the transfer deck(s) 130B at each storage level 130L communicate with each of the picking aisles 130A on the respective storage level 130L. Bots 110 bi-directionally traverse between the transfer deck(s) 130B and picking aisles 130A on each respective storage level 130L to access the storage spaces 130S disposed in the rack shelves alongside each of the picking aisles 130A (e.g. bots 110 may access storage spaces 130S distributed on both sides of each aisle such that the bot 110 may have a different facing when traversing each picking aisle 130A, for example, referring to FIG. 5, drive wheels 202 leading a direction of travel or drive wheels trailing a direction of travel). As noted above, the transfer deck(s) 130B also provide bot 110 access to each of the lifts 150 on the respective storage level 130L where the lifts 150 feed and remove case units to and/or from each storage level 130L and where the bots 110 effect case unit transfer between the lifts 150 and the storage spaces 130S. As described above, referring also to FIG. 2A, in one aspect the storage structure 130 includes multiple storage rack modules RM, configured in a three dimensional array RMA where the racks are arranged in aisles 130A, the aisles 130A being configured for bot 110 travel within the aisles 130A. As described above, the transfer deck 130B has an undeterministic transport surface on which the bots 100 travel where the undeterministic transport surface 130BS has more than one juxtaposed travel direction or lane HSTP (which correspond at least in part to a guidance feature of navigation array 3000 that is disposed on the undeterministic transport surface 130BS) connecting the aisles 130A. As may be realized, the juxtaposed travel lanes (the terms "travel lane" and "direction" may be used interchangeably herein) are juxtaposed along a common undeterministic transport surface 130BS between opposing sides 130BD1, 130BD2 of the transfer deck 130B. For example, FIG. 4 illustrates longitudinal lanes such as an aisle side travel lane LONG1, a lift side travel lane LONG3 and a pass through travel lane LONG2, but it should be understood that in other aspects more or fewer travel lanes are provided. Juxtaposed lateral travel lanes, such as lanes LAT1-LAT7 are arranged, in one aspect, on the transfer deck 130B to allow bot traverse to and from picking aisles 130A, driveways 130BW, transfer stations TS, buffer stations BS, and/or any other suitable location of the storage and retrieval system that is accessed through a path that is transverse to the longitudinal lanes.

As can be seen in FIG. 4 the navigation array 3000 is illustrated, for exemplary purposes, as a grid of linearly distributed features. In one aspect the linearly distributed features LDF include longitudinal features LONG1-LONG3 and lateral features LAT1-LAT7 where the longitudinal and lateral directions are relative to the transfer deck (e.g. the longitudinal features LONG1-LONG3 define at least one of the travel lanes HSTP and the lateral features LAT1-LAT7 define travel lanes HSTT that cross the travel lanes HSTP. As may be realized, in one aspect, the linearly distributed features LDF allow for bot 110 traverse between offset (parallel and/or crossing) travel lanes HSTP, HSTT in the storage structure 130 for entry into aisles 130A, driveways 130BW, buffer stations BS, transfer stations TS or any other suitable location at which the bot 110 performs an operation (transfer of cases, charging of the bot, bot induction into the storage structure, bot removal from the storage structure, etc.). The linearly distributed features LDF also allow, in one aspect, for bot traverse between crossing travel lanes HSTP, HSTT for entry into aisles 130A, driveways 130BW, buffer stations BS, transfer stations TS or any other suitable location at which the bot 110 performs an operation (transfer of cases, charging of the bot, bot induction into the storage structure, bot removal from the storage structure, etc.) where when the bot 110 detects a linear distributed feature the bot 110 establishes a location of the bot 110 during travel as will be described in greater detail below.

In one aspect, the linearly distributed features LDF connect the aisles 130A to each other, cross the aisles 130A, connect the aisles 130A to one or more of the transfer stations TS, the buffer stations BS and the driveways 130BW or any combination thereof. As may be realized, one or more of the linearly distributed features, LDF are substantially aligned with one or more of the interface between the transfer deck 130B and the aisles 130A, and the interface between the transfer deck 130B and the driveways 130BW. In one aspect, as noted above, at least a portion of the linearly distributed features LDF are substantially aligned with one or more bot traverse paths 3010 along the transfer deck 130B. It is noted that while the linearly distributed features LONG1-LONG3, LAT1-LAT7 are illustrated as forming an orthogonal grid in other aspects the longitudinal features LONG1-LONG3 and the lateral features LAT1-LAT7 cross each other at any suitable angles. As may also be realized, while three longitudinal features LONG1-LONG3 (defining, for example, at least in part three travel lanes HSTP) and seven lateral features LAT1-LAT7 (defining, for example, at least in part seven travel lanes HSTT) in other aspects the transfer deck 130B includes any suitable number of longitudinal and lateral features LONG1-LONG3, LAT1-LAT7 defining at least in part any suitable number of travel lanes oriented in any suitable directions relative to the transfer deck 130B.

In one aspect the linearly distributed features LDF are formed of, for example, any suitable guide tapes, any suitable transfer deck 130B features (grooves, apertures, channels, etc.), and edge of the transfer deck 130B or any combination thereof. In one aspect the linearly distributed features LDF are uncoded (e.g. do not include identifying features such as for determining bot 110 location) while in other aspects the linearly distributed features are coded (e.g. include or are formed of barcodes or other identifying indicia or features so as to provide for bot 110 location determination). It is noted however, that the linearly distributed features are placed at predetermined locations on the transfer deck 130B to allow the bot to establish at least an estimated location of the bot 110 while travelling at high speeds (as previously described) along the transfer deck 130B. The spacing between juxtaposed linearly distributed features LDF is not dependent on bot 110 dimensions or operational aspects, such as bot longitudinal wheelbase LONWB (where the bot 110 has a longitudinal axis LX and a lateral axis LT), wheel track or lateral wheelbase LATWB, turn radius and bot width (in the lateral direction) as will be described in greater detail below. In one aspect the bot frame 110F, longitudinal wheelbase LONWB (FIG. 5) and lateral wheelbase LATWB (FIG. 5A) define a predetermined aspect (such as for example, a ratio of length to width) that provides the non-holonomic bot 110 with a minimum turn radius (and/or minimum turn radius footprint defined by the outermost corners of the frame turning at the minimum turn radius). In one example, the spacing between juxtaposed travel lanes LONG1-LONG3, LAT1-LAT7 is such that it allows passage of two bots 110 (travelling linearly) side by side on each lane but is less than the minimum turn radius of the non-holonomic bot 110 for a 90° pivot turn (pivoting at the drive wheels 202—see FIGS. 5 and 5B, such as at a pivot location/axis disposed between the drive wheels 202A, 202B)). As such the outer lanes (e.g. the aisle side travel lane and the lift side travel lane and/or corresponding lanes at the ends 130BE1, 130BE2 of the transfer deck 130B) are, in one aspect positioned close to the sides of the transfer deck 130B (by an amount just sufficient to allow the bots 110 to travel along the travel lane) but less than the spacing required for the bot 110 to make a 90° pivot turn (pivoting at the drive wheels 202—see FIG. 5). As will be described herein, the position of the picking aisles 130A, the lift interfaces/transfer stations TS and buffers stations BS relative to the transfer deck 130B and each other are decoupled from bot 110 turn considerations.

It is noted that for descriptive purposes only, the intersections between the linearly distributed features are referred to as nodes ND so that the transfer deck surface 130BS and its associated features (e.g. the linearly disturbed features LDF) are represented as a grid (as described above) with an array of nodes. In one aspect the nodes ND are disposed at any suitable predetermined location on the longitudinal and/or lateral features LONG1-LONG3, LAT1-LAT7 (such as at an intersection) of the linearly distributed features LDF that may correspond, for example, to a feature of the storage structure 130 and/or navigation array 3000 (e.g. at a terminus to a storage aisle 130A, at a lift transfer station TS, an entry to a driveway 130BD, at a buffer station BS or at any other suitable location of the transfer deck 130B). It should be understood that the concept of a node ND as used herein is to exemplify that the navigation array 3000 defines the linearly distributed features LDF which map out the transfer deck 130B in two dimensions where the array of nodes ND on the deck are associated with the longitudinal and lateral features LONG1-LONG3, LAT1-LAT7. As will be described in greater detail below, waypoints WP1-WP2 that lay along a bot 110 travel path may be created at predetermined locations on the transfer deck 130B where in some aspects one or more waypoints WP1-WP4 may coincide with one or more nodes ND and, as with the nodes ND, may be positioned on linearly distributed features LDF defining a respective linear direction. In other aspects one or more of the waypoints WP1-WP4 may be located between nodes ND, be located offset from the nodes ND in any suitable direction, or be located offset from the linearly distributed features LDF in any suitable direction.

As illustrated in FIGS. 2A and 3A, in one aspect the aisles 130A are joined to the transfer deck 130B on one side 130BD2 of the transfer deck 130B but in other aspects, the aisles are joined to more than one side 130BD1, 130BD2 of the transfer deck 130B in a manner substantially similar to that described in U.S. patent application Ser. No. 13/326,674 filed on Dec. 15, 2011, the disclosure of which is previously incorporated by reference herein in its entirety. In one aspect, the other side 130BD1 of the transfer deck 130B includes deck storage racks (e.g. interface stations TS and buffer stations BS) and/or driveways 130BW (along which interface stations TS and/or buffer stations BS are located) that are distributed along the other side 130BD1 of the transfer deck 130B so that at least one part of the transfer deck is interposed between the deck storage racks and the aisles 130A. The deck storage racks are arranged along the other side 130BD1 of the transfer deck 130B so that the deck storage racks communicate with the bots 110 from the transfer deck 130B and with the lift modules 150 (e.g. the deck storage racks are accessed by the bots 110 from the transfer deck 130B and by the lifts 150 for picking and placing pickfaces so that pickfaces are transferred between the bots 110 and the deck storage racks and between the deck storage racks and the lifts 150 and hence between the bots 110 and the lifts 150). In one aspect a pitch IP (FIG. 4) between aisles or a position of the aisles on the transfer deck 130B is decoupled from a spacing between lift interface stations TS or a position of the lift interface stations TS (or driveways 130BW) on the transfer deck 130B. For example, in one aspect, the aisles 130A are spaced apart from each other along the transfer deck 130B to effect a maximum, high density storage while the transfer stations TS (or driveways 130BW) are spaced apart from each other to effect an optimal flow of case units into and out of the storage structure 130. The decoupled spacing of the aisles 130A and the transfer stations TS (or driveways 130BW) is effected by the bot 110 navigation system, as will be described in greater detail below, where the bot 110 undeterministically navigates the transfer deck substantially free of guidance constraints with respect to the linearly distributed features LDF and at high speed, as noted and as will be further described.

Each storage level 130L may also include charging stations 130C for charging an on-board power supply of the bots 110 on that storage level 130L such as described in, for example, U.S. patent application Ser. No. 14/209,086 filed on Mar. 13, 2014 and Ser. No. 13/326,823 filed on Dec. 15, 2011 (now U.S. Pat. No. 9,082,112 issued on Jul. 14, 2015) the disclosures of which are incorporated herein by reference in their entireties. As may be realized, one or more linearly distributed features and/or nodes (or waypoints) may correspond to the charging stations 130C in a manner substantially similar to that described herein with respect to the picking aisles 130A, transfer stations TS, buffer stations BS, driveways 130BW, etc.

The bots 110, lift modules 150 and other suitable features of the storage and retrieval system 100 are controlled in any suitable manner such as by, for example, one or more central system control computers (e.g. control server) 120 through, for example, any suitable network 180. In one aspect the network 180 is a wired network, a wireless network or a combination of wireless and wired networks using any suitable type and/or number of communication protocols. In one aspect, the control server 120 includes a collection of substantially concurrently running programs (e.g. system management software) for substantially automatic control of the automated storage and retrieval system 100. The collection of substantially concurrently running programs, for example, being configured to manage the storage and retrieval system 100 including, for exemplary purposes only, controlling, scheduling, and monitoring the activities of all active system components, managing inventory (e.g. which case units are input and removed, the order in which the cases are removed and where the case units are stored) and pickfaces (e.g. one or more case units that are movable as a unit and handled as a unit by components of the storage and retrieval system), and interfacing with a warehouse management system 2500. For simplicity and ease of explanation the term "case unit(s)" is generally used herein for referring to both individual case units and pickfaces (a pickface is formed of one or multiple case units that are moved as a unit).

Referring also to FIGS. 1A and 1B the rack module array RMA of the storage structure 130 includes vertical support members 1212 and horizontal support members 1200 that define a high density automated storage array as will be described in greater detail below. Rails 1200S may be mounted to one or more of the vertical and horizontal support members 1212, 1200 in, for example, picking or rack aisles 130A and be configured so that the bots 110 ride along the rails 1200S through the picking aisles 130A. At least one side of at least one of the picking aisles 130A of at least one storage level 130L may have one or more storage shelves (e.g. formed by rails 1210, 1200 and ribs 1210S) provided at differing heights so as to form multiple shelf levels 130LS1-130LS4 between the storage or deck levels 130L defined by the transfer decks 130B (and the rails 1200S which form an aisle deck). Accordingly, there are multiple rack shelf levels 130LS1-130LS4, corresponding to each storage level 130L, extending along one or more picking aisles 130A communicating with the transfer deck 130B of the respective storage level 130L. As may be realized, the multiple rack shelf levels 130LS1-130LS4 effect each storage level 130L having stacks of stored case units (or case layers) that are accessible from a common deck 1200S of a respective storage level 130L (e.g. the stacks of stored cases are located between storage levels).

As may be realized, bots 110 traversing a picking aisle 130A, at a corresponding storage level 130L, have access (e.g. for picking and placing case units) to each storage space 130S that is available on each shelf level 130LS1-130LS4, where each shelf level 130LS1-130LS4 is located between the storage levels 130L on one or more side(s) PAS1, PAS2 (see e.g. FIG. 2A) of the picking aisle 130A. As noted above, each of the storage shelf levels 130LS1-130LS4 is accessible by the bot 110 from the rails 1200S (e.g. from a common picking aisle deck 1200S that corresponds with a transfer deck 130B on a respective storage level 130L). As can be seen in FIGS. 1A and 1B there are one or more shelf rails 1210 vertically spaced (e.g. in the Z direction) from one another to form multiple stacked storage spaces 130S each being accessible by the bot 110 from the common rails 1200S. As may be realized, the horizontal support members 1200 also form shelf rails (in addition to shelf rails 1210) on which case units are placed.

Each stacked shelf level 130LS1-130LS4 (and/or each single shelf level as described below) of a corresponding storage level 130L defines an open and undeterministic two dimensional storage surface (e.g. having a case unit support plane CUSP as shown in FIG. 1B) that facilitates a dynamic allocation of pickfaces both longitudinally (e.g. along a length of the aisle or coincident with a path of bot travel defined by the picking aisle) and laterally (e.g. with respect to rack depth, transverse to the aisle or the path of bot travel). Dynamic allocation of the pickfaces and case units that make up the pickfaces is provided, for example, in the manner described in U.S. Pat. No. 8,594,835 issued on Nov. 26, 2013, the disclosure of which is incorporated by reference herein in its entirety. As such, case unit (or tote) pickfaces of variable lengths and widths are positioned at each two dimensional storage location on the storage shelves (e.g. on each storage shelf level 130LS1-130LS4) with minimum gaps G (e.g. that effect picking/placing of case units free from contact with other case units stored on the shelves, see FIG. 1A) between adjacent stored case units/ storage spaces.

In one aspect of the disclosed embodiment a vertical pitch between rack shelf levels 130LS1-130LS4 (that corresponds to each storage level 130L) is varied so that a height Z1A-Z1E between the shelves is different, rather than equal. In other aspects, the vertical pitch between at least some of the rack shelves is the same so that the height Z1A-Z1E between at least some shelves is equal while the vertical pitch between other shelves is different. In still other aspects, the pitch of rack shelf levels 130LS1-130LS4 on one storage level is a constant pitch (e.g. the rack shelf levels are substantially equally spaced in the Z direction) while the pitch of rack shelf levels 130LS1-130LS4 on a different storage level is a different constant pitch.

In one aspect, the storage space(s) 130S defined by the storage shelf levels 130LS1-130LS4 between the storage or deck levels 130L accommodates case units of different heights, lengths, widths and/or weights at the different shelf levels 130LS1-130LS4 as described in, for example, U.S. provisional patent application 62/091,162 filed on Dec. 12, 2014, now U.S. patent application Ser. No. 14/966,978 filed on Dec. 11, 2105, the disclosures of which are incorporated by reference herein in their entireties. For example, still referring to FIG. 1A the storage level 130L includes storage sections having at least one intermediate shelf 1210. In the example shown, one storage section includes one intermediate shelf 1210 while another storage section includes two intermediate shelves 1210 for forming shelf levels 130LS1-130LS4. In one aspect a pitch Z1 between storage levels 130L may be any suitable pitch such as, for example, about 32 inches to about 34 inches while in other aspects the pitch may be more than about 34 inches and/or less than about 32 inches. Any suitable number of shelves may be provided between the decks 1200S of adjacent vertically tacked storage levels 130L where the shelves have the same or differing pitches between the shelves.

Figure 1D:
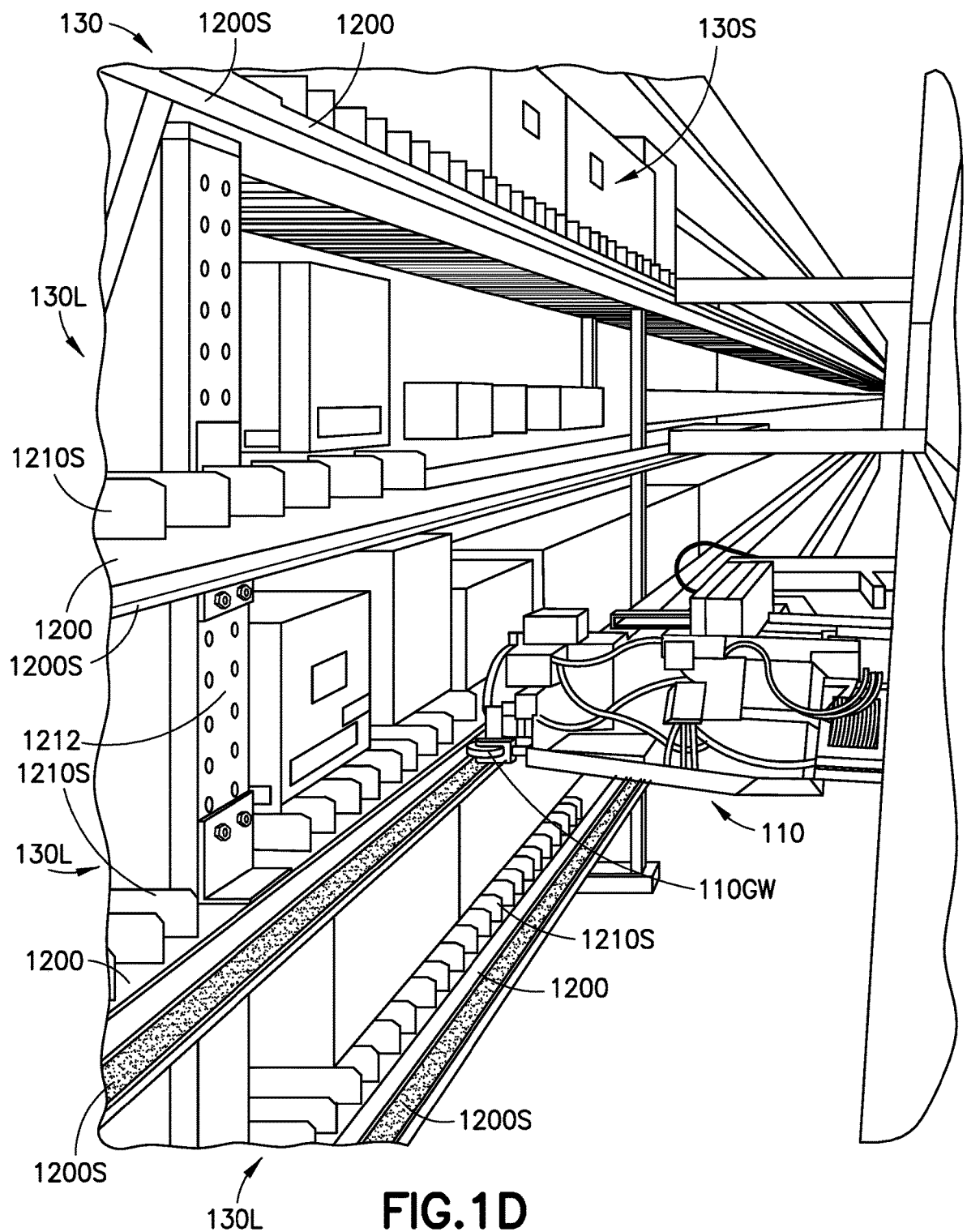
FIG. 1D is a schematic illustration of a portion of the automated storage and retrieval system in accordance with aspects of the disclosed embodiment.
Figure 5:
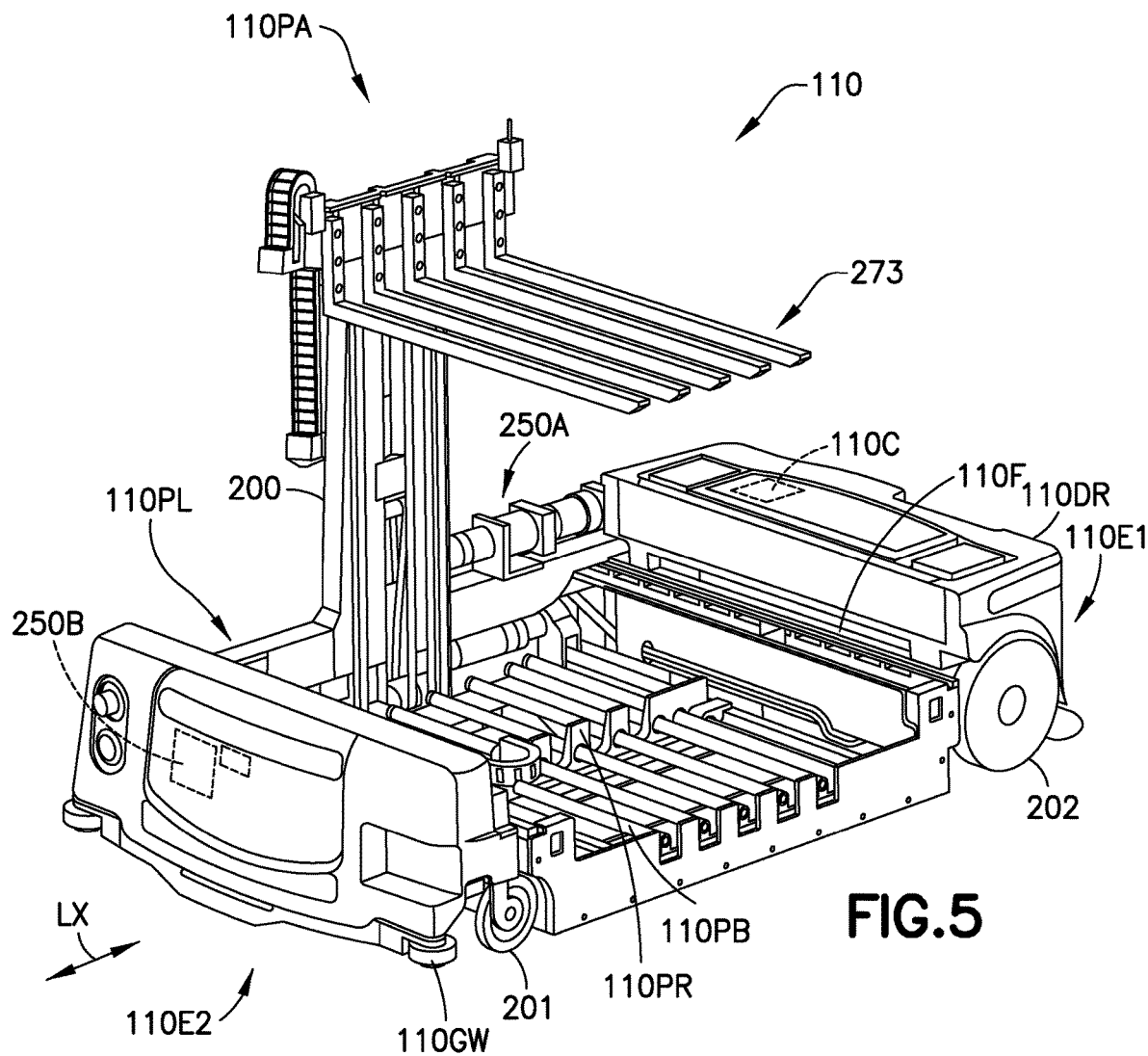
FIGS. 5, 5A and 5B are schematic illustrations of a transport vehicle in accordance with aspects of the disclosed embodiment.
Figure 5A:
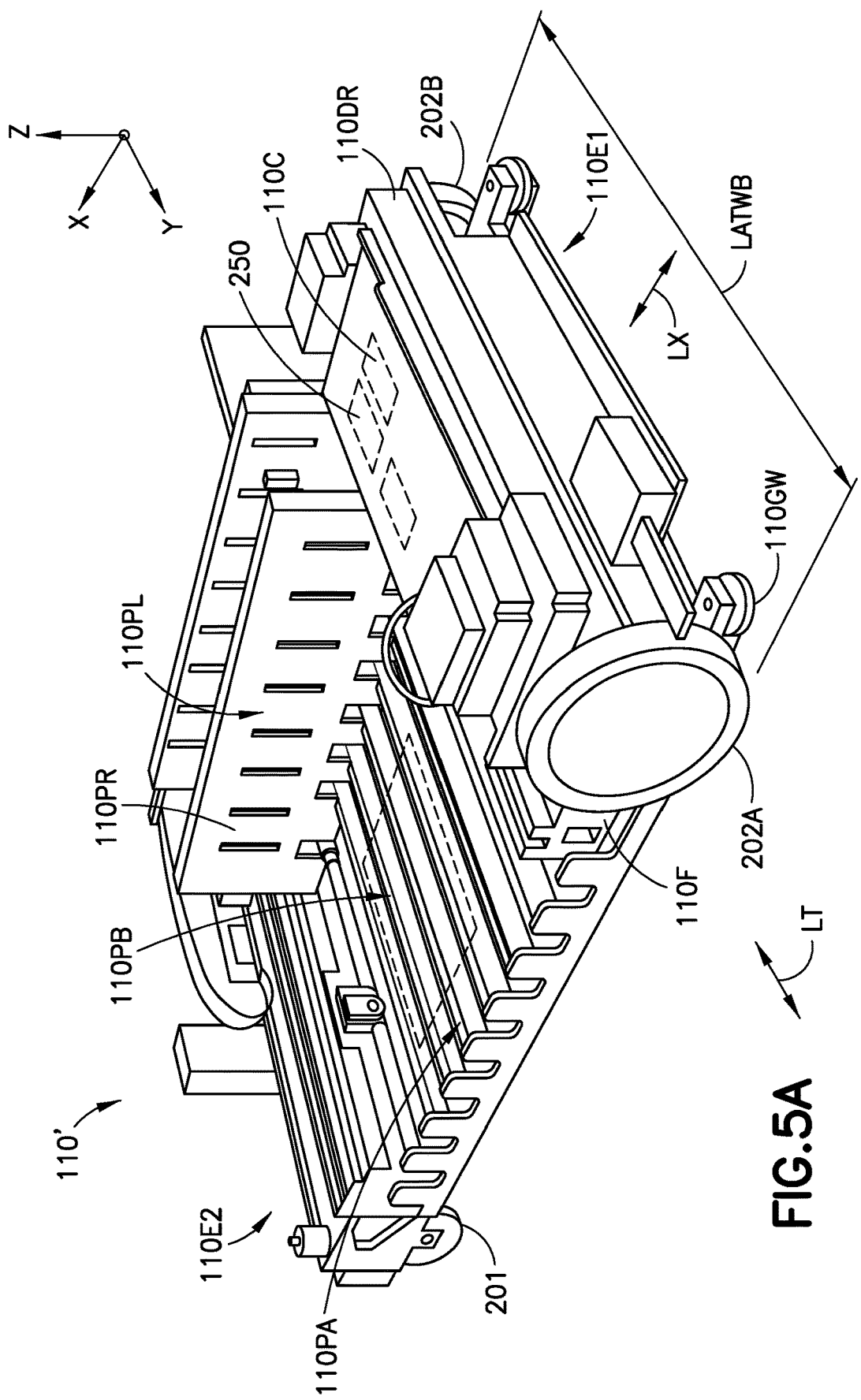

In one aspect, referring to FIGS. 1D and 5A each of the storage levels 130L includes a single level of storage shelves to store a single level of case units (e.g. each storage level includes a single case unit support plane CUSP) and the bots 110 are configured to transfer case units to and from the storage shelves of the respective storage level 130L. For example, the bot 110' illustrated in FIG. 5A is substantially similar to bot 110 described above however, the bot 110' lacks sufficient Z-travel of the transfer arm 110PA for placing case units on the multiple storage shelf levels 130LS1-130LS4 (e.g. accessible from a common rail 1200S) as described above. Here the transfer arm drive 250 (which may be substantially similar to one or more drive 250A, 250B) includes only sufficient Z-travel for lifting the case units from the case unit support plane CUSP of the single level of storage shelves, for transferring the case units to and from the payload area 110PL and for transferring the case units between the fingers 273 of the transfer arm 110PA and the payload bed 110PB. Suitable examples of bots 110' can be found in, for example, U.S. patent application Ser. No. 13/326,993 filed on Dec. 15, 2011 (now U.S. Pat. No. 9,499,338 issued on Nov. 22, 2106), the disclosures of which are incorporated herein by reference in their entireties.

Referring again to FIG. 2A each transfer deck or storage level 130L includes one or more lift pickface interface/ handoff stations TS (referred to herein as interface stations TS) where case unit(s) (of single or combined case pickfaces) or totes are transferred between the lift load handling devices LHD and bots 110 on the transfer deck 130B. The interface stations TS are located at a side of the transfer deck 130B opposite the picking aisles 130A and rack modules RM, so that the transfer deck 130B is interposed between the picking aisles and each interface station TS. As noted above, each bot 110 on each picking level 130L has access to each storage location 130S, each picking aisle 130A and each lift 150 on the respective storage level 130L, as such each bot 110 also has access to each interface station TS on the respective level 130L. In one aspect the interface stations are offset from high speed bot travel lanes or directions HSTP along the transfer deck 130B so that bot 110 access to the interface stations TS is undeterministic to bot speed on the high speed travel lanes or directions HSTP. As such, each bot 110 can move a case unit(s) (or pickface, e.g. one or more cases, built by the bot) from every interface station TS to every storage space 130S corresponding to the deck level and vice versa.

In one aspect, the location of the bot 110 relative to the interface stations TS occurs in a manner substantially similar to bot location relative to the storage spaces 130S. For example, in one aspect, location of the bot 110 relative to the storage spaces 130S and the interface stations TS occurs in a manner substantially similar to that described in U.S. patent application Ser. No. 13/327,035 filed on Dec. 15, 2011 (now U.S. Pat. No. 9,008,884 issued on Apr. 14, 2015) and Ser. No. 13/608,877 filed on Sep. 10, 2012 (now U.S. Pat. No. 8,954,188 issued on Feb. 10, 2015), the disclosures of which are incorporated herein by reference in their entireties. Referring to FIGS. 1, 1B and 2C, as described below, the bot 110 includes one or more locating sensors 110S that detect the locating feature(s) 130F (such as an aperture, reflective surface, RFID tag, ferromagnetic features, etc.) disposed on/in the rail 1200. The locating features 130F are arranged so as to identify a location of the bot 110 within the storage and retrieval system, relative to e.g. the storages spaces and/or interface stations TS. In one aspect the location features 130F may be arranged so as to form an absolute or incremental encoder which when detected by the bot 110 provides for a bot 110 location determination within the storage and retrieval system 100.

Figure 2C:
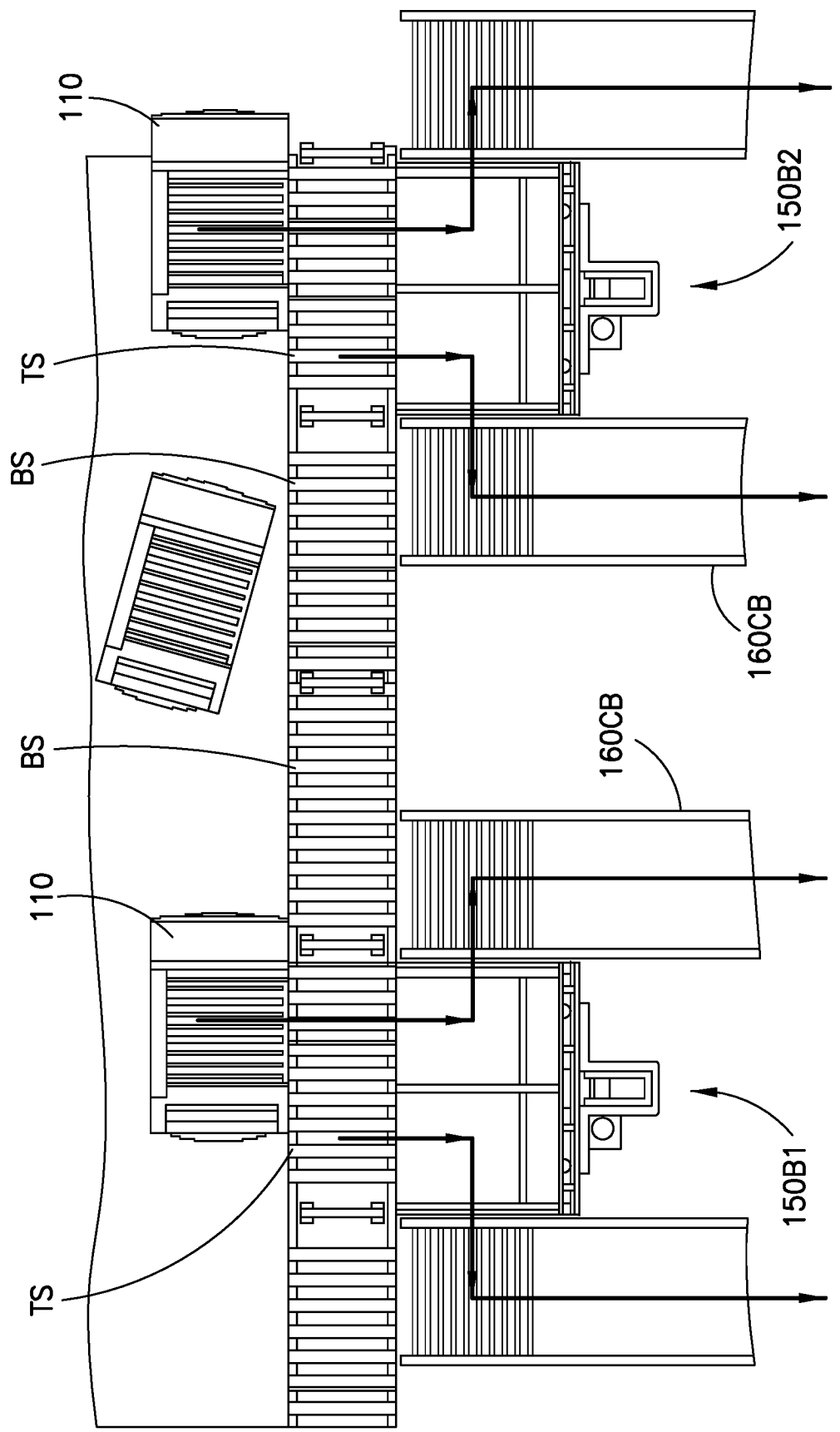

As may be realized, referring to FIG. 2B, the transfer rack shelves RTS at each interface/handoff station TS define multi-load stations (e.g. having one or more storage case unit holding locations for holding a corresponding number of case units or totes) on a common transfer rack shelf RS. As noted above, each load of the multi-load station is a single case unit/tote or a multi-case pickface (e.g. having multiple case units/totes that are moved as a single unit) that is picked and paced by either the bot or load handling device LHD. As may also be realized, the bot location described above allows for the bot 110 to position itself relative to the multi-load stations for picking and placing the case units/ totes and pickfaces from a predetermined one of the holding locations of the multi-load station. The interface/handoff stations TS define buffers where inbound and/or outbound case units/totes and pickfaces are temporarily stored when being transferred between the bots 110 and the load handling devices LHD of the lifts 150.

Figure 5B:
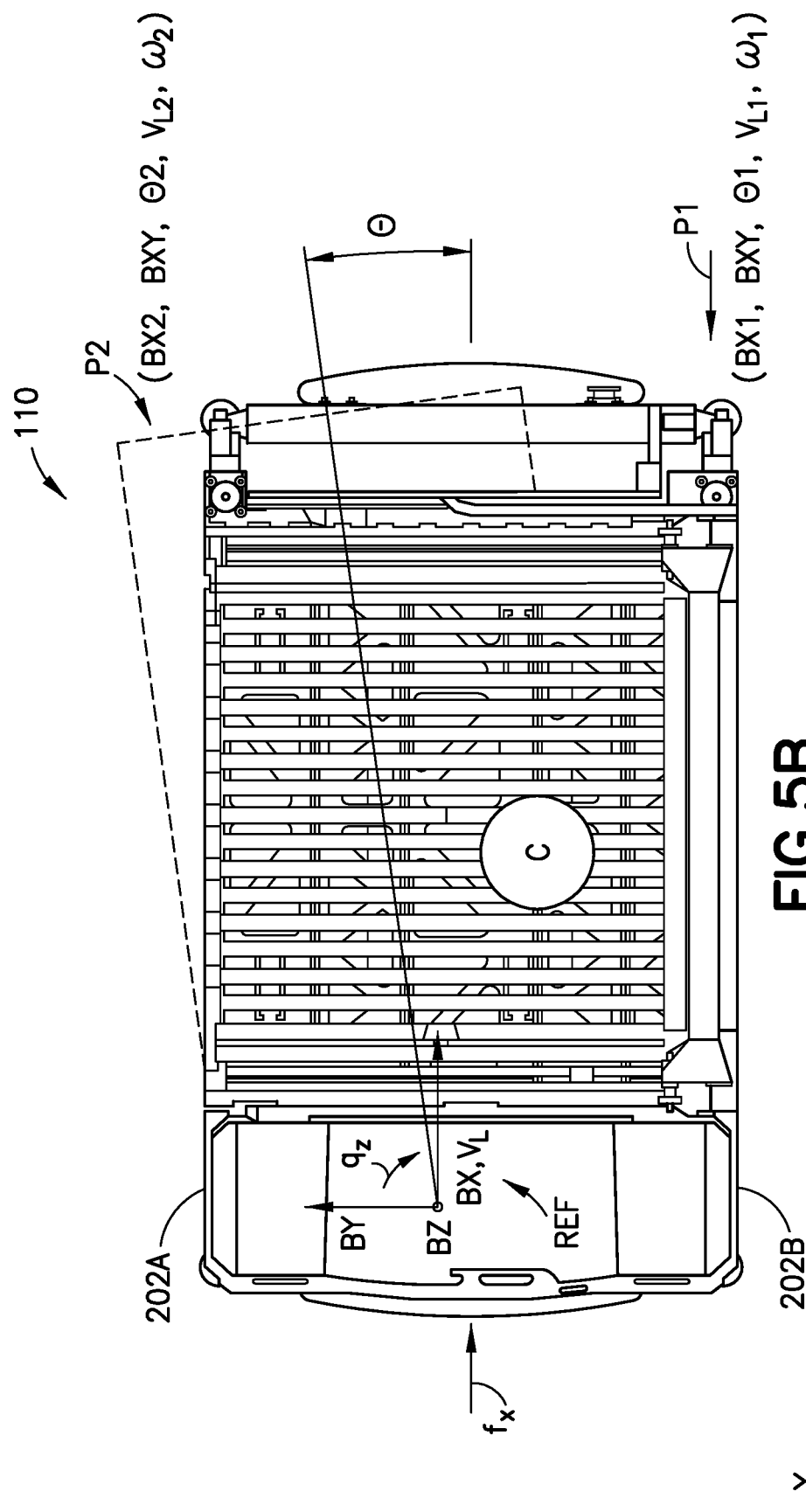

Referring now to FIGS. 5, 5A and 5B, the bots 110 may be any suitable independently operable non-holonomic autonomous transport vehicles that carry and transfer case units throughout the storage and retrieval system 100. In one aspect the bots 110 are automated, independent (e.g. free riding) autonomous transport vehicles. Suitable examples of bots can be found in, for exemplary purposes only, U.S. patent application Ser. No. 13/326,674 filed on Dec. 15, 2011; U.S. patent application Ser. No. 12/757,312 filed on Apr. 9, 2010 (now U.S. Pat. No. 8,425,173 issued on Apr. 23, 2013); U.S. patent application Ser. No. 13/326,423 filed on Dec. 15, 2011 (now U.S. Pat. No. 9,561,905 issued on Feb. 7, 2017); U.S. patent application Ser. No. 13/326,447 filed on Dec. 15, 2011 (now U.S. Pat. No. 8,965,619 issued on Feb. 24, 2015); U.S. patent application Ser. No. 13/326,505 Dec. 15, 2011 (now U.S. Pat. No. 8,696,010 issued on Apr. 15, 2014); U.S. patent application Ser. No. 13/327,040 filed on Dec. 15, 2011 (now U.S. Pat. No. 9,187,244 issued on Nov. 17, 2015); U.S. patent application Ser. No. 13/326,952 filed on Dec. 15, 2011; U.S. patent application Ser. No. 13/326,993 filed on Dec. 15, 2011 (now U.S. Pat. No. 9,499,338 issued on Nov. 22, 2016); U.S. patent application Ser. No. 14/486,008 filed on Sep. 15, 2014; and U.S. provisional patent application No. 62/107,135 filed on Jan. 23, 2015 (now U.S. patent application Ser. No. 15/003,983 filed on Jan. 22, 2016), the disclosures of which are incorporated by reference herein in their entireties. The bots 110 (described in greater detail below) may be configured to place case units, such as the above described retail merchandise, into picking stock in the one or more levels of the storage structure 130 and then selectively retrieve ordered case units.

As noted above, the bot 110 includes a transfer arm 110PA that effects the picking and placement of case units from the stacked storage spaces 130S, interface stations TS and peripheral buffer stations BS, BSD defined at least in part, in the Z direction) by one or more of the rails 1210A-1210C, 1200 (e.g. where the storage spaces, interface stations and/or peripheral buffer stations may be further defined in the X and Y directions, of the storage and retrieval system 100 reference frame REF2, through the dynamic allocation of the case units as described above). The bots 110, as noted above, transport case units between each lift module 150 and each storage space 130S on a respective storage level 130L. The bots 110 include a frame 110F having a drive section 110DR and a payload section 110PL. The drive section 110DR includes one or more drive wheel motors 202MA, 202MB each connected to a respective drive wheel(s) 202A, 202B (generally referred to as drive wheels 202) of a non-holonomic steering system. The drive section is configured to propel the bot 110 at high speeds through the storage structure 130. For example, the motors 202MA, 202MB (with no motor speed reduction or speed increase to the wheels, e.g. there is a 1:1 coupling between the motors and their respective drive wheel) are configured to provide the bot 110 with a singular source of propulsion and steering by effecting torque under bang-bang or maximum torque control to each respective drive wheel 202 producing linear forces and rotational torque on the bot 110 that result in any suitable acceleration/deceleration rates (e.g., both linear acceleration ($\dot{v}$) and angular acceleration ($\omega$) and any suitable bot 110 travel speeds (V, $\omega$). For exemplary purposes only the motors 202MA, 202MB are configured to provide the bot 110 (while the bot 110 is loaded with a full capacity payload) a rate of acceleration/deceleration of about 3.048 m/sec$^2$, a transfer deck 130B (and aisle 130A) travelling speed in excess of about 20 km/hr (e.g. about 5.6 m/sec) and more particularly about 32 km/hr (e.g. about 9.144 m/sec) or about 36 km/hr (e.g. about 10 m/sec). As noted before, the high speed is such that the bot inertial effects (for an empty bot 110 and/or carrying a payload having a weight as described above) and motion dynamics (for the maximum motor torque) assert a substantial effect on control of bot 110 traverse path (e.g. including curvature of the path) and kinematic trajectory/state (P, V, a, and t) along the path. The high speed travel of the bot 110 described herein is effected at least in part by a resolution of the navigation array 3000 (FIG. 4) features coincident with control of the bot 110 and performance of time optimal trajectories (that are generated/processed by the bot 110 coincident with bot travel) where the time-optimal trajectories include pose resolution of the bot during high speed travel that is dependent on the features of the navigation array 3000. In one aspect, as will be described in greater detail below, bot navigation is effected at the high speeds described herein with, for example, based singularly on index or line following sensors 6000 (FIG. 6) while in other aspects any suitable type(s) and number of sensors are used such as line following sensors, accelerometers, gyroscopes, GPS sensors, inductive sensors, capacitive sensors, infrared sensors, sonar/sonic sensors, etc. or any combination thereof.

In this aspect the non-holonomic bot 110 includes two drive wheels 202A, 202B located on opposite sides of the bot 110 at end 110E1 (e.g. first longitudinal end) of the bot 110 for supporting the bot 110 on a suitable drive surface however, in other aspects any suitable number of drive wheels are provided on the bot 110. In one aspect each drive wheel 202A, 202B is coupled substantially directly to a respective motor 202MA, 202MB such that the drive wheel 202A, 202B is coupled to an output of the motor 202MA, 202MB without a speed reduction unit disposed therebetween (e.g. so that each motor 202MA, 202MB and the respective drive wheel 202A, 202B form a reductionless drive). Each drive wheel 202A, 202B is independently controlled so that the bot 110 may be steered through a differential rotation of the drive wheels 202A, 202B (e.g. differential torque steering) while in other aspects the rotation of the drive wheels 202 may be coupled so as to rotate at substantially the same speed. Any suitable steering wheels 201 are mounted to the frame on opposite sides of the bot 110 at end 110E2 (e.g. second longitudinal end) of the bot 110 for supporting the bot 110 on the drive surface. In one aspect the wheels 201 are caster wheels that freely rotate allowing the bot 110 to pivot through differential rotation of the drive wheels 202 for non-holonomically changing a travel direction of the bot 110. In other aspects the wheels 201 are steerable wheels, such as for example articulated wheel steering, that turn under control of, for example, a bot controller 110C (which is configured to effect control of the bot 110 as described herein) for changing a travel direction of the bot 110. In other aspects the bot 110 includes any suitable wheel arrangement (e.g. a three wheel configuration, a four wheel configuration, etc.). In one aspect the bot 110 includes one or more guide wheels 110GW located at, for example, one or more corners of the frame 110F. The guide wheels 110GW may interface with the storage structure 130, such as guide rails 1200 (FIG. 1D) within the picking aisles 130A, guide rails (not shown) on the transfer deck 130B and/or at interface or transfer stations for interfacing with the lift modules 150 for guiding the bot 110 and/or positioning the bot 110 a predetermined distance from a location to/from which one or more case units are placed and/or picked up as described in, for example, U.S. patent application Ser. No. 13/326,423 filed on Dec. 15, 2011 (now U.S. Pat. No. 9,561,905 issued on Feb. 7, 2017) the disclosures of which are incorporated herein by reference in their entireties. In other aspects location of the bot 110 at the predetermined distance from a location to/from which one or more case units are placed and/or picked up is effected in any suitable manner such as with sonar/sonic sensors, index or line following sensor, GPS sensors, inductive sensors, capacitive sensors, infrared sensors, etc. of the bot 110 or any combination thereof. As noted above, the bots 110 may enter the picking aisles 130A having different facing directions for accessing storage spaces 130S located on both sides of the picking aisles 130A. For example, the bot 110 may enter a picking aisle 130A with end 110E2 leading the direction of travel or the bot may enter the picking aisle 130A with end 110E1 leading the direction of travel.

The lift mechanism 200 may be substantially similar to that described in U.S. provisional patent application No. 62/107,135 filed on Jan. 23, 2015 (now U.S. patent application Ser. No. 15/003,983 filed on Jan. 22, 2016), both of which were previously incorporated by reference herein in their entireties, and be configured so that combined robot axis moves are performed (e.g. combined substantially simultaneous movement of the pusher bar 110PR, lift mechanism 200, pick head extension and fore/aft justification mechanism(s) such as, e.g., the longitudinally movable pusher bar described above), so that different/multi-sku or multi-pick payloads are handled by the bot. In one aspect, the actuation of the lifting mechanism 200 is independent of actuation of the pusher bar 110PR. The decoupling of the lift mechanism 200 and pusher bar 110PR axes provides for combined pick/place sequences effecting a decreased pick/place cycle time, increased storage and retrieval system throughput and/or increased storage density of the storage and retrieval system as described above. For example, the lift mechanism 200 provides for picking and placing case units at multiple elevated storage shelf levels accessible from a common picking aisle and/or interface station deck 1200S as described above.

As described herein, referring again to FIGS. 4 and 6, the bot 110 is configured to transport pickfaces between the picking aisles 130A, the transfer/handoff stations TS and buffer stations BS (FIGS. 2A-3C). As such, the bot 110 includes navigation sensors 110NS (FIG. 1) connected to the controller 110C for allowing the bot 110 to travel through the storage structure 130. In one aspect the navigation sensors include line following or index sensors 6000 and/or any suitable sensors (e.g. capacitive, inductive, optical, etc.) for following apertures, grooves, tracks, etc. (in the form of or forming lines) formed in or on the transfer deck 130B or an edge or rail of the transfer deck. In other aspects other navigation sensors, such as indoor/outdoor GPS sensors are provided for bot 110 navigation. In one aspect the bot 110 includes wheel odometers 6021 (FIG. 6) for sensing a distance travelled by each drive wheel 202A, 202B (FIG. 6) or any other suitable wheel of the bot 110 where at least a bot pose relative to the transfer deck is determined with only wheel odometry while in other aspects bot pose is determined with one or more of wheel odometry, accelerometers, gyroscopes and any other suitable sensors on the bot 110. In one aspect, any suitable filters, such as Kalman filters, are used when determining bot pose to filter out erroneous or spurious data for improving the accuracy of the bot pose determination. As will be described in greater detail below, in one aspect, the line following or index sensors 6000 alone are sufficient to singularly determine and effect high speed bot navigation and allow for bot 110 transition between navigation features LONG1-LONG3, LAT1-LAT7 (while the bot 110 is travelling at the high speeds described herein) where during the transition between the navigation features the line following or index sensors 6000 lose contact (i.e., exit sensory range and lose sensory perception) with a first navigation feature (e.g. a feature being departed from) before obtaining contact (i.e., enter sensory range and obtain sensory perception) with a second navigation feature (e.g. a feature being arrived at). In other words, at least a portion of the path along which the bot 110 travels on the transfer deck 130B is disposed so that as the bot 110 travels on the path, bot pose sensors (such as index sensor 6000) determining bot pose, when at a first location such as at a node or waypoint, depart sensors range of the navigation array features LONG1-LONG3, LAT1-LAT7 capable of determining bot pose prior to acquisition of new sensor data from the bot pose sensors (such as index sensor 6000) of navigation array features LONG1-LONG3, LAT1-LAT7 capable of determining bot pose. In other aspects, any number and types of the navigation sensors 110NS may effect high speed bot 110 navigation along the transfer deck 130B.

To effect the transport of pickfaces and to effect movement of the bot generally along the transfer deck 130B, the bot 110 includes controller 110C having a bot positioning module 6090 and a motion control subsystem 6091. The bot positioning module 6090 includes a navigation sensor detection system 6010, a motion positioning system 6020, a bot positioning processing system 6030, a bot navigation trajectory generator 6040, a bot velocity and position system controller and a bot trajectory following controller 6060. In one aspect the navigation sensor detection system 6010 includes the index sensors 6000 for detecting features, such as guidelines LONG1-LONG3, LAT1-LAT7, of the navigation feature array 3000 and providing an initial or first position estimate of the bot with respect to the transfer deck 130B (and/or other features of the storage structure 130 such as aisles 130A, transfer stations TS and buffer stations BS). In one aspect, as noted above, the index or line following sensors alone detect the features, such as travel lanes or guidelines LONG1-LONG3, LAT1-LAT7 for effecting a determination of the first position estimate while the bot 110 is travelling at the high speeds described herein. In other aspects, the navigation sensor detection system 6010 includes an array of sensors 6001 (including one or more of those sensors described above with respect to the navigation sensors 110NS) for detecting features (which in one aspect include travel lanes or guidelines LONG1-LONG3, LAT1-LAT7 or any other suitable features) of the navigation feature array 3000 and for effecting (along with the index sensors 6000 or with the array of sensors alone) the determination of the first position estimate. For example, each of the travel lanes LONG1-LONG3, LAT1-LAT7 is disposed at a respective predetermined location of the transfer deck so that when the travel lanes LONG1-LONG3, LAT1-LAT7 are detected or sensed by the bot 110 a pose estimate, in at least one direction, of where the bot 110 is located and oriented on the transfer deck 130B can be made by the navigation sensor detection system 6010.

The motion positioning system 6020 includes or is configured to obtain data from the wheel odometers 6021, described above, which are configured to track a distance which each of the drive wheels 202A, 202B travelled (or any other suitable wheels such as wheels 201). In one aspect, where the bot pose is not determined by or in conjunction with wheel odometry, the motion positioning system 6020 also includes an onboard bot pose determining module 6022 that includes any suitable sensors for determining bot pose such as accelerometers and gyroscopes that produce, for example, position, velocity, roll, pitch and yaw data of the bot 110. In one aspect, the motion positioning system 6020 relies on the wheel odometry data singularly (and in other aspects employs both the wheel odometry data and the bot pose data) to determine bot pose and a second position estimate of the bot 110 relative to at least the transfer deck 130B (such as serving as primary input to the motion positioning system 6020 continuously updating bot 110 pose as the bot 110 traverses the deck 130B along a traverse path, for example, at high speed).

The bot positioning processing system 6030 is configured to receive (and the navigation sensor detection system 6010 and the motion positioning system 6020 are configured to send) the first and second position estimates from the navigation sensor detection system 6010 and the motion positioning system 6020. The bot positioning processing system 6030 is configured to combine the first and second position estimates in any suitable manner to determine a third position estimate that is more accurate than either one of the first and second position estimates. The bot positioning processing system 6030 is, in one aspect, also configured to eliminate or filter, in any suitable manner, erratic or spurious third position estimates which may cause bot 110 wandering off of or from a predetermined path of travel.

The bot navigation trajectory generator 6040 includes any suitable map 6041 of the storage structure 130 that includes the transfer deck 130B and the navigation feature array 3000 disposed on the transfer deck 130B. In one aspect, the map 6041 includes, for example, the positions of the aisles 130A, the buffer stations BS, transfer stations TS, driveways 130BW, etc. with respect to the transfer deck 130B, with respect to each other and with respect to the navigation features array 3000. The bot navigation trajectory generator 6040, in one aspect also includes a plurality of predetermined, time-optimal, trajectories 6042 determined based on the bot 110 dynamic model (as will be described further below) and defining traverse paths along which the bot 110 can travel. Though predetermined, the time-optimal (i.e. unparameterized) trajectories, in accord with one aspect, are resident (at least in part to singularly effect complete navigation from an initial position to a final position/destination) on the bot 110 onboard controller (e.g., in the bot navigation trajectory generator 6040) and are dynamically selectable by the bot navigation trajectory generator 6040 both on the fly during a commenced traverse/move and/or prior to commencing a move. For example, referring again to FIGS. 4 and 6A the bot navigation trajectory generator 6040 includes a table or library 6042T of predetermined time-optimal trajectories (based on at least one bot 110 dynamic model for a given set of bot inertial conditions and bot 110 dynamic characteristics) that each define a corresponding bot path to smoothly branch from a linear direction associated with one navigation feature LONG1-LONG3, LAT1-LAT7 and smoothly merge onto another different (or the same) navigation feature LONG1-LONG3, LAT1-LAT7. As will be described further below, the trajectories may be embodied efficiently in the table 6042T as wheel torques (left wheel torque $T_L$, right wheel torque $T_R$) (e.g., respective left/right wheel maximum torque at rated current for the bot 110 power source, and corresponding switch times for each respective torque (e.g., $(T_L, t_L)/(T_R, t_R)$). As noted, and as may be realized, the trajectories so described are time-optimal, applying maximum torque consistent with what is known in the field as "bang-bang" control and are shown in, e.g., FIG. 6A for illustrative purposes only as representative curves of traverse paths (also referred to herein as paths) defined by a corresponding trajectory. For example, the time-optimal trajectories 6042T allow the bot 110 to smoothly transition, while travelling at the high speeds described herein, along a smooth curved (curve, curves, or curvature is used generally herein to refer to traverse path lines with concave/convex shape, through the techniques applied herein are equally applicable to path lines with flat curves that will be expressly identified as such) path defined by the corresponding trajectory between two navigation features arranged along a common direction (e.g. such as between one or more of the longitudinal navigation features LONG1-LONG3 or between one or more of the lateral navigation features LAT1-LAT7) and/or between two navigation features that are arranged in different directions (e.g. such as between longitudinal navigation features LONG1-LONG3 and lateral navigation features LAT1-LAT7, see FIG. 4). In one aspect the time-optimal trajectories 6042T, based on bot dynamic model(s), are categorized or catalogued, in the table 6042T, in any suitable manner. In one aspect, the trajectories are according to their respective characteristics shown categorized according to linear length L, L1, . . . , Ln along the curved path defined by the corresponding trajectory where the length L, L1, . . . , Ln corresponds to a linear distance to be travelled by the bot 110 between positions P1 (BX1, BY1) and P2 (BX2, BY2) defined within the bot 110 map coordinate system REF as specified in a bot motion command received from, for example, controller 120.

Figure 6:
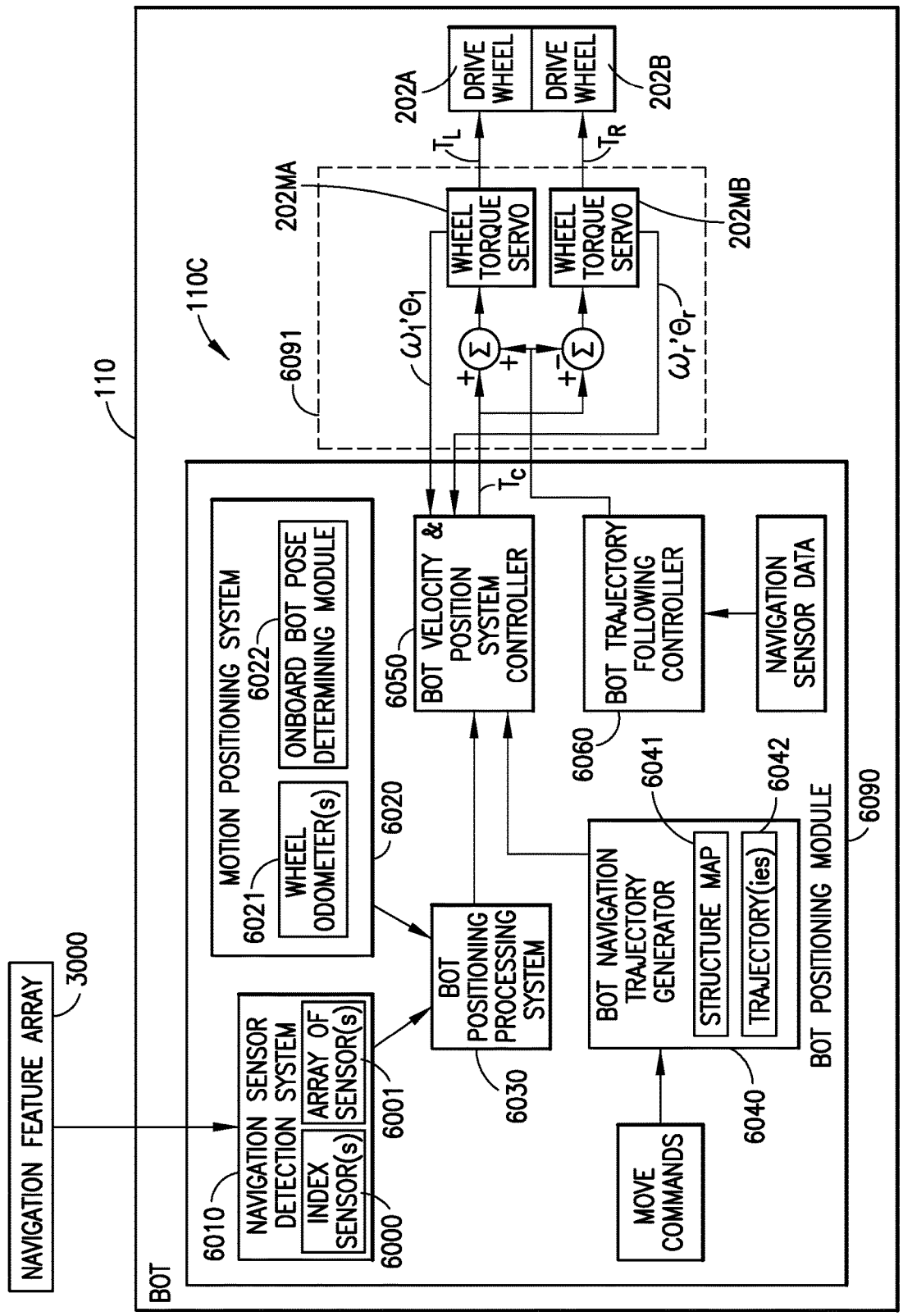
FIG. 6 is a schematic illustration of a portion of a transport vehicle in accordance with aspects of the disclosed embodiment.

By way of further example, FIG. 6B shows different representative curve paths, each path being defined/generated by (and thus representative of) a different corresponding time-optimal, dynamic model based trajectory for different bot 110 boundary conditions at the start and end of the curve path (e.g., bot 110 pose P1 (see FIG. 5B) (BX1, BY1, θ1, $V_{L1}$, ω$_1$) initially on commencing traverse on the curve path; bot 110 pose P2 (see FIG. 5B) (BX2, BY2, θ2, $V_{L2}$, ω$_2$) at the end of the traverse on the curve path; where (BXi, BYi) are respective location coordinates, θi is the yaw of the bot longitudinal axis from the system reference axis REF2 (e.g., the X axis), $V_{Li}$ is the linear velocity of the bot 110 along the path, and ω$_i$ is the rotational velocity of the bot (i.e., θ̇)). The traverse paths shown in FIG. 6B here serve to representatively illustrate examples of different predetermined time-optimal trajectory solutions based on the bot 110 dynamic model, each for different boundary conditions, as noted, and coincidentally the resultant bot 110 path effected by the different predetermined trajectory is selected by the bot navigation trajectory generator 6040. FIGS. 6C and 6D respectively illustrate the velocity ($V_L$, ω$_t$) profile and the left/right drive wheel motor current plot ($I_L$, $t_L$; $I_R$, $t_R$) over time of the example trajectory BTX illustrated in FIG. 6B, where $V_L$ is the linear velocity of the bot 110 along the path (i.e., the $V_L$ vector remains for purposes of this description) aligned with the bot 110 longitudinal axis), ω is the rotational velocity; $I_L$, $I_R$ are the respective motor currents for the left and right drive wheels, and t is time. As may be realized, the motor currents $I_L$, $I_R$ are determinative of the respective motor torque to the corresponding drive wheels 202A, 202B according to the general relation $T_{L/R}=k_t I_{L/R}$, where $k_t$ is the manufacturer rated motor torque constant. The bot 110 motor torques, provide the drive 110DR force $f_x$ (at the contact patches of the drive wheels 202A, 202B to the bot 110 rolling surface, such as the surface of the transfer deck 130B or floor) along the bot 110 longitudinal axis BX, and the yaw torque q$_z$ (by differential drive forces between the respective drive wheels 202A, 202B) collectively referred to herein as the wrench ($f_x$, q$_z$) available from the wheel motors 202MA, 202MB that may be expressed by the relationship below:

$$f_{x\ motor} = \frac{k_t(I_L + I_R)}{R_{wheel}}$$

-continued $$q_{z\,motor} = \frac{k_t(I_R - I_L) * \text{Wheelbase}}{2 * R_{wheel}}$$

where $k_t$ is the motor torque constant, $I_L$ and $I_R$ are the left and right motor currents, $R_{wheel}$ is the wheel radius, and Wheelbase is the distance LATWB (e.g., wheel track) between the wheels 202A, 202B.

As noted before, the available wrench ($f_x$, $q_z$) is applied in a time-optimal manner, thus generating a time-optimal trajectory (i.e., motor torque $T_{L/R}$ for all (both) drive wheels 202A, 202B is at maximum (positive or negative) usable torque throughout execution of and resultant traverse of the curved path) from the beginning point to finish and so that the curved path defined by the time-optimal trajectory is smooth. For example, the bot 110 velocity $V_L$ along the path is constant as illustrated in FIG. 6B. The maximum usable torque may be the maximum commanded torque from the drive motor(s) 202MA, 202MB set for routine (i.e., non-disturbance, non-emergency) conditions and moves. As may be further realized, the applied wrench ($f_x$, $q_z$) is the maximum wrench available from the motors 202MA, 202MB throughout the trajectory (from start to finish) transcribing the smooth path throughout, with the outside (with respect to the curve) drive wheel 202A, 202B at maximum (positive) usable torque (so as to maintain $V_L$ constant and resultant smooth path without discontinuities) and the inside (with respect to the curve) at maximum (negative) useable torque, and switching therebetween at switch times (see, e.g., FIG. 6C) determined based on the bot 110 dynamic model and boundary conditions at the beginning and end of the trajectory as noted above and further described below. In other aspects, the linear velocity $V_L$ of the trajectory may be allowed to vary, such as by having a steady or constant linear acceleration (or deceleration) of the bot 110 and with a continuous linear velocity $V_L$ during a desired portion (or all) of the trajectory, given the maximum available wrench ($f_x$, $q_z$) so as to generate a time-optimal trajectory transcribing a smooth curve path between beginning and end of the trajectory. The time-optimal trajectory is thus determined (as noted above from motor torque/current versus switch time plots similar to that shown in FIG. 6C) for different predetermined boundary conditions (at the beginning and end of the trajectory) of desired bot motion, so that different predetermined time-optimal trajectories are generated, each corresponding to (and characterized by) its beginning boundary conditions and thus, each of the trajectories may be figuratively characterized by the shape of the resultant curve path defined by the given trajectory (see FIG. 6B that shows different paths, each characterizing the corresponding time-optimal trajectory), which curve path is coincidentally effected in executing the given time-optimal trajectory as seen in FIG. 6B, for boundary conditions in which initial and final velocities have a common heading and offset positions (ΔBX, ΔBY) (or linear lengths L) from initial and final ends of the trajectory.

The time-optimal trajectories have a general "S" shape curve path characteristic, and a set of one or more predetermined time-optimal trajectories may be generated for different offset/length conditions and initial/final velocity conditions (e.g., determined by the boundary conditions as noted). Thus, as shown in the example illustrated in FIG. 6B, the predetermined time-optimal solutions (based on bot dynamic model(s)) may be grouped according to common characterizing boundary conditions (e.g., path shape) and sub-grouped according to other desired common characteristics (e.g., common initial velocity) so that group/set GBTA-GBTD are path shape sets representing time-optimal trajectories with a common initial velocity with the shapes of the trajectories in each set GBTA-GBTD being for different predetermined initial/final offset positions (ΔBX, ΔBY) or path length L. Though these curve shapes are shown for predetermined trajectory sets GTBA-GTBD, each set may have more or fewer predetermined time-optimal trajectories according to the desired range of motion of the bot 110 (and the boundary conditions arising therefrom). Thus, as illustrated, trajectory set GBTA may include one time-optimal trajectory solution for the corresponding initial velocity where other time-optimal solutions at the same initial velocity and different (e.g., larger) lengths L may not share the characteristic path shape and hence may be grouped with other time-optimal solutions (e.g., opposing end turns at constant or variable rates) such as will be described below.

It is noted that the time-optimal trajectory being predetermined refers to the time-optimal trajectory being generated by the bot controller, when executing the bot move, as the path shape and motion profile on the path to be followed by the bot, and not necessarily that the time-optimal trajectory is preprogrammed in the bot controller, though some elements of the time-optimal trajectory may be preprogrammed in the bot controller as further described herein. As may be realized from the above, the predetermined solutions may be stored in the trajectory(ies) 6042 section of the bot navigation trajectory generator 6040 (see FIG. 6) embodied as the corresponding predetermined motor current $I_L$, $I_R$ and reference switch times $t_{L,\,R}$, grouped or sorted by characteristic sets of solutions. The bot navigation trajectory generator 6040 is configured to dynamically select (on the fly with the bot 110 in motion, or prior to the bot 110 commencing motion) one or more predetermined solution(s) of the trajectory(ies) 6042 section matching the bot 110 pose and state determination, at a current position/location and/or at some future, and commanded destination (including position offset/traverse length from a current pose, orientation, velocity) to solution set characteristics (e.g., "S" paths) and then to one or more predetermined solutions within a set GBTA-GBTD to dynamically select matching solution(s) from the stored sets of solutions.

Referring now to FIGS. 4, 7A, and 7B, exemplary bot traverse paths of bot 110 are shown in accordance with aspects of the disclosed embodiment. As may be realized these transport paths may be for any suitable bot such as, for example, the bots 110 described herein. As may also be realized t time-optimal trajectory may be generated in accordance with aspects of the disclosed embodiments for each of these exemplary traverse paths. It is noted that the term "traverse path" as used herein and depicted in the drawings refers to the physical traverse paths of the bots 110 on/along the undeterministic surface defined by the open undeterministic transfer deck 130B or floor between locations thereon. It is noted that the traverse paths may include one or more segments (such as those described herein with respect to FIGS. 6A and 6D) that are joined to each other to form the traverse path. The term "trajectory" of the traverse path includes kinematic properties of the bot 110 such as, for example, acceleration, velocity, etc. moving along and defining the traverse path.

As described above, any suitable controller, such as controller 110C of the bot 110, may be configured as a bang-bang controller for generating time-optimal motions of the bot 110 using maximum power of the bot 110 drive section 110DR. It is noted the aspects of the disclosed embodiment allow for the generation of otherwise predetermined bot 110 unparameterized bot 110 trajectories having motor torque (e.g. maximum torque/peak usable torque) and/or boundary constraints for, e.g., different bot 110 payload applications or any other velocity, acceleration, etc. constraints. The term unparameterized as used herein with respect to the generated trajectories means that the trajectory and traverse path characteristics are unconstrained as to the curve or shape of the trajectory (either with respect to time or in the position-velocity reference frame or space) such that a time-optimal trajectory shape is achieved within the noted constraints of available bot 110 maximum motor torque (e.g., the desired maximum usable torque for the maximum available current from the bot 110 power source, and other bot dynamic models (e.g., mass, moment of inertia, radius of drive wheels, drive wheel base, etc.) and initial and final inertial conditions). In accordance with the aspects of the disclosed embodiment, trajectories can be generated for each of the traverse path segments such that optimal (shortest) move times (e.g. bot 110 traverse times between a starting point of the traverse path and an ending point of the traverse path) are achieved for given maximum drive torque constraints. Further, peak torque requirements for drive components, such as motors and/or gear boxes (if any), can be reduced (with or without shorter move times) leading to lower costs associated with the bot 110, reduced size of the drive components, and/or increased life of the bot 110.

The aspects of the disclosed embodiment address the deficiencies of existing trajectory generation methods which generally do not take into consideration torque constraints or generally do not produce a smooth commanded trajectory. The term "smooth" or "smoothness" as used herein with respect to the generated trajectories refers to a continuous linear velocity along the curved traverse path over time. It is noted that a discontinuity in linear velocity is generally not practically achievable, given the bot 110 inertial and dynamic characteristics at high and medium speeds, and undesired.

In other aspects, the time-optimal trajectories are categorized based on bot 110 dynamic model characteristics and/or other boundary conditions, such as a bot payload (e.g., empty or loaded bot), payload mass and/or size where more massive payloads and/or denser payloads (e.g., resulting in bot mass center eccentricity) may define larger radius/curved turns at the high speeds. In other aspects, the trajectories are categorized based on one or more of a distance to be travelled by the bot 110 and a payload weight/mass and/or size/mass distribution or payload density.

Figure 6A:
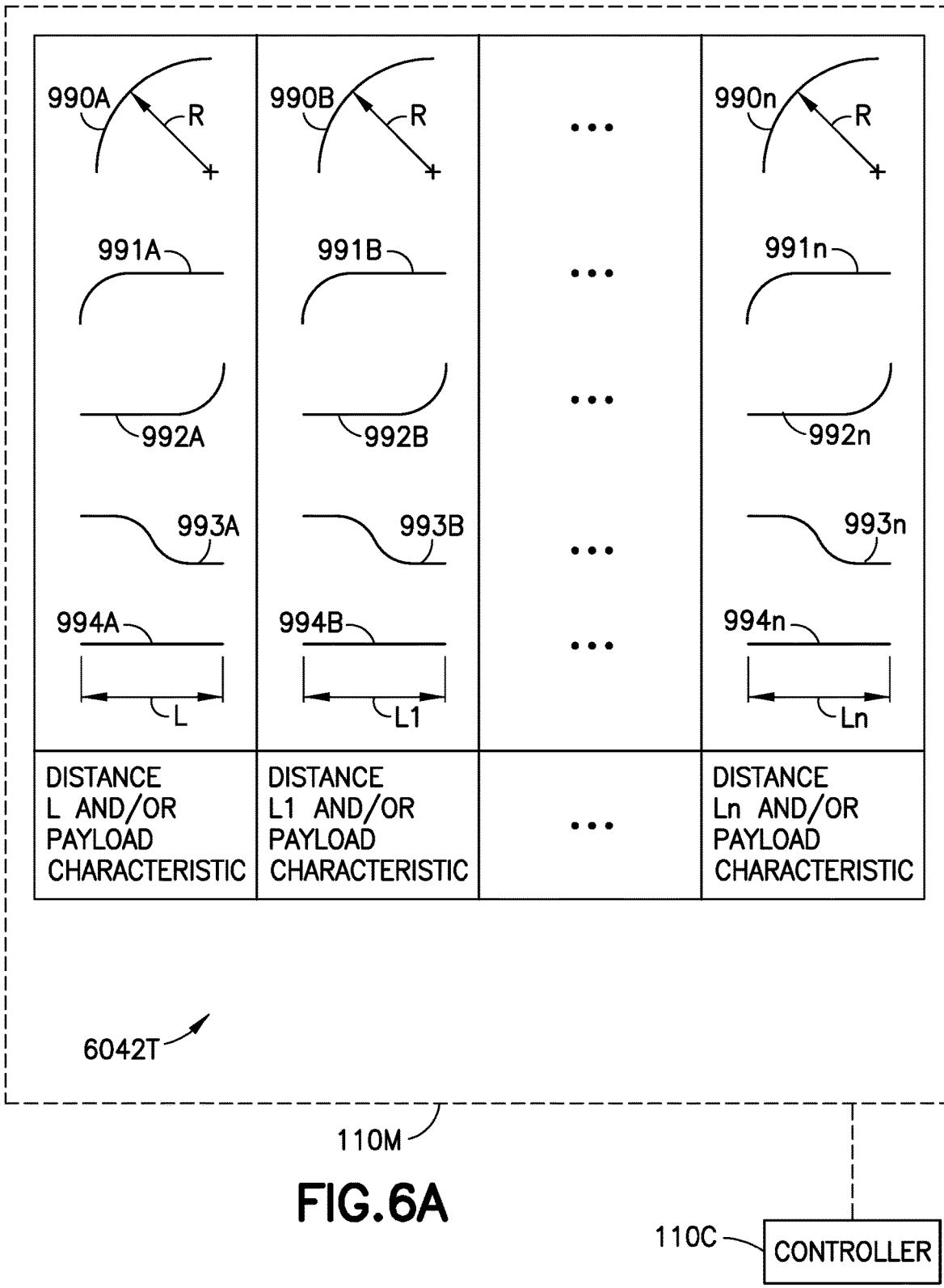
FIG. 6A is a schematic illustration of exemplary trajectories in accordance with aspects of the disclosed embodiment.
Figure 6C:
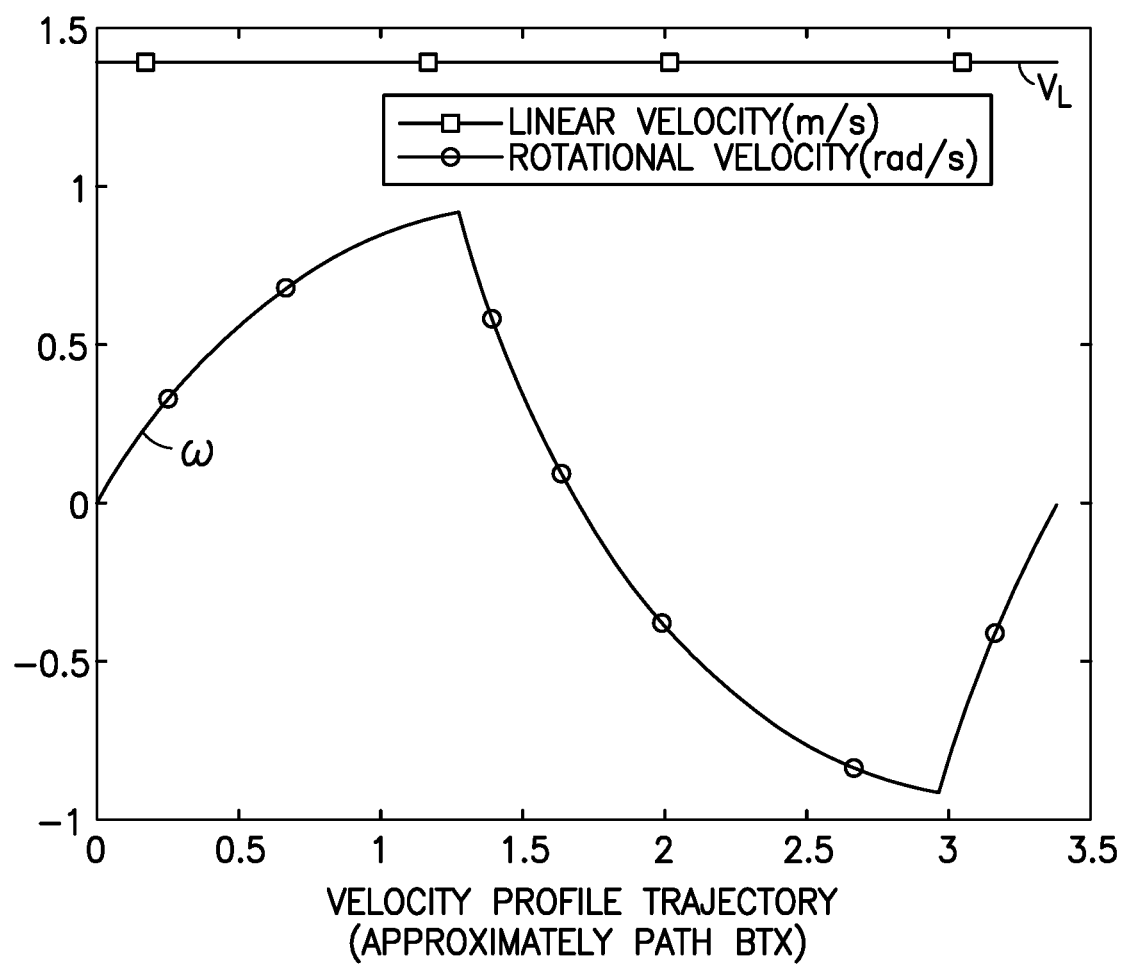
FIG. 6C is a diagram showing an exemplary velocity profile trajectory in accordance with aspects of the disclosed embodiment.
Figure 6D:
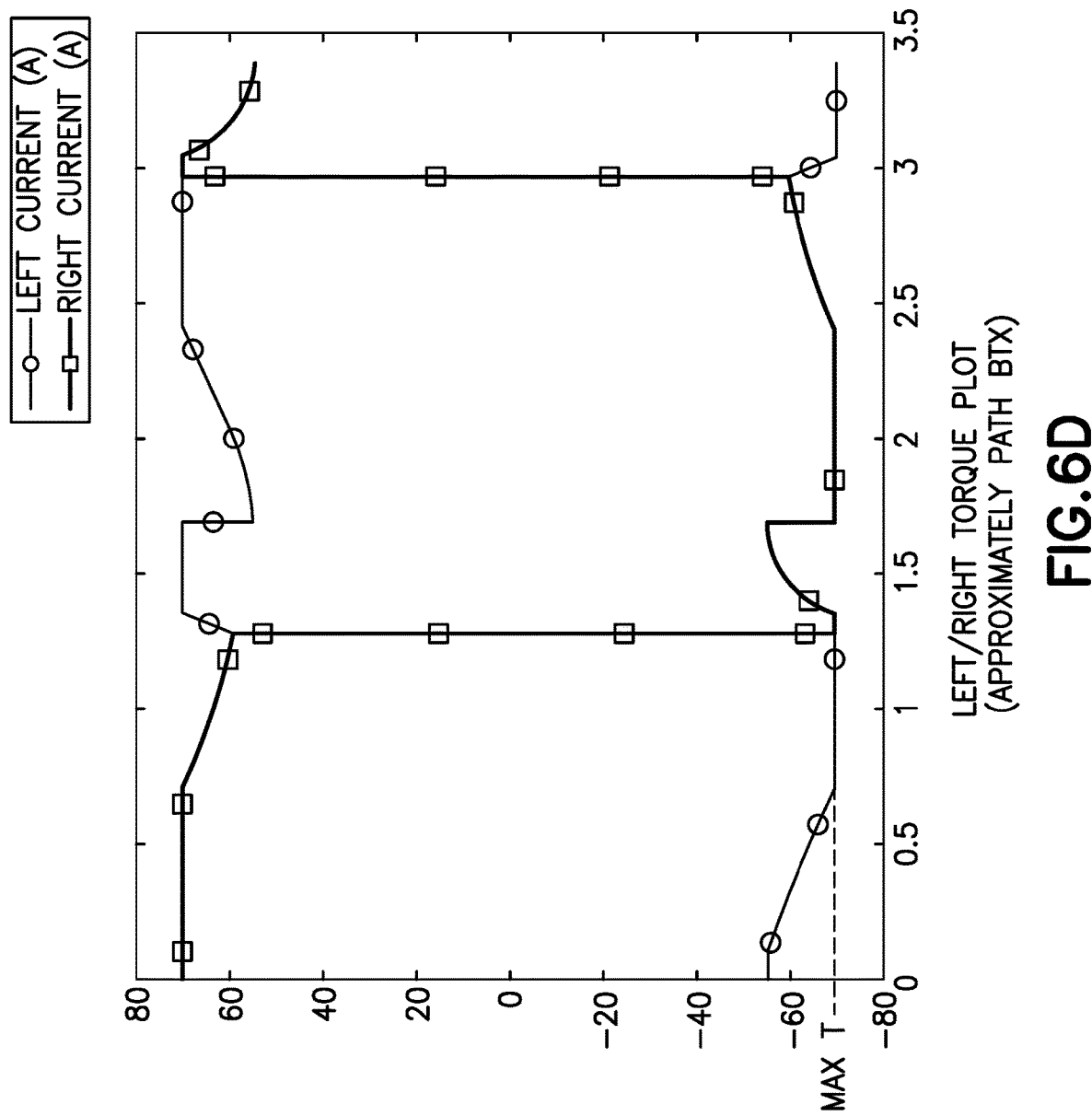
FIG. 6D is a diagram showing an exemplary left/right torque plot in accordance with aspects of the disclosed embodiment.

As may be realized from FIGS. 4 and 6A, there are different types of predetermined time-optimal dynamic model based trajectories that define different path curves the bot 110 can dynamically select from, singly and/or in a dynamically selected combination applied consecutively or separated by a flat path line (see FIG. 6A), to follow from an initial position (with an initial static and/or on the fly pose) to a final position (with a final desired/resultant static and/or on the fly pose). In one aspect, the trajectories are characterized by simple curves having any suitable shape such as a straight line, semi-circles and hook or "J" shapes while in other aspects the trajectories are any suitable complex curves such as "S" shaped curves having multiple changes in direction or inflection points as described. For example, one type of time-optimal trajectory is a component time-optimal trajectory having curved portions and straight portions where the curved portions are compound curves or turns with one or more of a variable or constant turn radius/rate, constant or changing turn directions and simple turns. As another example of a time-optimal trajectory type, the characterizing path shapes of the time optimal trajectories are a simple turn (turning in one direction during the move) having one or more of a variable turn radius/rate (e.g., the trajectory of paths 991A-991$n$ and 992A-992$n$ illustrated in FIG. 6A) or constant turn radius/rate (e.g., the trajectory of paths 990A-990$n$ illustrated in FIG. 6A) in a single direction. As may be realized, the different component time-optimal trajectories (e.g. simple and compound) are in one aspect joined to each other, end to end, to form a transport path BTP (e.g., as shown in FIG. 4, having a time-optimal trajectory characterized by an "S" shape (e.g., such as the trajectory of paths 993A-993$n$ shown in FIG. 6A) combined with a time-optimal trajectory characterized by a simple curve/turn; in other aspects a flat curve path trajectory (e.g., such as the trajectory of paths 994A-994$n$ shown in FIG. 6A) may be joining the bending curve path trajectory) followed by the bot 110.

In one aspect, as noted herein, the plurality of predetermined trajectories 6042T are stored, as previously described, in any suitable memory 110M of the bot 110 that is accessible by the controller 110C and are dynamically selected by the controller 110C as noted herein, such as with the bot navigation trajectory generator 6040, to form a set of time-optimal trajectories for the creation of a bot 110 travel path BTP. As noted herein, each trajectory (unparameterized) is a time optimal trajectory that is dynamically (e.g. on the fly such as while the bot is moving at the speeds described herein) determined or selected by the bot controller 110C. The controller 110C, such as through the bot navigation trajectory generator 6040, selects, from the trajectory(ies) 6042 section of the bot navigation trajectory generator 6040, and combines one or more predetermined time-optimal trajectories to form a compound time-optimal trajectory where the combination of the time-optimal trajectories is also performed dynamically during motion of the bot 110 (or prior to bot 110 motion) by the bot controller 110C to connect one or more waypoints along the traverse path of the bot 110 (resulting in a dynamically selected or determined set of trajectories effecting a given move). The bot navigation trajectory generator 6040 selects and combines the time-optimal trajectories to form one or more time-optimal trajectory set(s) GBTA-GBTD (see FIG. 6B) that are time optimized (e.g. the fastest route between predetermined waypoints).

As an example of time-optimal trajectory selection, referring to FIGS. 4 and 6, a central controller (such as controller 120) sends the bot 110 a move command. The move command is received by the bot navigation trajectory generator 6040 of the controller 110C and includes, for example and as noted above, a beginning trajectory waypoint and an ending trajectory waypoint where the beginning waypoint is based on a present or current location of the bot at the time the move command is sent. For exemplary purposes only, the beginning waypoint may be waypoint WP1 and the ending waypoint may be waypoint WP3. It is noted that the waypoints may be disposed at any suitable location on the transfer deck 130B and in one aspect, may be located at openings to aisles 130A, driveways 130BW, buffer stations BS, transfer stations TS and may coincide with the locations of the nodes ND. In this example, the waypoint WP3 coincides with a node ND located along navigation features LAT1 leading to an opening of aisle 130A1. Here the bot 110 is travelling at the speeds noted above and, based on the move command, knows the distance between the bot's 110 current location and the waypoint WP3 along with its pose and state (from the motion positioning system 6020 and/or navigation sensor detection system 6010), the size and/or weight/mass of the payload and selects one or more time-optimal trajectories 6042 from the stored predetermined time-optimal trajectories, based on one or more of the stored characteristics of the predetermined time-optimal trajectories (such as the distance $L_i$ and initial/final boundary conditions) providing a trajectory solution between the bot's 110 current location (the current location is used as the bot may have already passed by the beginning waypoint WP1 during high speed travel along the transfer deck 130B) and the ending waypoint WP3, the size and/or weight/mass of the payload, for connecting the beginning and ending waypoints (where the waypoints need not coincide with nodes ND). As noted before, the characteristics of the predetermined time-optimal trajectories effect a means for categorizing the trajectories (in sets if desired) in storage, and conversely as indexing means for selection of the time-optimal trajectories by the bot navigation trajectory generator 6040. As such, the time-optimal trajectories may start or end at waypoints and/or before or after a waypoint where the branch point of the time-optimal trajectory from/to the navigation feature LONG1-LONG3, LAT1-LAT7 is freely selectable by the bot controller 110C and may be, in one aspect, based on obstacles (such as other bots) on the transfer deck 130B, a payload carried by the bot, or any other suitable constraints (e.g. the bot 110 can branch from or branch to a guide feature independent of the waypoint positions). Thus, for a given move command (e.g., received on the fly) setting a destination on the structure map 6041, the bot 100 knowing its current pose and state, and the pose and state desired at the destination accesses the trajectory index in which the time-optimal trajectory set(s) are characterized, and dynamically selects one or more (a set) of time-optimal trajectory solutions based on characteristics matching pose/state of the bot 110 at the moment the move command is received and at the destination.

The selection of one or more time-optimal trajectory 6042 is performed concurrently, by the bot navigation trajectory generator 6040, with the bot (such as bot 110E) travelling along the transfer deck 130B (such as along navigation feature LONG1), at high speeds described herein, such that the bot 110E moves from its pose P1 traveling along navigation features LONG1 to a pose (such as pose P2) required at waypoint WP3 for entering the aisle 130A1. To resolve the selected set of time-optimal trajectories to the bot control scheme, the bot navigation trajectory generator 6040 computes the initial velocity (at the start of the selected trajectory move set) and motor current ($I_L$, $I_R$) switch times ($t_L$, $t_R$) with an algorithm using "test shooting" and "gradient descent" methods as it otherwise known. Accordingly, the current switch time effecting bang-bang control of the selected trajectory solution set are set to the time reference frame of the bot 110 and executed by the bot trajectory following controller 6060 so the bot effects the dynamically selected time-optimal trajectory. As described above, the aisle side guideline or navigation feature LONG1 is arranged close to the edge of the transfer deck 130B such that the bot 110 cannot make a 90° turn into aisle 130A1. As such, the bot navigation trajectory generator 6040 selects one or more predetermined time-optimal trajectories 6042 that allow the bot 110E to move from navigation feature LONG1 and change its pose to enter the aisle 130A1 based on the dynamic model of the bot 110 for the different boundary conditions at the start and end of the curve path generated by the time-optimal trajectory(ies).

In this example, the bot navigation trajectory generator 6040 selects one or more predetermined time-optimal trajectories 6042 from the trajectory(ies) 6042 section to move the bot 110E from navigation feature LONG1 to navigation feature LONG2. In one aspect, a single compound time-optimal trajectory 3010 having an "S" shape (e.g. two opposing turns one immediately following the other) is selected for transitioning between navigation features LONG1, LONG2. In another aspect, the bot navigation trajectory generator 6040 may dynamically select a series of trajectories defining simple turns (e.g., such as the "J" shaped trajectory paths 991A-991n shown in FIG. 6A) joining such at a point of matching boundary conditions, thus to create an on the fly waypoint WP4 such that the two dynamically selected simple "J" shaped curves 3010A, 3010B solutions are selected to meet at waypoint WP4 (e.g. the inflection point between the simple curves) for transitioning between navigation features LONG1, LONG2 so that the resulting path between navigation features LONG1, LONG2 is smooth. The bot navigation trajectory generator 6040 selects one or more additional time-optimal trajectories for transitioning from navigation feature LONG2 to navigation feature LAT1 for arriving at waypoint WP3 in a bot 110 pose (such as pose 2 shown in FIG. 4) that allows the bot 110 to enter the aisle 130A1. Here the bot navigation trajectory generator 6040 may create (as noted above) another on the fly waypoint WP2 and select a simple curve time-optimal trajectory 3012 that turns the bot 90° onto navigation feature LAT1 where the time-optimal trajectories 3010 (or 3010B) and 3012 meet or are connected to each other, as described above to form a compound time-optimal trajectory, by yet another simple straight line time-optimal trajectory 3011. It is noted that while waypoint WP2 is illustrated as being coincident with a node in other aspects, the waypoint WP2 may not be located at a node.

As noted above, in one aspect, the predetermined time-optimal trajectories are selected by the bot navigation trajectory generator 6040 based at least in part on, for example, the dynamic model (e.g., dynamic constraints) of the bot 110 Referring also to FIG. 5B, the bot dynamic model is defined by $$x = \begin{bmatrix} x_1 \\ x_2 \end{bmatrix} = \begin{bmatrix} v_x \\ w_z \end{bmatrix} \quad [1]$$

$$[M]\dot{x} + [C]x = \begin{bmatrix} f_x \\ q_z \end{bmatrix} \quad [2]$$

where x, $x_1$, $x_2$ are positions along the x axis, $v_x$ is the velocity along the X axis, $w_z$ is the angular velocity about the Z axis, C is the bot 110 Coriolis matrix, M is the bot 110 inertia matrix (both C and M are dependent on bot mass and location of the mass center as is otherwise known), $f_x$ is the force along the X axis and $q_z$ is the torque about the Z axis where $f_x$ and $q_z$ form the net wrench ($f_x$, $q_z$) vector applied at the bots origin. It is noted that the net wrench ($f_x$, $q_z$) is the sum of the forces and torques generated by motor torque, friction and damping.

In other aspects, the dynamically selected time-optimal trajectories 3010 (or time-optimal trajectories 3010A, 3010B), 3011 and 3012 connecting the beginning waypoint WP1 with the ending waypoint WP3 specified by the move command form a set of time-optimal trajectories that are sent by the bot navigation trajectory generator 6040 to the bot velocity and position system controller 6050 which, with the bot trajectory following controller 6060 and the drive motors 202MA, 202MB, form a control loop for effecting movement of the bot along at least the undeterministic surface the open undeterministic transfer deck 130B in event of unexpected exigent conditions identified by bot 110 sensors (e.g., mismatch between navigation landmarks according to trajectory solutions and senses) and/or system control wherein the bot 110 move maneuvers to a safe stop/safe location. For example, when the bot 110 moves in substantially straight lines, such as in the picking aisles 130A and/or transfer areas 295 of the transfer stations TS (such as along the driveways 130BW or on the transfer deck 130B), the drives for motors 202MA, 202MB exit bang-bang control and are configured as torque controllers (for traversing in a substantially straight line) or as position controllers (for traversing turns such as substantially right angle turns, the S-shaped turns, the J-shaped turns, or any other turns defined by the predetermined trajectories described herein). For example, operating as a torque controller, the controller 110C is configured to close a velocity loop as shown in FIG. 6 using the average of the velocity feedback from both wheels 202A, 202B as the "bot velocity". To improve performance and avoid velocity loop instabilities, the velocity loop may be augmented with torque-feedforward and operated at a low gain. The controller 110C is also configured to close a position loop as also shown in FIG. 6 for final position at a stop location of the bot 110. The controller 110 is also configured to sum in a differential torque offset to implement line following, such as along the features of the navigation feature array 3000. It is noted that the drive wheels 202A, 202B may lose traction with the transfer deck 130B or floor of a picking aisle 130A or transfer area 295 when the flooring surfaces and/or the wheels are contaminated with liquids, dirt or other particulates. The velocity control loop may be configured to mitigate the loss of traction of the drive wheels 202A, 202B by backing off the torque to both wheels 202A, 202B whenever feedback provided by, for example, an encoder for one or both wheels 202A, 202B indicates a velocity higher than a predetermined velocity of the bot 110. When travelling long distances on, for example, the undeterministic surface of the transfer deck 130B, the bot 110 travels on drive wheels 202A, 202B and idler wheels 201 so that the bot is deterred from veering off of the straight line trajectory through the fixed nature of the drive wheels 202A, 202B and idler wheels 201. The controller 110C is configured with any suitable line following algorithm to substantially ensure that the bot 110 maintains travel in a straight line in any suitable manner where corrections for maintaining the straight line trajectory may be applied as a differential torque to the wheels as the bot is travelling (e.g. skid steering—rotating one drive wheel slower than the other drive wheel to produce increased drag on one side of the bot for inducing a turning moment on the bot). When operating as position controllers the drives 202MA, 202MB may be commanded by the controller 110C to rotate their respective wheels 202A, 202B in opposite directions in any suitable manner for executing the prescribed turning maneuver according to one or more selected ones of the predetermined time-optimal trajectories.

Referring now to FIGS. 4, 6, 7A and 7B, conventionally non-holonomic bot 110 traverse across the transfer deck 130B is facilitated by, for example (see FIG. 7A) line following where the guidelines are arranged in a grid pattern such that bot 110 turns are limited to 90° turns where the 90° turns are made at nodes ND (e.g. crossing points) of the guidelines. As may be realized from the above, the high speed navigation of the bot described herein allows substantially unrestricted non-holonomic bot 110 traverse (see FIG. 7B) along the undeterministic surface of the open undeterministic transfer deck 130B such the bot 110 can travel from node to node without being restricted to making 90° turns at the nodes ND, thereby decreasing bot 110 transfer/travel times across the transfer deck 130B. This allows the bot 110 to travel at the speeds described herein while navigating the undeterministic surface of the transfer deck 130B and while making turns into the picking aisles 130A and/or lift interface areas such as the driveways 130BW or buffer/transfer stations located along a side of the transfer deck 130B (such as shown in FIGS. 2A-2C).

Figure 11:
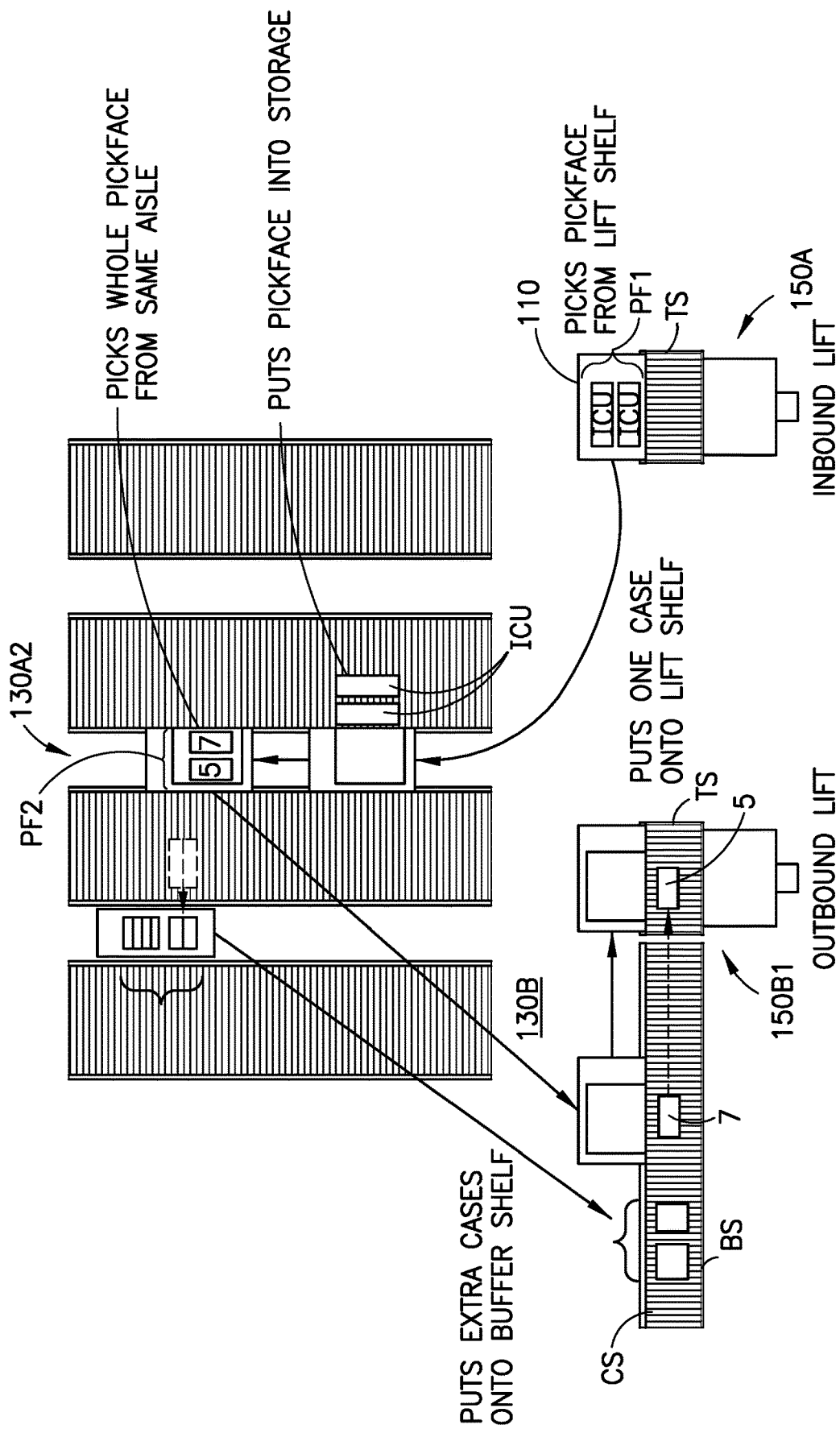

For example, referring to FIGS. 4 and 10-12, the bot 110 is configured to transfer one or more pickfaces between one or more transfer stations TS (or buffers BS) and one or more storage locations (within e.g. one or more picking aisles 130A) in a manner substantially similar to that described in U.S. provisional patent application No. 62/104,513 filed on Jan. 16, 2015, now U.S. patent application Ser. No. 14/997, 892 filed on Jan. 18, 2016, the disclosures of which have been incorporated herein by reference in their entireties. For example, a bot 110 case unit(s) transfer transaction may include a case unit(s) multi-pick and place operation with on the fly sortation of the case units for creating a mixed pallet load MPL (as shown in FIG. 1C) according to a predetermined order out sequence and/or in the predetermined order sequence (e.g. an order out sequence) of picked items according to, for example, an order fulfilling one or more customer orders, in which case units CU are sequenced for placement in one or more bag(s), tote(s) or other container(s) at any suitable operator station. Referring to FIG. 11 a customer order may require case unit(s) 7 to be delivered to output lift 150B1 and case unit(s) 5 to also be delivered to output lift 150B1 (in other aspects, it is noted that customer orders may require case units carried by a common bot 110 to be delivered to different output lifts such that the transfer of the case units carried by the common bot 110 to different output lifts occurs in a manner substantially similar to that described herein). In the aspects of the disclosed embodiment described herein the output lift 150B1 (e.g. each of the output of the storage and retrieval system/order fulfillment system) defines a fulfillment course or pathway of mixed case pickfaces outbound from the storage array to a load fill where the mixed case pickfaces enter and exit the fulfillment course in substantially the same order. As may be realized, while the input and output lifts 150A, 150B may be vertically reciprocating lifts it should be understood that in other aspects the input and output lifts 150A, 150B are any suitable transport modules for transporting case pickfaces to and from the storage structure 130. For example, in other aspects the lift modules 150A, 150B are one or more of vertically reciprocating lifts, any suitable automated material handling systems, conveyors, bots, turntables, roller beds, multilevel vertical conveyor (e.g. paternoster conveyor) that operate synchronously or asynchronously. To efficiently use each bot 110 in the storage and retrieval system 100 the controller, such as control server 120, determines which picking aisle(s) case units 5, 7 are located. The controller also determines which inbound case unit(s) ICU are to be stored in the picking aisle(s) from which case units 5, 7 (e.g. the outbound case units) are to be picked. The controller sends commands to a bot 110 on a level where case units 5, 7 are located to pick one or more inbound case units ICU from an interface station TS of one or more lift modules 150A (FIG. 13, Block 1400A). The bot 110 grips the case unit(s) ICU (FIG. 13, Block 1420) and transports the case unit(s) (e.g., traverses the open undeterministic transport deck 130B in a manner as described herein with respect to FIG. 7B so that the bot 110 can enter the picking aisle) to one or more storage space 130 within one or more picking aisle 130A2 (FIG. 13, Block 1421) where at least one of the picking aisles in which the inbound case units are placed includes one of the outbound case units 5, 7. As may be realized, where the inbound case units are placed at different storage locations 130S the inbound case units are sorted (FIG. 13, Block 1425), where one or more case unit(s) are transferred to one case unit holding location, such as a storage space 130S or buffer, (FIG. 13, Block 1430) while case units that are not transferred are returned to the payload section of the bot 110 for transfer to another case unit holding location (FIG. 13, Block 1435).

As may be realized, the outbound case units 5, 7 are located in the same or different picking aisles and are retrieved by one bot 110 or different bots 110 depending on a proximity of the outbound case units and the predetermined storage position(s) of the inbound case unit(s). For example, referring to FIG. 10, the bot 110 picks an inbound case unit ICU from interface station TS of lift module 150A for placement in picking aisle 130A2, which is the aisle case unit 5 is located. Case unit 7 in this example is located in picking aisle 130A1. After placement of the inbound case unit ICU the bot continues to travel along picking aisle 130A2 in a common pass (e.g. a single traversal of the picking aisle in a single direction) to pick the outbound case unit 5 (FIG. 13, Block 1400). Where it is more efficient to have a single bot 110 pick multiple case units, the outbound case unit 5 is justified on the bot 110 in any suitable manner (FIG. 13, Block 1405) and the bot travels to the location of another case unit, such as outbound case unit 7 in aisle 130A1 (it is noted that where a second outbound case is located in a common aisle with the first outbound case both outbound case units are picked in a common pass of the picking aisle with the common transfer arm 110PA (FIGS. 5 and 5A) of the bot 110). The second outbound case unit(s) 7 is picked with the common transfer arm 110PA (FIG. 13, Block 1410) and both case units 5, 7 are transferred and placed at one or more of peripheral buffer station BS and interface station TS of a pickface transport system such as lift module 150B (FIG. 13, Blocks 1420-1435) in a manner substantially similar to that described above with respect to the placement of the inbound case unit(s). Where it is more efficient to have a two different bots 110 pick a respective one of case units 5, 7 after picking the respective outbound case (FIG. 13, Block 1400) the case unit is gripped (FIG. 13, Block 1420) and transferred to and placed at one of the peripheral buffer station BS or the interface station TS of outbound lift 150B (FIG. 13, Block 1421-1435). In one aspect, where an outbound case unit, such as case unit 5 is placed at a peripheral buffer station BS a different bot 110, than the bot that placed the case unit 5 at the peripheral buffer station BS, transfers the case unit 5 to the interface station TS while in other aspects the same bot 110 returns to the peripheral buffer station BS to transfer case unit 5 to the interface station TS. In the aspects of the disclosed embodiment described herein, the buffer stations BS and/or the transfer stations TS (e.g. at least one pickface handoff station) commonly supports more than one of the mixed case pickfaces defining a portion of the mixed case pickfaces outbound from the storage array/structure 130 entering the fulfillment course in an ordered sequence of pickfaces based on a predetermined sequence of the load fill. In one or more of the aspects of the disclosed embodiment described herein, the buffer station BS and/or transfer stations TS forms a common pickface transfer interface for the outbound lift(s) 150B1, so that the commonly supported pickfaces are picked in common with the outbound lift(s) 150B1. In one or more aspects of the disclosed embodiment, any suitable controller, such as controller 120 is in communication with the bot(s) 110 and is configured to effect placement of pickfaces on the buffer station BS and or transfer station TS based on the ordered sequence of pickfaces.

In one aspect the outbound case units are picked and transferred as a unit (e.g. a pickface) by a common transfer arm 110PA (FIGS. 5 and 5A) of bot 110. Referring now to FIG. 11 again a customer order may require case unit(s) 7 to be delivered to output lift 150B1 and case units 5 to also be delivered to output lift 150B1 (in other aspects, it is noted that customer orders may require case units carried by a common bot 110 to be delivered to different output lifts such that the transfer of the case units carried by the common bot 110 to different output lifts along the open undeterministic transfer deck 130B occurs in a manner substantially similar to that described herein with respect to FIG. 7B. As described above, the controller determines which inbound case unit(s) ICU are to be stored in the picking aisle(s) from which case units 5, 7 (e.g. the outbound case units) are to be picked. The controller sends commands to a bot 110 on a level where case units 5, 7 are located to pick one or more inbound case units ICU as a unit (e.g. pickface) from an interface station TS of a lift module 150A in a manner similar to that described above (FIG. 13, Block 1400A). The bot 110 grips the pickface PF1 (FIG. 13, Block 1420), traverses the transfer deck 130B in the manner described herein, and transports the pickface PF1 to a storage space 130 within the picking aisle 130A2 (FIG. 13, Block 1421) where the outbound case units 5, 7 are located and places the pickface PF1 into a storage space 130S (FIG. 13, Block 1430). It is noted that since the whole pickface is transferred to a common storage space and no case units are left on the bot that the flow, in this example, does not proceed to block 1435 of FIG. 13.

After placing the inbound pickface PF1, the bot 110 continues to travel through aisle 130A2 in a common pass (e.g. a single traversal of the picking aisle in a single direction) to the storage space holding outbound case units 5, 7 (which are arranged on the storage shelves adjacent one another so as to be picked simultaneously as outbound pickface PF2). The bot 110 picks pickface PF2 with the common transfer arm 110PA (FIGS. 5 and 5A) (FIG. 13, Block 1415), grips the pickface PF2 (FIG. 13, Block 1420) and transports the pickface PF2 (FIG. 13, Block 1421) to the outbound lift 150B1 where the bot 110 traverses the transfer deck 130B as described herein. In one aspect the case units 5, 7 of the pickface PF2 are placed at one of the peripheral buffer station BS or the interface station TS as a unit (FIG. 13, Block 1430). In another aspect the case units 5, 7 of the pickface are separated and justified on the bot 110 in any suitable manner for placement in different locations (FIG. 13, Block 1425). For example, bot 110 places case unit 7 at the peripheral buffer station BS (FIG. 13, Block 1430), returns case unit 5 to the payload area of the bot 110 (FIG. 13, Block 1435), grips the case unit 5 (FIG. 13, Block 1420), transports the case unit 5 to the interface station TS (FIG. 13, Block 1421) and transfers the case unit 5 to the interface station (FIG. 13, Block 1430).

Figure 12:
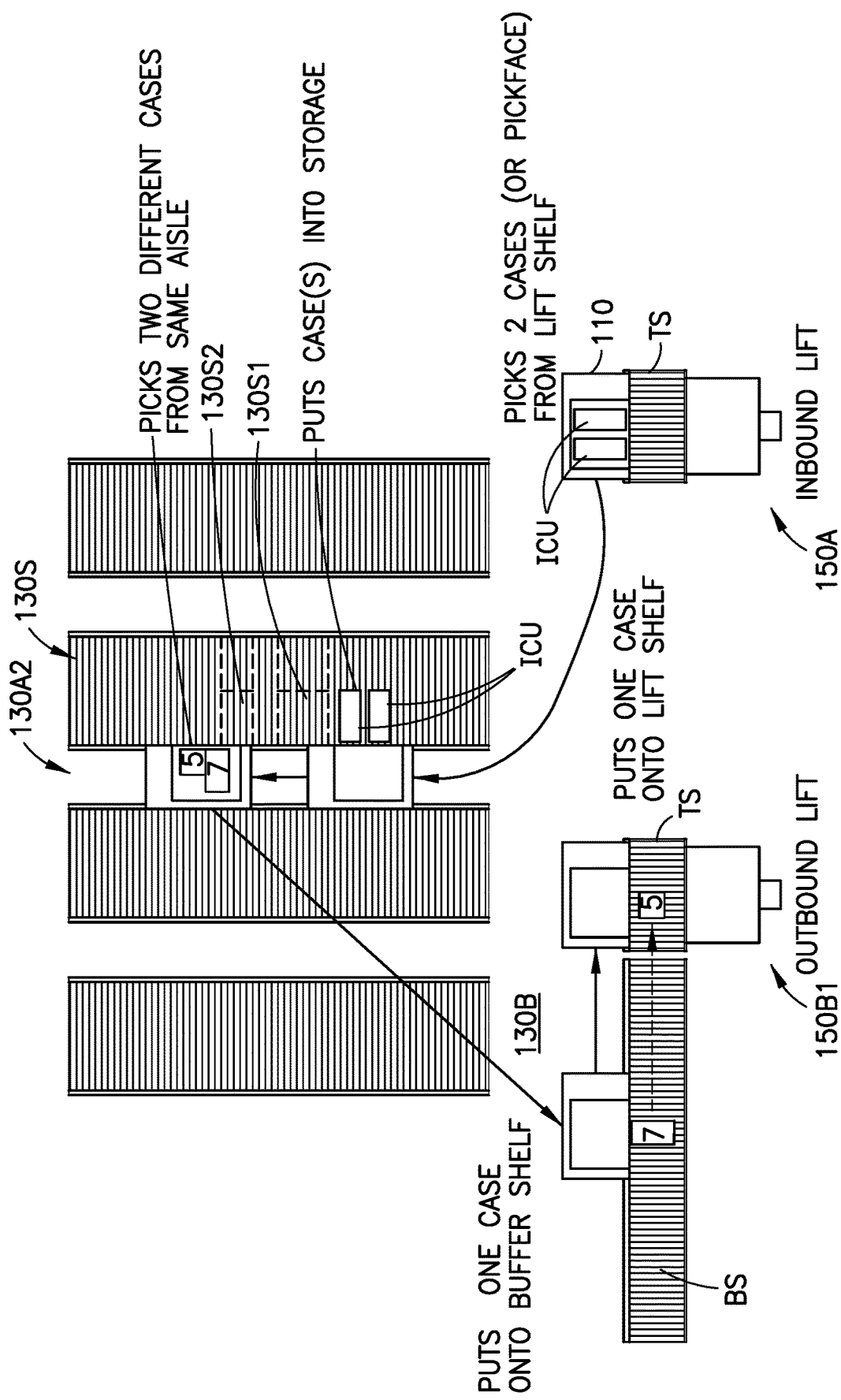
Figure 13:
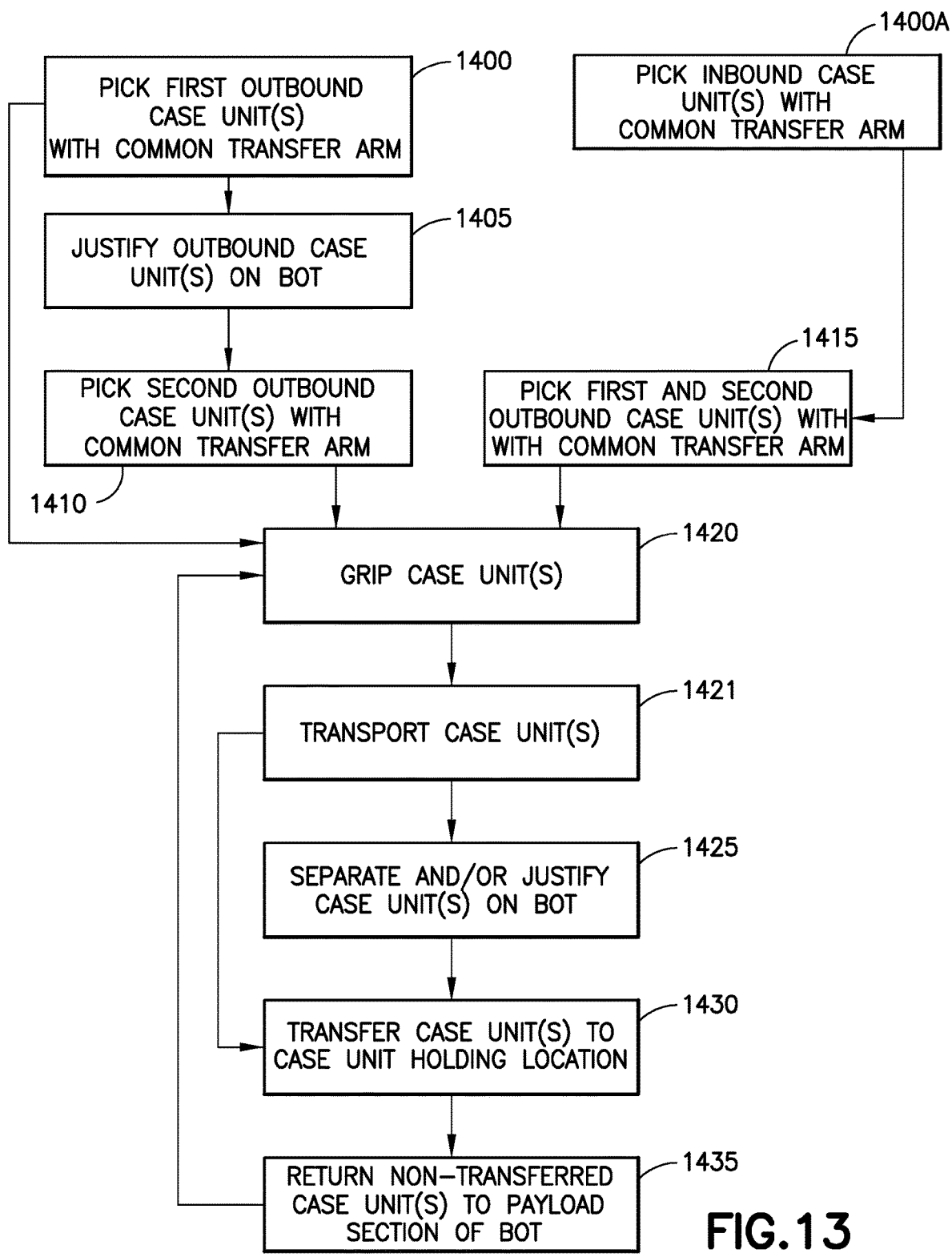
FIG. 13 is an exemplary flow diagram in accordance with aspects of the disclosed embodiment.

In another aspect, referring to FIG. 12, the outbound case units 5, 7 are picked from different storage locations within a common aisle 130A2 with the common transfer arm 110PA (FIGS. 5 and 5A) of the bot 110. Here, the bot 110 transfers one or more inbound case units ICU to one or more storage locations in the manner described above where at least one of the inbound case units ICU is located in a common picking aisle 130A2 with the outbound case units 5, 7. After placing at least one inbound case unit at a predetermined storage location 130S of aisle 130A2 the bot 110 continues to travel through picking aisle 130A1, in a common pass of the picking aisle 130A2, and picks case unit 5 from storage space 130S1 in the manner described above (FIG. 13, Block 1400). The case unit(s) 5 is justified on the bot 110 towards the rear of the payload section 110PL in nay suitable manner (FIG. 13, Block 1405). The bot 110 continues to travel through the picking aisle 130A1 in a common pass of the picking aisle and picks case unit 7 from a different storage space 130S2 with the common transfer arm 110PA so that both case unit(s) 7, 5 are located adjacent one another on the common transfer arm 110PA (FIG. 13, Block 1410). As may be realized, in one aspect, the controller 110C is configured to effect picking of the case unit(s) in any suitable order such as, for example, an order that is opposite an order in which the case unit(s) are placed.

In this multi-pick example, the case unit holding location (s) correspond to storage spaces 130S of the picking aisles 130A but in other aspects the case unit holding location(s) include input lift modules 150A (where a direct transfer between bots and the lift occurs), interface or peripheral buffer stations TS, BS for interfacing with the input lift modules 150A, (where an indirect transfer between the lift modules and the bots occurs) and storage spaces 130S (picking from the interface stations TS and the input lift modules 150A with the bot 110 is noted where case units are needed for a predetermined order out sequence are not located in the storage spaces 130S but are being input into the storage rack array in a just in time manner to be delivered substantially directly to the output lift(s) 150B1, 150B2).

The bot 110 grips both case units 7, 5 within the payload section 110PL in the manner described above and exits the picking aisle 130A1 (FIG. 13, Block 1420). The bot travels along the transfer deck 130B (in the manner described herein) and interfaces with output lift 150B1 (FIG. 13, Block 1421). The bot separates the case units 7, 5 within the payload section 110PL, as described above, so that case unit(s) in any suitable manner such as, for example, so that case unit(s) 7 is justified towards the front of the payload section 110PL and case unit(s) is justified towards the back of the payload section 110PL (FIG. 13, Block 1425). The case unit 7 is transferred to the peripheral buffer station BS (FIG. 13, Block 1430). The bot retracts the transfer arm 110PA to return the case unit(s) 5 to the payload section 110PL (FIG. 13, Block 1435) and grips the case unit 5 (FIG. 13, Block 1420). The case unit(s) 5 is transported to the interface station TS of output lift 150B1 (FIG. 13, Block 1421), justified toward the front of the payload section 110PL (FIG. 13, Block 1425) and transferred to transfer station TS (FIG. 13, Block 1430). In other aspects, depending on the predetermined case unit output sequence, the bot 110 places both case unit(s) 7, 5 at a common location/position, such as at one of output lifts 150B1, 150B2. As may be realized, the case unit(s) placed at the buffer station BS are, in one aspect, transferred to the interface station TS by a bot 110 or, in other aspects, by any suitable conveyor that connects the buffer station BS to the interface station TS. In one aspect, where the case unit(s) are transferred from the buffer station BS to the interface station TS by a bot 110 that transfer is an opportunistic transfer such that a bot 110 travelling along the transfer deck, for example, in route for another task (e.g. transferring pickface(s) to storage, sorting pickfaces, transferring pickface(s) from storage, etc.) travelling by the buffer station BS stops to pick the pickface from the buffer station BS and transfer the pickface to the interface station TS while in the process of performing the other task.

Figure 8:
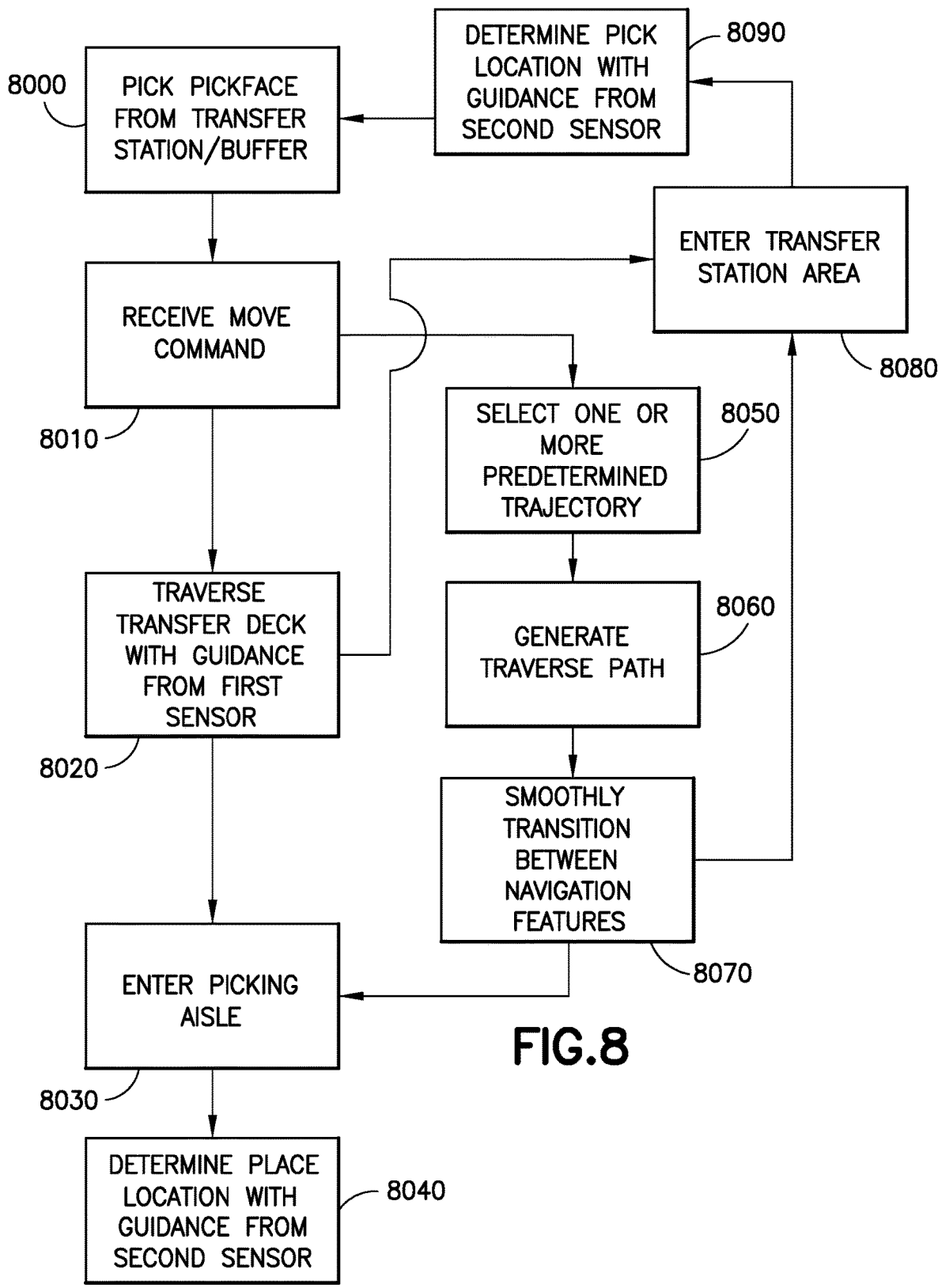
FIG. 8 is a flow diagram in accordance with aspects of the disclosed embodiment.

Referring now to FIG. 4, to transfer one or more pickfaces from one or more lift modules 150 to one or more storage locations in the picking aisles 130A (in the manner(s) described above) the bot 110 picks a pickface from, for example, a transfer station TS or buffer stations BS (FIG. 8, Block 8000), such as in the manner described above with respect to FIGS. 11-12. The bot 110 receives a move command from, for example, controller 120 (FIG. 1) where the move command includes at least a starting waypoint (such as waypoint WP5) and an ending waypoint (such as WP6) for a bot transport path BTP2 (FIG. 8, Block 8010). In one aspect the move command instructs the bot 110 to pick another pickface from another transfer station TS or buffer station BS in which case the bot traverses the transfer deck with guidance from a first sensor, such as index sensor 6000, where the bot 110 follows a guidance/navigation feature lONG1-LONG3, LAT1-LAT7 of the transfer deck 130B. Coincident with high speed bot traverse along the transfer deck 130B (FIG. 8, Block 8020) under guidance of a first sensor (such as index sensor 6000), the bot controller 110C selects one or more predetermined trajectory 6042 (FIG. 8, Block 8050), as described above, to allow the bot to travel from the first waypoint WP5 to the second waypoint WP6 (e.g. corresponding to a destination of the bot) such as corresponding to the other transfer station TS or buffer station BS. The controller 110C generates the traverse path (e.g. such as bot transport path BTP2 which in one aspect includes two simple curves and a straight line portion) connecting the first and second waypoints WP5, WP6 (FIG. 8, Block 8060), as described above, where the trajectories 6042T are selected based on, e.g., the boundary conditions at the start of the trajectory and the end of the trajectory and/or the length L between the start point and end point so that the bot smoothly transitions between the guidance/navigation features lONG1-LONG3, LAT1-LAT7 of the transfer deck 130B (FIG. 8, Block 8070). In the case of bot 110 traverse between transfer stations TS, one exemplary bot transport path BTP2, resulting from trajectory(ies) 6042T selection as described herein, is illustrated in FIG. 4 where bot 110 may exit driveway 130BW1, and select predetermined time-optimal trajectories 6042T so that the bot 110 smoothly departs from guidance feature LAT7, smoothly merges onto guidance feature LONG2, smoothly departs from guidance feature LONG2 and then smoothly merges onto guidance feature LAT3 for entering another driveway 130BW2.

As may be realized, when transferring from one guidance feature to another guidance feature (such as from guidance feature LAT7 to guidance feature LONG2) the index sensor 6000 of the bot 110 loses contact with the first guidance feature LAT7 before obtaining contact with the second guidance feature LONG2. In one aspect, the bot 110 may use wheel odometry (or other suitable dead reckoning substantially without sensory input) to follow the path BTP2 during the transition between guidance features LAT7, LONG2 such that once the index sensor 6000 detect the second guidance feature LONG2 the bot controller 110C makes an accurate determination of bot position (e.g. in at least one direction) on the transfer deck 130B. The bot continues to follow the bot transport path BTP2 and transitions between guidance features LAT7, LONG2, LAT3 for arrival at waypoint WP6, which in this example corresponds to the entrance to driveway 130BW2 at which the other transfer station TS is located. Upon entry to the driveway the bot 110 transitions from guidance with the index sensor 6000 to other sensors in the array of sensors 6001 for determining, in any suitable manner, a location of the transfer station TS from which a pickface is to be picked (FIG. 8, Block 8090). In other aspects the bot 110 may use any suitable sensors for guidance in the driveway 130BW2. The pickface is picked (FIG. 8, Block 8000) and the bot 110 receives another move command (FIG. 8, Block 8010) for placing the one or more pickfaces at one or more storage locations of a picking aisle, such as picking aisle 130A5.

In a manner substantially similar to that described above, the second move command may include the start and end waypoints (e.g. the start waypoint WP6 corresponding to, for example, the exit of the driveway 130BW2 and the end waypoint WP7 corresponding to the entrance to the picking aisle 130A5). Coincident with high speed bot traverse along the transfer deck 130B (FIG. 8, Block 8020) under guidance of the first sensor (such as index sensor 6000), the bot controller 110C selects one or more predetermined trajectory 6042T (FIG. 8, Block 8050), as described above based on, e.g., the boundary conditions at the start of the trajectory and the end of the trajectory and/or the length L between the start point and end point, to allow the bot to travel from the first waypoint WP6 to the second waypoint WP7 corresponding to the picking aisle 130A5. The controller 110C generates the traverse path (e.g. such as bot transport path BTP3 which in one aspect includes a compound S-shaped curve connecting the guidance features LAT3 and LAT4 as well as the first and second waypoints WP6, WP7 (FIG. 8, Block 8060), as described above from the selected trajectories 6042T, so that the bot smoothly transitions between the guidance/navigation features LAT3, LAT4 of the transfer deck 130B (FIG. 8, Block 8070). When at waypoint WP7 the bot 110 has the proper pose for entering the picking aisle (FIG. 8, Block 8030) where bot 110 guidance transitions from the index sensor 6000 to another sensor in the array of sensors 6001 such as a rib sensor or any other suitable sensor (e.g., wheel odometry, case unit sensors, etc.) for determining a place location(s) of the one or more pickfaces (FIG. 8, Block 8040) in any suitable manner.

Figure 9:
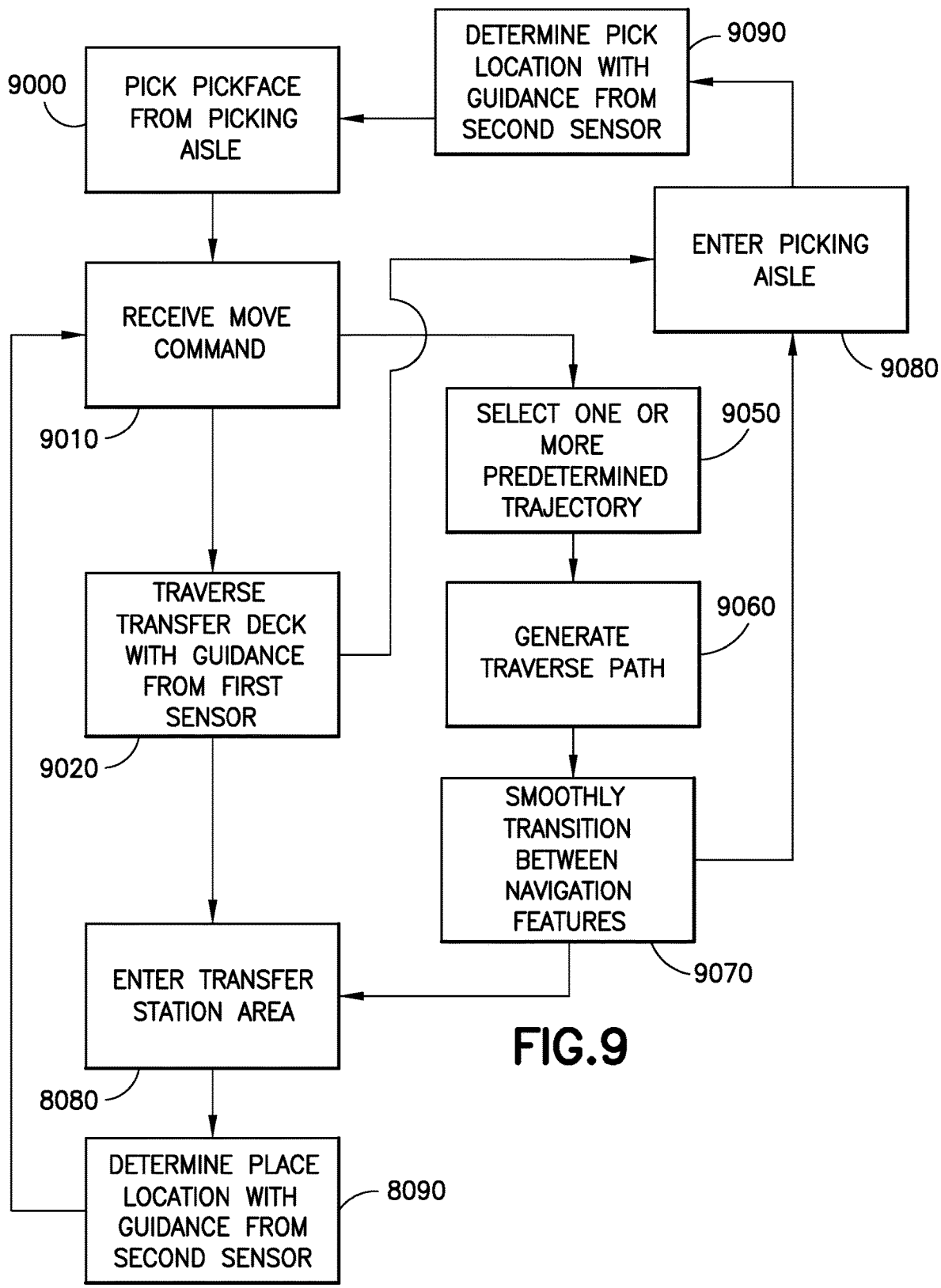
FIG. 9 is a flow diagram in accordance with aspects of the disclosed embodiment.
Figure 10:
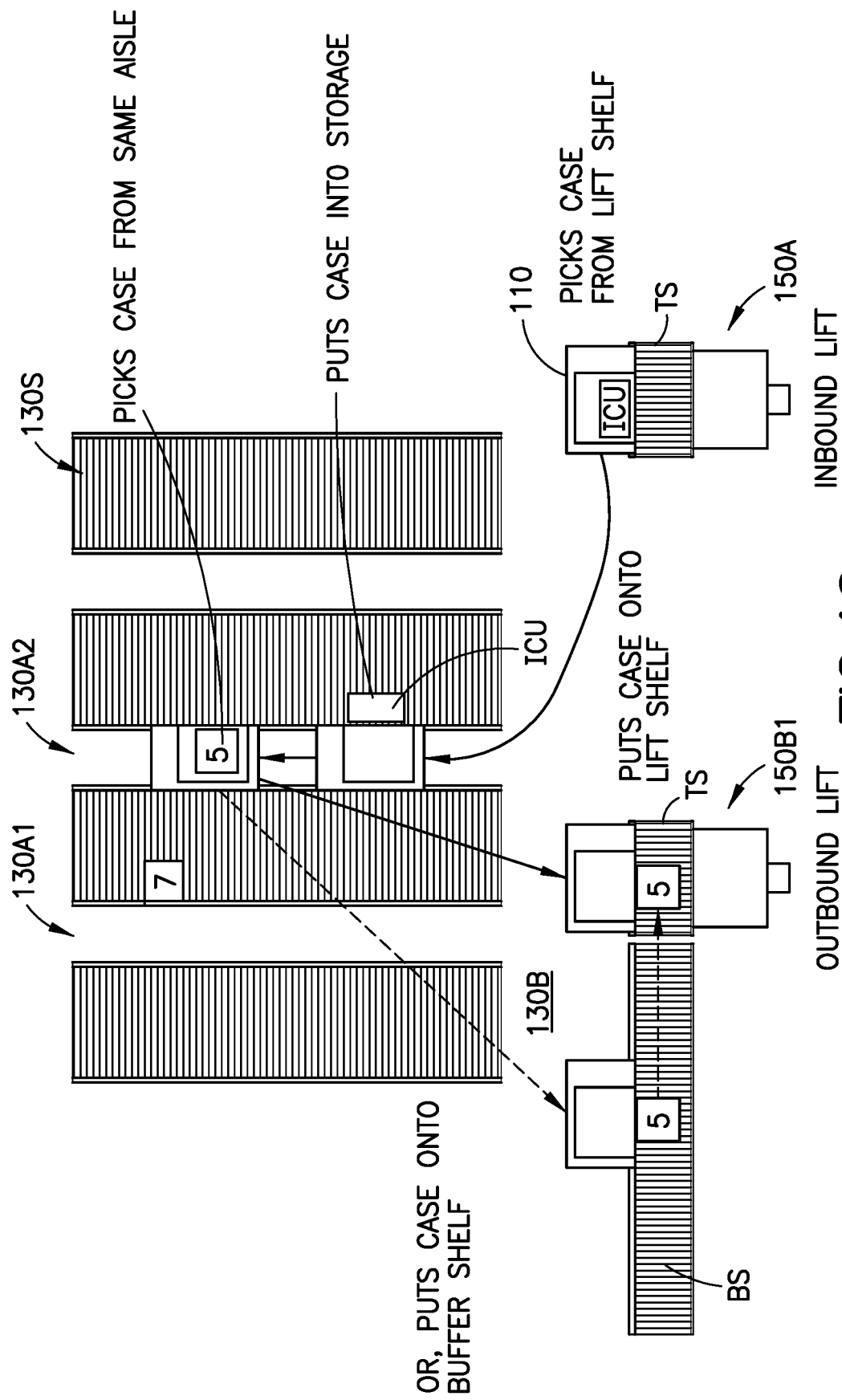
FIGS. 10-12 are schematic illustrations of portions of the storage and retrieval system in accordance with aspects of the disclosed embodiment.

As another example, the bot 110 is configured to transfer one or more pickfaces between one or more picking aisles 130A and one or more transfer stations TS or buffer stations BS in a manner substantially similar to that described above. Referring to FIG. 4, to transfer one or more pickfaces from one or more storage locations in the picking aisles 130A to one or more lift modules 150 the bot 110 picks a pickface from, for example, a storage location in a picking aisle 13A (FIG. 9, Block 9000). The bot 110 receives a move command from, for example, controller 120 (FIG. 1) where the move command includes at least a starting waypoint (such as waypoint WP1 which may be a location along a guidance feature on the transfer deck that the bot 110 is travelling along after picking the pickface from the storage location) and an ending waypoint (such as WP3) for a bot transport path BTP (FIG. 9, Block 9010). In one aspect the move command instructs the bot 110 to pick another pickface from another picking aisle in which case the bot traverses the transfer deck 130B with guidance from a first sensor, such as index sensor 6000, where the bot 110 follows a guidance/navigation feature lONG1-LONG3, LAT1-LAT7 of the transfer deck 130B. Coincident with high speed bot traverse along the transfer deck 130B (FIG. 9, Block 9020) under guidance of a first sensor (such as index sensor 6000), the bot controller 110C selects one or more predetermined trajectory 6042T (FIG. 9, Block 9050), as described above based on, e.g., the boundary conditions at the start of the trajectory and the end of the trajectory and/or the length L between the start point and end point, to allow the bot to travel from the first waypoint WP1 to the second waypoint WP3 (e.g. corresponding to a destination of the bot) such as corresponding to the another picking aisle 130A1. The controller 110C generates the traverse path (e.g. such as bot transport path BTP which in one aspect includes a combination of simple curves, a straight line portions and S-shaped curves) connecting the first and second waypoints WP1, WP3 (FIG. 9, Block 9060), as described above from the selected trajectories 6042T, so that the bot smoothly transitions between the guidance/navigation features lONG1-LONG3, LAT1-LAT7 of the transfer deck 130B (FIG. 9, Block 9070). In the case of bot 110 traverse between picking aisles one exemplary bot transport path BTP is illustrated in FIG. 4 where bot 110 may exit a driveway or a picking aisle and travel along guidance feature LONG1 of the transfer deck 130B. The bot controller 110C selects predetermined trajectories 6042T so that the bot 110 smoothly departs from guidance feature LONG1, smoothly merges onto guidance feature LONG2, smoothly departs from guidance feature LONG2 and then smoothly merges onto guidance feature LAT1 for entering another picking aisle 130A1. The bot 110 continues to follow the bot transport path BTP and transitions between guidance features LAT7, LONG2, LAT3 for arrival at waypoint WP3, which in this example corresponds to the entrance to picking aisle 130A1 at which the other pickface(s) to be picked is located. Upon entry to the picking aisle the bot 110 transitions from guidance with the index sensor 6000 to other sensors in the array of sensors 6001 for determining, in any suitable manner, a location of a storage location from which a pickface is to be picked (FIG. 9, Block 9090). In other aspects the bot 110 may use any suitable sensors for guidance in the picking aisle 130A1. The pickface is picked (FIG. 9, Block 9000) and the bot 110 receives another move command (FIG. 9, Block 9010) for placing the one or more pickfaces at one or more transfer stations TS or buffer stations BS in a manner substantially similar to that described above (FIG. 9, Blocks 8080, 8090).

As may be realized, where the bot 110 places the one or more pickfaces at different transfer stations TS or buffer stations BS the bot places one or more pickfaces at a first transfer station, such as in driveway 130BW1 as described above (FIG. 9, Block 8090) and receives another move command (FIG. 9, Block 9010) including waypoints from one transfer station to another transfer station (e.g. such as between transfer stations located in driveways 130BW1, 130BW2). The bot selects time-optimal trajectories for forming a transport path, such as path BTP2 or any other suitable path in a manner substantially similar to that described above for traversing between the driveways 130BW1, 130BW2.

In a manner substantially similar to that described above, the second move command may include the start and end waypoints (e.g. the start waypoint WP6 corresponding to, for example, the exit of the driveway 130BW2 and the end waypoint WP7 corresponding to the entrance to the picking aisle 130A5). Coincident with high speed bot traverse along the open undeterministic surface of the transfer deck 130B (FIG. 8, Block 8020) under guidance of the first sensor (such as index sensor 6000), the bot controller 110C selects one or more predetermined trajectory 6042T (FIG. 8, Block 8050), as described above, to allow the bot to travel from the first waypoint WP6 to the second waypoint WP7 corresponding to the picking aisle 130A5. The controller 110C generates the traverse path (e.g. such as bot transport path BTP3 which in one aspect includes a compound S-shaped curve connecting the guidance features LAT3 and LAT4 as well as the first and second waypoints WP6, WP7 (FIG. 8, Block 8060), as described above from the selected trajectories 6042T, so that the bot smoothly transitions between the guidance/navigation features LAT3, LAT4 of the transfer deck 130B (FIG. 8, Block 8070). When at waypoint WP7 the bot 110 has the proper pose (e.g. such as pose P2) for entering the picking aisle (FIG. 8, Block 8030) where bot 110 guidance transitions from the index sensor 6000 to another sensor in the array of sensors 6001 (as noted above) for determining a place location(s) of the one or more pickfaces (FIG. 8, Block 8040) in any suitable manner.

As described above, in accordance with aspects of the disclosed embodiment the bots 110 navigate between transfer deck 130B positions, including picking aisles 130A and driveways 130BW, using simple and/or complex curves resulting from simple or complex trajectories. These curves, in one aspect, have more than one opposing radius turn, which when strung in combination form general S-shaped curves (see, e.g., FIGS. 4 and 6B). The trajectories 6042T that form the curves along which the bot 110 traverses allow for blended radius and substantially unconstrained turns by the bot 110 (e.g. the trajectories 6042T allow for both rotation/pivot and axial/longitudinal motion of the bot 110 to occur in combination and simultaneously, rather than serially as in conventional system where the bot slows and then pivots to make a 90° turn at an intersection of guide features). The bot navigation described herein provides for the decoupling between bot 110 turn considerations and the transfer deck 130B features to which the bot 110 is commanded such as bot lanes (e.g. formed by the navigation feature array 3000), picking aisles 130A, driveways 130BW, buffer stations BS, transfer stations TS and any other suitable location of the storage and retrieval system. As may be realized, the bot 110 paths are unconstrained by the travel lanes, allowing near direct cross deck travel (in both X and Y directions—see FIG. 4) while maintaining optimum bot 110 kinematics (such as e.g. minimum bot travel time).

In accordance with one or more aspects of the disclosed embodiment a storage array system includes
  an open undeterministic transport surface;
  a navigation array disposed in connection with the transport surface, at least a portion of the navigation array includes a distributed feature, defining a linear direction along the open undeterministic transport surface, and that has a first waypoint at a first position of the distributed feature, and the portion has a second waypoint displaced from the first waypoint along the distributed feature and offset with respect to the first waypoint in a direction angled to the linear direction; and
  an automated guided bot, arranged to traverse the transport surface, with a non-holonomic steering system, the automated guided bot having a bot pose determination system employing sensor data detecting the distributed feature;
  wherein the automated guided bot includes a controller configured to generate a substantially smooth curved bot traverse path on the transport surface connecting the first and second waypoints with a predetermined optimal trajectory of the automated guided bot along the traverse path determined based on a bot dynamic model.

In accordance with one or more aspects of the disclosed embodiment the predetermined optimal trajectory is optimal with respect to time.

In accordance with one or more aspects of the disclosed embodiment, the predetermined optimal trajectory is unparameterized.

In accordance with one or more aspects of the disclosed embodiment the traverse path has a first portion smoothly branching from the linear direction defined by the distributed feature and a second portion smoothly merging onto another linear direction associated with the second waypoint.

In accordance with one or more aspects of the disclosed embodiment the linear direction and the other linear direction have a common orientation with respect to the transport surface.

In accordance with one or more aspects of the disclosed embodiment the linear direction and the other linear direction have different orientations so that the other linear direction crosses the linear direction.

In accordance with one or more aspects of the disclosed embodiment the first and second portions have different curvatures.

In accordance with one or more aspects of the disclosed embodiment at least a portion of the traverse path is disposed so that as the automated guided bot travels on the traverse path, bot pose sensors of the bot pose determination system, determining bot pose when at the first waypoint, depart sensor range of the portion of the distributed feature of the navigation array capable of determining bot pose prior to acquisition of new sensor data from the bot pose sensors of another portion of the distributed feature of the navigation array capable of determining bot pose.

In accordance with one or more aspects of the disclosed embodiment at least a portion of the traverse path is disposed so that as the automated guided bot travels on the traverse path, bot pose sensors, determining bot pose when at the first waypoint, depart sensor range of the portion of the distributed features defining the linear direction on which bot pose determination is dependent when at the first waypoint prior to acquisition of new sensor data from the bot pose sensors of the linearly distributed of the navigation array capable of determining bot pose.

In accordance with one or more aspects of the disclosed embodiment the distributed feature is uncoded.

In accordance with one or more aspects of the disclosed embodiment the second waypoint is positioned on another distributed feature defining another linear direction.

In accordance with one or more aspects of the disclosed embodiment the bot pose determination system determines bot pose with bot wheel odometry.

In accordance with one or more aspects of the disclosed embodiment at least one of the first and second waypoints is a node disposed at an intersection of the linear direction with another linear direction defined by the navigation array.

In accordance with one or more aspects of the disclosed embodiment the traverse path bypasses other waypoints along the linear direction located between the first and second waypoints.

In accordance with one or more aspects of the disclosed embodiment the traverse path crosses another distributed feature of the navigation array defining another linear direction located between the first waypoint and the second waypoint.

In accordance with one or more aspects of the disclosed embodiment the predetermined optimal trajectory of the traverse path is dynamically selected by the controller.

In accordance with one or more aspects of the disclosed embodiment the automated guided bot includes drive wheels and a drive that employs differential torque at the drive wheels for steering the automated guided bot.

In accordance with one or more aspects of the disclosed embodiment the storage array system further includes a storage array having storage aisles, wherein the traverse path crosses another distributed feature of the navigation array defining another linear direction located between the first waypoint and the second waypoint, and at least one of the linear direction and the other linear direction connects storage aisles to each other.

In accordance with one or more aspects of the disclosed embodiment the storage array system further includes a storage array having storage aisles, wherein the traverse path crosses another distributed feature of the navigation array defining another linear direction located between the first waypoint and the second waypoint, and at least one of the linear direction and the other linear direction crosses storage aisles.

In accordance with one or more aspects of the disclosed embodiment the storage array system further includes a storage array having storage aisles, wherein the traverse path crosses another distributed feature of the navigation array defining another linear direction located between the first waypoint and the second waypoint, and at least one of the linear direction and the other linear direction is aligned with at least one storage aisle.

In accordance with one or more aspects of the disclosed embodiment the storage array system further includes a storage array having storage aisles wherein one or more of the first and second waypoints are located at an opening to at least one storage aisle.

In accordance with one or more aspects of the disclosed embodiment the storage array system further includes a storage array having storage aisles and one or more of an interface station driveway and a buffer station, wherein the traverse path crosses another distributed feature of the navigation array defining another linear direction located between the first waypoint and the second waypoint, and at least one of the linear direction and the other linear direction connects the storage aisles to the one or more of the interface station driveway and the buffer station.

In accordance with one or more aspects of the disclosed embodiment the storage array system further includes a storage array having storage aisles and one or more of an interface station driveway and a buffer station, wherein the traverse path crosses another distributed feature of the navigation array defining another linear direction located between the first waypoint and the second waypoint, and at least one of the linear direction and the other linear direction connects one of the one or more of the interface station drive and the buffer station to another of the one or more interface station and the buffer station.

In accordance with one or more aspects of the disclosed embodiment the storage array system further includes a storage array having storage aisles and one or more of an interface station driveway and a buffer station, wherein the traverse path crosses another distributed feature of the navigation array defining another linear direction located between the first waypoint and the second waypoint, and at least one of the linear direction and the other linear direction crosses the one or more of the interface station driveway and the buffer station.

In accordance with one or more aspects of the disclosed embodiment the storage array system further includes a storage array having storage aisles and one or more of an interface station driveway and a buffer station, wherein the traverse path crosses another distributed feature of the navigation array defining another linear direction located between the first waypoint and the second waypoint, and at least one of the linear direction and the other linear direction is aligned with the one or more of the interface station driveway and the buffer station.

In accordance with one or more aspects of the disclosed embodiment the storage array system further includes a storage array having storage aisles and one or more of an interface station driveway and a buffer station, wherein at least one of the first and second waypoint is disposed at an opening of at least one of the interface station driveway.

In accordance with one or more aspects of the disclosed embodiment the storage array system further includes a storage array having storage aisles and one or more of an interface station driveway and a buffer station, wherein at least one of the first and second waypoint is disposed at a holding location of at least one of the buffer station.

In accordance with one or more aspects of the disclosed embodiment the storage array system further includes a storage array having storage aisles wherein the linear direction connects the storage aisles and is disposed adjacent an opening of each connected aisle independent of one or more of a minimum automated guided bot turn radius and an automated guided bot wheelbase.

In accordance with one or more aspects of the disclosed embodiment the storage array system further includes a storage array having storage aisles and an interface station driveway, wherein the first waypoint is proximate and aligned with an aisle opening and the second waypoint is proximate and aligned with an opening of the interface station driveway such that an offset between the linear direction associated with the first waypoint and another linear direction associated with the second waypoint is independent from an automated guided bot dimension.

In accordance with one or more aspects of the disclosed embodiment a storage array system includes
an open undeterministic transport surface;
a navigation array disposed along the open undeterministic transport surface, at least a portion of the navigation array includes a distributed feature, defining a linear direction, and that has a first predetermined waypoint on the open undeterministic transport surface at a first position of the linear direction, and the portion of the navigation array has a second predetermined waypoint offset from the first waypoint in a direction angled to and crossing the linear direction; and
an automated guided bot, arranged to traverse the open undeterministic transport surface, with a non-holonomic steering system, and a controller that has a bot pose determination system configured for traversing along the linear direction dependent on bot sensor data sensing the distributed feature;
wherein the controller is configured to generate a substantially smooth curving bot traverse path on the open undeterministic transport surface connecting the first and second predetermined waypoints that branches, at a branch point location, from the linear direction and has a predetermined time optimal trajectory, and wherein the branch point location of the curved bot traverse path is freely selectable along the linear direction by the controller for effecting the time optimal trajectory from the first to the second predetermined waypoints.

In accordance with one or more aspects of the disclosed embodiment the first predetermined waypoint is disposed along the linear direction and the second predetermined waypoint is disposed along a second linear direction crossing the linear direction.

In accordance with one or more aspects of the disclosed embodiment the traverse path branches, at a second branch point location, onto a second linear direction on which the second predetermined waypoint is located, and wherein the second branch point is freely selectable along the second linear direction by the controller for effecting the optimal trajectory from the first and second predetermined waypoints.

In accordance with one or more aspects of the disclosed embodiment at least a portion of the traverse path is disposed so that as the automated guided bot travels on the traverse path, bot pose sensors of the bot pose determination system, determining bot pose when at the first predetermined waypoint, depart sensor range of the linear direction of the navigation array capable of determining bot pose prior to acquisition of new sensor data from the bot pose sensors of another linear direction of the navigation array capable of determining bot pose.

In accordance with one or more aspects of the disclosed embodiment the predetermined optimal trajectory of the traverse path is determined based on a dynamic model of the automated guided bot.

In accordance with one or more aspects of the disclosed embodiment the predetermined optimal trajectory of the traverse path is dynamically selected by the controller.

In accordance with one or more aspects of the disclosed embodiment, the predetermined time optimal trajectory is unparameterized.

In accordance with one or more aspects of the disclosed embodiment the automated guided bot includes drive wheels and a drive that employs differential torque at the drive wheels for steering the automated guided bot.

In accordance with one or more aspects of the disclosed embodiment the storage array system further includes a storage array having storage aisles, wherein the linear direction has a linear guideline and the traverse path crosses another linear direction of the navigation array defining another linear guideline located between the first predetermined waypoint and the second predetermined waypoint, and at least one of the linear direction and the other linear direction connects storage aisles to each other.

In accordance with one or more aspects of the disclosed embodiment the storage array system further includes a storage array having storage aisles, wherein the linear direction has a linear guideline and the traverse path crosses another linear direction of the navigation array defining another linear guideline located between the first predetermined waypoint and the second predetermined waypoint, and at least one of the linear direction and the other linear direction crosses storage aisles.

In accordance with one or more aspects of the disclosed embodiment the storage array system further includes a storage array having storage aisles, wherein the linear direction has a linear guideline and the traverse path crosses another linear direction of the navigation array defining another linear guideline located between the first predetermined waypoint and the second predetermined waypoint, and at least one of the linear direction and the other linear direction is aligned with at least one storage aisle.

In accordance with one or more aspects of the disclosed embodiment the storage array system further includes a storage array having storage aisles wherein one or more of the first and second predetermined waypoints are located at an opening to at least one storage aisle.

In accordance with one or more aspects of the disclosed embodiment the storage array system further includes a storage array having storage aisles and one or more of an interface station driveway and a buffer station, wherein the linear direction has a linear guideline and the traverse path crosses another linear direction of the navigation array defining another linear guideline located between the first predetermined waypoint and the second predetermined waypoint, and at least one of the linear direction and the other linear direction connects the storage aisles to the one or more of the interface station driveway and the buffer station.

In accordance with one or more aspects of the disclosed embodiment the storage array system further includes a storage array having storage aisles and one or more of an interface station driveway and a buffer station, wherein the linear direction has a linear guideline and the traverse path crosses another linear direction of the navigation array defining another linear guideline located between the first predetermined waypoint and the second predetermined waypoint, and at least one of the linear direction and the other linear direction connects one of the one or more of the interface station drive and the buffer station to another of the one or more interface station and the buffer station.

In accordance with one or more aspects of the disclosed embodiment the storage array system further includes a storage array having storage aisles and one or more of an interface station driveway and a buffer station, wherein linear direction has a linear guideline and the traverse path crosses another linear direction of the navigation array defining another linear guideline located between the first predetermined waypoint and the second predetermined waypoint, and at least one of the linear direction and the other linear direction crosses the one or more of the interface station driveway and the buffer station.

In accordance with one or more aspects of the disclosed embodiment the storage array system further includes a storage array having storage aisles and one or more of an interface station driveway and a buffer station, wherein linear direction has a linear guideline and the traverse path crosses another linear direction of the navigation array defining another linear guideline located between the first predetermined waypoint and the second predetermined waypoint, and at least one of the linear direction and the other linear direction is aligned with the one or more of the interface station driveway and the buffer station.

In accordance with one or more aspects of the disclosed embodiment the storage array system further includes a storage array having storage aisles and one or more of an interface station driveway and a buffer station, wherein at least one of the first and second predetermined waypoint is disposed at an opening of at least one of the interface station driveway.

In accordance with one or more aspects of the disclosed embodiment the storage array system further includes a storage array having storage aisles and one or more of an interface station driveway and a buffer station, wherein at least one of the first and second predetermined waypoint is disposed at a holding location of at least one of the buffer station.

In accordance with one or more aspects of the disclosed embodiment the storage array system further includes a storage array having storage aisles wherein the linear direction connects the storage aisles and is disposed adjacent an opening of each connected aisle independent of one or more of a minimum automated guided bot turn radius and an automated guided bot wheelbase.

In accordance with one or more aspects of the disclosed embodiment the storage array system further includes a storage array having storage aisles and an interface station driveway, wherein the first predetermined waypoint is proximate and aligned with an aisle opening and the second predetermined waypoint is proximate and aligned with an opening of the interface station driveway such that an offset between a linear direction associated with the first predetermined waypoint and another linear direction associated with the second predetermined waypoint is independent from an automated guided bot dimension.

In accordance with one or more aspects of the disclosed embodiment a storage array system includes
an open undeterministic transport surface;
a navigation array disposed along the transport surface, at least a portion of the navigation array includes a distributed feature, defining a linear direction, and that has a first predetermined waypoint on the transport surface at a first position of the linear direction, and the portion has a second predetermined waypoint offset from the first predetermined waypoint in a direction angled to and crossing the linear direction; and
an automated guided bot, arranged to traverse the transport surface, with a non-holonomic steering system, the automated guided bot having integral therewith a controller and a bot pose determination system employing sensor data detecting the linear direction;
wherein the controller being configured to generate a substantially smooth bot traverse path, at least a portion of which is curved, on the transport surface connecting the first and second predetermined waypoints that branches, at a branch point location, from the linear direction and has an optimal trajectory, and wherein the branch point location of the curved portion of the smooth bot traverse path is freely selectable along the linear direction by the controller for effecting the optimal trajectory from the first predetermined waypoint to the second predetermined waypoint, and
the controller is programmed with at least one set of predetermined trajectories that define the optimal trajectory connecting the first and second predetermined waypoints on the smooth bot traverse path.

In accordance with one or more aspects of the disclosed embodiment the at least one set of predetermined trajectories comprises more than one predetermined optimal trajectory that are combined dynamically by the controller to define the optimal trajectory connecting the first and second predetermined waypoints on the smooth bot traverse path.

In accordance with one or more aspects of the disclosed embodiment at least one of the predetermined trajectories of the at least one set of predetermined trajectories defines an optimal unparameterized trajectory on a smooth curved bot path portion of the smooth bot traverse path.

In accordance with one or more aspects of the disclosed embodiment the at least one predetermined trajectory defines a smooth curved bot path portion that smoothly branches the bot traverse path from the linear direction.

In accordance with one or more aspects of the disclosed embodiment the controller is configured to dynamically select at least one predetermined trajectory defining a smooth curved path with an optimal trajectory, from a number of other different predetermined trajectories programmed in the controller, and dynamically generate with the dynamically selected at least one predetermined trajectory at least one selected set of one or more dynamically selected predetermined trajectories that defines the curved portion of the smooth bot traverse path with the optimal trajectory connecting first and second predetermined waypoints on the smooth bot traverse path.

In accordance with one or more aspects of the disclosed embodiment the other different predetermined trajectories each define a different smooth curved path with optimal trajectory of the automated guided bot.

In accordance with one or more aspects of the disclosed embodiment the controller is configured to dynamically generate the optimal trajectory by selecting at least one predetermined trajectory from a number of other predetermined trajectories programmed in the controller.

In accordance with one or more aspects of the disclosed embodiment the at least one set of predetermined trajectories comprises more than one predetermined unparameterized trajectory, at least one of which is an optimal trajectory that defines a simple or a compound curve bot path.

In accordance with one or more aspects of the disclosed embodiment the at least one set of predetermined trajectories comprises more than one predetermined unparameterized trajectory, at least one of which is an optimal trajectory defining a curved bot path and at least another is a trajectory that defines a linear bot path.

In accordance with one or more aspects of the disclosed embodiment different ones of at least one predetermined trajectory in the at least one set of predetermined trajectories are based on and correspond to different payloads of the bot.

In accordance with one or more aspects of the disclosed embodiment a method for generating an automated guided bot trajectory is provided. The method includes
providing an open undeterministic transport surface in a storage array system where the undeterministic transport surface includes a navigation array disposed along the transport surface, at least a portion of the navigation array includes a distributed feature, defining a linear direction, and that has a first predetermined waypoint on the transport surface at a first position of the linear direction, and the portion has a second predetermined waypoint offset from the first predetermined waypoint in a direction angled to and crossing the linear direction;
providing an automated guided bot, arranged to traverse the transport surface, with a non-holonomic steering system, where the automated guided bot includes integral therewith a controller and a bot pose determination system employing sensor data detecting the linear direction; and
generating, with the controller, a substantially smooth bot traverse path, at least a portion of which is curved, on the transport surface connecting the first and second predetermined waypoints that branches, at a branch point location, from the linear guideline and has an optimal trajectory, and wherein the branch point location of the curved portion of the bot traverse path is freely selectable along the linear guideline by the controller for effecting the optimal trajectory from the first predetermined waypoint to the second predetermined waypoint;
wherein the controller is programmed with at least one set of predetermined trajectories that define the optimal trajectory connecting the first and second predetermined waypoints on the smooth bot traverse path.

In accordance with one or more aspects of the disclosed embodiment the method further includes dynamically combining, with the controller, more than one predetermined optimal trajectory of the at least one set of predetermined trajectories to define the optimal trajectory connecting the first and second predetermined waypoints on the smooth bot traverse path.

In accordance with one or more aspects of the disclosed embodiment at least one of the predetermined trajectories of the at least one set of predetermined trajectories defines an optimal unparameterized trajectory on a smooth curved bot path portion of the smooth bot traverse path.

In accordance with one or more aspects of the disclosed embodiment the at least one predetermined trajectory defines a smooth curved bot path portion that smoothly branches the bot traverse path from the linear direction.

In accordance with one or more aspects of the disclosed embodiment the method further includes dynamically selecting, with the controller, at least one predetermined trajectory defining a smooth curved path with an optimal trajectory, from a number of other different predetermined trajectories programmed in the controller, and dynamically generating with the dynamically selected at least one predetermined trajectory at least one selected set of one or more dynamically selected predetermined trajectories that defines the curved portion of the smooth bot traverse path with the optimal trajectory connecting first and second predetermined waypoints on the smooth bot traverse path.

In accordance with one or more aspects of the disclosed embodiment the other different predetermined trajectories each define a different smooth curved path with optimal trajectory of the automated guided bot.

In accordance with one or more aspects of the disclosed embodiment the method further includes dynamically generating, with the controller, the optimal trajectory by selecting at least one predetermined trajectory from a number of other predetermined trajectories programmed in the controller.

In accordance with one or more aspects of the disclosed embodiment the at least one set of predetermined trajectories comprises more than one predetermined unparameterized trajectory, at least one of which is an optimal trajectory that defines a simple or a compound curve bot path.

In accordance with one or more aspects of the disclosed embodiment the at least one set of predetermined trajectories comprises more than one predetermined unparameterized trajectory, at least one of which is an optimal trajectory defining a curved bot path and at least another is a trajectory that defines a linear bot path.

In accordance with one or more aspects of the disclosed embodiment different ones of at least one predetermined trajectory in the at least one set of predetermined trajectories are based on and correspond to different payloads of the bot.

In accordance with one or more aspects of the disclosed embodiment a method for transporting payload in a storage array system is provided. The method includes providing an open undeterministic transport surface where a navigation array is disposed in connection with the transport surface and at least a portion of the navigation array includes a distributed feature, defining a linear direction along the open undeterministic transport surface, and that has a first waypoint at a first position of the distributed feature, and the portion has a second waypoint displaced from the first waypoint along the distributed feature and offset with respect to the first waypoint in a direction angled to the linear direction;

providing an automated guided bot for transporting payload in the storage array system and being arranged to traverse the transport surface, with a non-holonomic steering system, where the automated guided bot includes a bot pose determination system employing sensor data detecting the distributed feature; and generating, with a controller of the automated guided bot, a substantially smooth curved bot traverse path on the transport surface connecting the first and second waypoints with a predetermined optimal trajectory of the automated guided bot along the traverse path determined based on a bot dynamic model.

In accordance with one or more aspects of the disclosed embodiment the predetermined optimal trajectory is optimal with respect to time.

In accordance with one or more aspects of the disclosed embodiment, the predetermined optimal trajectory is unparameterized.

In accordance with one or more aspects of the disclosed embodiment the traverse path is generated so as to have a first portion smoothly branching from the linear direction defined by the distributed feature and a second portion smoothly merging onto another linear direction associated with the second waypoint.

In accordance with one or more aspects of the disclosed embodiment the linear direction and the other linear direction have a common orientation with respect to the transport surface.

In accordance with one or more aspects of the disclosed embodiment the linear direction and the other linear direction have different orientations so that the other linear direction crosses the linear direction.

In accordance with one or more aspects of the disclosed embodiment the first and second portions have different curvatures.

In accordance with one or more aspects of the disclosed embodiment at least a portion of the traverse path is disposed so that as the automated guided bot travels on the traverse path, bot pose sensors of the bot pose determination system, determining bot pose when at the first waypoint, depart sensor range of the portion of the distributed feature of the navigation array capable of determining bot pose prior to acquisition of new sensor data from the bot pose sensors of another portion of the distributed feature of the navigation array capable of determining bot pose.

In accordance with one or more aspects of the disclosed embodiment at least a portion of the traverse path is disposed so that as the automated guided bot travels on the traverse path, bot pose sensors, determining bot pose when at the first waypoint, depart sensor range of the portion of the distributed features defining the linear direction on which bot pose determination is dependent when at the first waypoint prior to acquisition of new sensor data from the bot pose sensors of the linearly distributed of the navigation array capable of determining bot pose.

In accordance with one or more aspects of the disclosed embodiment the distributed feature is uncoded.

In accordance with one or more aspects of the disclosed embodiment the second waypoint is positioned on another distributed feature defining another linear direction.

In accordance with one or more aspects of the disclosed embodiment the method further includes determining, with the bot pose determination system, bot pose with bot wheel odometry.

In accordance with one or more aspects of the disclosed embodiment at least one of the first and second waypoints is disposed at an intersection of the linear direction with another linear direction defined by the navigation array.

In accordance with one or more aspects of the disclosed embodiment the traverse path bypasses other waypoints along the linear direction located between the first and second waypoints.

In accordance with one or more aspects of the disclosed embodiment the traverse path crosses another distributed feature of the navigation array defining another linear direction located between the first waypoint and the second waypoint.

In accordance with one or more aspects of the disclosed embodiment the method further includes dynamically selecting, with the controller, the predetermined optimal trajectory of the traverse path.

In accordance with one or more aspects of the disclosed embodiment the automated guided bot includes drive wheels and a drive that employs differential torque at the drive wheels for steering the automated guided bot.

In accordance with one or more aspects of the disclosed embodiment the method further includes providing a storage array having storage aisles, wherein the traverse path crosses another distributed feature of the navigation array defining another linear direction located between the first waypoint and the second waypoint, and at least one of the linear direction and the other linear direction connects storage aisles to each other.

In accordance with one or more aspects of the disclosed embodiment the method further includes providing a storage array having storage aisles, wherein the traverse path crosses another distributed feature of the navigation array defining another linear direction located between the first waypoint and the second waypoint, and at least one of the linear direction and the other linear direction crosses storage aisles.

In accordance with one or more aspects of the disclosed embodiment the method further includes providing a storage array having storage aisles, wherein the traverse path crosses another distributed feature of the navigation array defining another linear direction located between the first waypoint and the second waypoint, and at least one of the linear direction and the other linear direction is aligned with at least one storage aisle.

In accordance with one or more aspects of the disclosed embodiment the method further includes providing a storage array having storage aisles wherein one or more of the first and second waypoints are located at an opening to at least one storage aisle.

In accordance with one or more aspects of the disclosed embodiment the method further includes providing a storage array having storage aisles and one or more of an interface station driveway and a buffer station, wherein the traverse path crosses another distributed feature of the navigation array defining another linear direction located between the first waypoint and the second waypoint, and at least one of the linear direction and the other linear direction connects the storage aisles to the one or more of the interface station driveway and the buffer station.

In accordance with one or more aspects of the disclosed embodiment the method further includes providing a storage array having storage aisles and one or more of an interface station driveway and a buffer station, wherein the traverse path crosses another distributed feature of the navigation array defining another linear direction located between the first waypoint and the second waypoint, and at least one of the linear direction and the other linear direction connects one of the one or more of the interface station drive and the buffer station to another of the one or more interface station and the buffer station.

In accordance with one or more aspects of the disclosed embodiment the method further includes providing a storage array having storage aisles and one or more of an interface station driveway and a buffer station, wherein the traverse path crosses another distributed feature of the navigation array defining another linear direction located between the first waypoint and the second waypoint, and at least one of the linear direction and the other linear direction crosses the one or more of the interface station driveway and the buffer station.

In accordance with one or more aspects of the disclosed embodiment the method further includes providing a storage array having storage aisles and one or more of an interface station driveway and a buffer station, wherein the traverse path crosses another distributed feature of the navigation array defining another linear direction located between the first waypoint and the second waypoint, and at least one of the linear direction and the other linear direction is aligned with the one or more of the interface station driveway and the buffer station.

In accordance with one or more aspects of the disclosed embodiment the method further includes providing a storage array having storage aisles and one or more of an interface station driveway and a buffer station, wherein at least one of the first and second waypoint is disposed at an opening of at least one of the interface station driveway.

In accordance with one or more aspects of the disclosed embodiment the method further includes providing a storage array having storage aisles and one or more of an interface station driveway and a buffer station, wherein at least one of the first and second waypoint is disposed at a holding location of at least one of the buffer station.

In accordance with one or more aspects of the disclosed embodiment the method further includes providing a storage array having storage aisles wherein the linear direction connects the storage aisles and is disposed adjacent an opening of each connected aisle independent of one or more of a minimum automated guided bot turn radius and an automated guided bot wheelbase.

In accordance with one or more aspects of the disclosed embodiment the method further includes providing a storage array having storage aisles and an interface station driveway, wherein the first waypoint is proximate and aligned with an aisle opening and the second waypoint is proximate and aligned with an opening of the interface station driveway such that an offset between the linear direction associated with the first waypoint and another linear direction associated with the second waypoint is independent from an automated guided bot dimension.

In accordance with one or more aspects of the disclosed embodiment a method for transporting payload in a storage array system is provided. The method includes providing an open undeterministic transport surface having a navigation array disposed along the open undeterministic transport surface, at least a portion of the navigation array includes a distributed feature, defining a linear direction, and that has a first predetermined waypoint on the open undeterministic transport surface at a first position of the linear direction, and the portion of the navigation array has a second predetermined waypoint offset from the first waypoint in a direction angled to and crossing the linear direction;

providing an automated guided bot, arranged to traverse the open undeterministic transport surface, with a non-holonomic steering system, and a controller that has a bot pose determination system configured for traversing along the linear direction dependent on bot sensor data sensing the distributed feature; and generating, with the controller, a substantially smooth curving bot traverse path on the open undeterministic transport surface connecting the first and second predetermined waypoints that branches, at a branch point location, from the linear direction and has a predetermined time optimal trajectory, and wherein the branch point location of the curved bot traverse path is freely selectable along the linear direction by the controller for effecting the time optimal trajectory from the first to the second predetermined waypoints.

In accordance with one or more aspects of the disclosed embodiment the first predetermined waypoint is disposed along the linear direction and the second predetermined waypoint is disposed along a second linear direction crossing the linear direction.

In accordance with one or more aspects of the disclosed embodiment the traverse path branches, at a second branch point location, onto a second linear direction on which the second predetermined waypoint is located, and wherein the second branch point is freely selectable along the second linear direction by the controller for effecting the optimal trajectory from the first and second predetermined waypoints.

In accordance with one or more aspects of the disclosed embodiment at least a portion of the traverse path is disposed so that as the automated guided bot travels on the traverse path, bot pose sensors of the bot pose determination system, determining bot pose when at the first predetermined waypoint, depart sensor range of the linear direction of the navigation array capable of determining bot pose prior to acquisition of new sensor data from the bot pose sensors of another linear direction of the navigation array capable of determining bot pose.

In accordance with one or more aspects of the disclosed embodiment the method further includes determining the predetermined optimal trajectory of the traverse path based on a dynamic model of the automated guided bot.

In accordance with one or more aspects of the disclosed embodiment the method further includes dynamically selecting, with the controller, the predetermined optimal trajectory of the traverse path.

In accordance with one or more aspects of the disclosed embodiment, the predetermined time optimal trajectory is unparameterized.

In accordance with one or more aspects of the disclosed embodiment the automated guided bot includes drive wheels and a drive that employs differential torque at the drive wheels for steering the automated guided bot.

In accordance with one or more aspects of the disclosed embodiment the method further includes providing a storage array having storage aisles, wherein the linear direction has a linear guideline and the traverse path crosses another linear direction of the navigation array defining another linear guideline located between the first predetermined waypoint and the second predetermined waypoint, and at least one of the linear direction and the other linear direction connects storage aisles to each other.

In accordance with one or more aspects of the disclosed embodiment the method further includes providing a storage array having storage aisles, wherein the linear direction has a linear guideline and the traverse path crosses another linear direction of the navigation array defining another linear guideline located between the first predetermined waypoint and the second predetermined waypoint, and at least one of the linear direction and the other linear direction crosses storage aisles.

In accordance with one or more aspects of the disclosed embodiment the method further includes providing a storage array having storage aisles, wherein the linear direction has a linear guideline and the traverse path crosses another linear direction of the navigation array defining another linear guideline located between the first predetermined waypoint and the second predetermined waypoint, and at least one of the linear direction and the other linear direction is aligned with at least one storage aisle.

In accordance with one or more aspects of the disclosed embodiment the method further includes providing a storage array having storage aisles wherein one or more of the first and second predetermined waypoints are located at an opening to at least one storage aisle.

In accordance with one or more aspects of the disclosed embodiment the method further includes providing a storage array having storage aisles and one or more of an interface station driveway and a buffer station, wherein the linear direction has a linear guideline and the traverse path crosses another linear direction of the navigation array defining another linear guideline located between the first predetermined waypoint and the second predetermined waypoint, and at least one of the linear direction and the other linear direction connects the storage aisles to the one or more of the interface station driveway and the buffer station.

In accordance with one or more aspects of the disclosed embodiment the method further includes providing a storage array having storage aisles and one or more of an interface station driveway and a buffer station, wherein the linear direction has a linear guideline and the traverse path crosses another linear direction of the navigation array defining another linear guideline located between the first predetermined waypoint and the second predetermined waypoint, and at least one of the linear direction and the other linear direction connects one of the one or more of the interface station drive and the buffer station to another of the one or more interface station and the buffer station.

In accordance with one or more aspects of the disclosed embodiment the method further includes providing a storage array having storage aisles and one or more of an interface station driveway and a buffer station, wherein the linear direction has a linear guideline and the traverse path crosses another linear direction of the navigation array defining another linear guideline located between the first predetermined waypoint and the second predetermined waypoint, and at least one of the linear direction and the other linear direction crosses the one or more of the interface station driveway and the buffer station.

In accordance with one or more aspects of the disclosed embodiment the method further includes providing a storage array having storage aisles and one or more of an interface station driveway and a buffer station, wherein the linear direction has a linear guideline and the traverse path crosses another linear direction of the navigation array defining another linear guideline located between the first predetermined waypoint and the second predetermined waypoint, and at least one of the linear direction and the other linear direction is aligned with the one or more of the interface station driveway and the buffer station.

In accordance with one or more aspects of the disclosed embodiment the method further includes providing a storage array having storage aisles and one or more of an interface station driveway and a buffer station, wherein at least one of the first and second predetermined waypoint is disposed at an opening of at least one of the interface station driveway.

In accordance with one or more aspects of the disclosed embodiment the method further includes providing a storage array having storage aisles and one or more of an interface station driveway and a buffer station, wherein at least one of the first and second predetermined waypoint is disposed at a holding location of at least one of the buffer station.

In accordance with one or more aspects of the disclosed embodiment the method further includes providing a storage array having storage aisles wherein the linear direction connects the storage aisles and is disposed adjacent an opening of each connected aisle independent of one or more of a minimum automated guided bot turn radius and an automated guided bot wheelbase.

In accordance with one or more aspects of the disclosed embodiment the method further includes providing a storage array having storage aisles and an interface station driveway, wherein the first predetermined waypoint is proximate and aligned with an aisle opening and the second predetermined waypoint is proximate and aligned with an opening of the interface station driveway such that an offset between a linear direction associated with the first predetermined waypoint and another linear direction associated with the second predetermined waypoint is independent from an automated guided bot dimension.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. A storage array system comprising:
an open undeterministic transport surface;
a navigation array disposed in connection with the transport surface, at least a portion of the navigation array includes a distributed feature, defining a linear direction along the open undeterministic transport surface, and that has a first waypoint at a first position of the distributed feature, and the portion has a second waypoint displaced from the first waypoint along the distributed feature and offset with respect to the first waypoint in a direction angled to the linear direction; and
an automated guided bot, arranged to traverse the transport surface, with a non-holonomic steering system, the automated guided bot having a bot pose determination system employing sensor data detecting the distributed feature;
wherein the automated guided bot includes a controller configured to generate a substantially smooth curved bot traverse path on the transport surface connecting the first and second waypoints with a predetermined optimal trajectory of the automated guided bot along the traverse path determined based on a bot dynamic model.

2. The storage array system of claim 1, wherein the predetermined optimal trajectory is optimal with respect to time.

3. The storage array system of claim 1, wherein the predetermined optimal trajectory is unparameterized.

4. The storage array system of claim 1, wherein the traverse path has a first portion smoothly branching from the linear direction defined by the distributed feature and a second portion smoothly merging onto another linear direction associated with the second waypoint.

5. The storage array system of claim 4, wherein the linear direction and the other linear direction have a common orientation with respect to the transport surface.

6. The storage array system of claim 4, wherein the linear direction and the other linear direction have different orientations so that the other linear direction crosses the linear direction.

7. The storage array system of claim 1, wherein the first and second portions have different curvatures.

8. The storage array system of claim 1, wherein at least a portion of the traverse path is disposed so that as the automated guided bot travels on the traverse path, bot pose sensors of the bot pose determination system, determining bot pose when at the first waypoint, depart sensor range of the portion of the distributed feature of the navigation array capable of determining bot pose prior to acquisition of new sensor data from the bot pose sensors of another portion of the distributed feature of the navigation array capable of determining bot pose.

9. The storage array system of claim 8, wherein at least a portion of the traverse path is disposed so that as the automated guided bot travels on the traverse path, bot pose sensors, determining bot pose when at the first waypoint, depart sensor range of the portion of the distributed features defining the linear direction on which bot pose determination is dependent when at the first waypoint prior to acquisition of new sensor data from the bot pose sensors of the linearly distributed of the navigation array capable of determining bot pose.

10. The storage array system of claim 1, wherein the distributed feature is uncoded.

11. The storage array system of claim 1, wherein the second waypoint is positioned on another distributed feature defining another linear direction.

12. The storage array system of claim 1, wherein the bot pose determination system determines bot pose with bot wheel odometry.

13. The storage array system of claim 1, wherein the traverse path bypasses other waypoints along the linear direction located between the first and second waypoints.

14. The storage array system of claim 1, further comprising a storage array having storage aisles and an interface station driveway, wherein the first waypoint is proximate and aligned with an aisle opening and the second waypoint is proximate and aligned with an opening of the interface station driveway such that an offset between the linear direction associated with the first waypoint and another linear direction associated with the second waypoint is independent from an automated guided bot dimension.

15. A storage array system comprising:
an open undeterministic transport surface;
a navigation array disposed along the open undeterministic transport surface, at least a portion of the navigation array includes a distributed feature, defining a linear direction, and that has a first predetermined waypoint on the open undeterministic transport surface at a first position of the linear direction, and the portion of the navigation array has a second predetermined waypoint offset from the first waypoint in a direction angled to and crossing the linear direction; and
an automated guided bot, arranged to traverse the open undeterministic transport surface, with a non-holonomic steering system, and a controller that has a bot pose determination system configured for traversing along the linear direction dependent on bot sensor data sensing the distributed feature;
wherein the controller is configured to generate a substantially smooth curving bot traverse path on the open undeterministic transport surface connecting the first and second predetermined waypoints that branches, at a branch point location, from the linear direction and has a predetermined time optimal trajectory, and wherein the branch point location of the curved bot traverse path is freely selectable along the linear direction by the controller for effecting the time optimal trajectory from the first to the second predetermined waypoints.

16. The storage array system of claim 15, wherein the first predetermined waypoint is disposed along the linear direction and the second predetermined waypoint is disposed along a second linear direction crossing the linear direction.

17. The storage array system of claim 15, wherein the traverse path branches, at a second branch point location, onto a second linear direction on which the second predetermined waypoint is located, and wherein the second branch point is freely selectable along the second linear direction by the controller for effecting the optimal trajectory from the first and second predetermined waypoints.

18. The storage array system of claim 15, wherein at least a portion of the traverse path is disposed so that as the automated guided bot travels on the traverse path, bot pose sensors of the bot pose determination system, determining bot pose when at the first predetermined waypoint, depart sensor range of the linear direction of the navigation array capable of determining bot pose prior to acquisition of new sensor data from the bot pose sensors of another linear direction of the navigation array capable of determining bot pose.

19. The storage array system of claim 15, wherein the predetermined optimal trajectory of the traverse path is determined based on a dynamic model of the automated guided bot.

20. The storage array system of claim 15, wherein the predetermined optimal trajectory of the traverse path is dynamically selected by the controller.

21. The storage array system of claim 15, wherein the predetermined time optimal trajectory is unparameterized.

22. A storage array system comprising:
an open undeterministic transport surface;
a navigation array disposed along the transport surface, at least a portion of the navigation array includes a distributed feature, defining a linear direction, and that has a first predetermined waypoint on the transport surface at a first position of the linear direction, and the portion has a second predetermined waypoint offset from the first predetermined waypoint in a direction angled to and crossing the linear direction; and
an automated guided bot, arranged to traverse the transport surface, with a non-holonomic steering system, the automated guided bot having integral therewith a controller and a bot pose determination system employing sensor data detecting the linear direction;
wherein the controller being configured to generate a substantially smooth bot traverse path, at least a portion of which is curved, on the transport surface connecting the first and second predetermined waypoints that branches, at a branch point location, from the linear direction and has an optimal trajectory, and wherein the branch point location of the curved portion of the smooth bot traverse path is freely selectable along the linear direction by the controller for effecting the optimal trajectory from the first predetermined waypoint to the second predetermined waypoint, and
the controller is programmed with at least one set of predetermined trajectories that define the optimal trajectory connecting the first and second predetermined waypoints on the smooth bot traverse path.

23. The storage array system of claim 22, wherein the at least one set of predetermined trajectories comprises more than one predetermined optimal trajectory that are combined dynamically by the controller to define the optimal trajectory connecting the first and second predetermined waypoints on the smooth bot traverse path.

24. The storage array system of claim 22, wherein at least one of the predetermined trajectories of the at least one set of predetermined trajectories defines an optimal unparameterized trajectory on a smooth curved bot path portion of the smooth bot traverse path.

25. The storage array system of claim 24, wherein the at least one predetermined trajectory defines a smooth curved bot path portion that smoothly branches the bot traverse path from the linear direction.

26. The storage array system of claim 22, wherein the controller is configured to dynamically select at least one predetermined trajectory defining a smooth curved path with an optimal trajectory, from a number of other different predetermined trajectories programmed in the controller, and dynamically generate with the dynamically selected at least one predetermined trajectory at least one selected set of one or more dynamically selected predetermined trajectories that defines the curved portion of the smooth bot traverse path with the optimal trajectory connecting first and second predetermined waypoints on the smooth bot traverse path.

27. The storage array system of claim 26, wherein the other different predetermined trajectories each define a different smooth curved path with optimal trajectory of the automated guided bot.

28. The storage array system of claim 22, wherein the controller is configured to dynamically generate the optimal trajectory by selecting at least one predetermined trajectory from a number of other predetermined trajectories programmed in the controller.

29. The storage array system of claim 22, wherein the at least one set of predetermined trajectories comprises more than one predetermined unparameterized trajectory, at least one of which is an optimal trajectory that defines a simple or a compound curve bot path.

30. The storage array system of claim 22, wherein the at least one set of predetermined trajectories comprises more than one predetermined unparameterized trajectory, at least one of which is an optimal trajectory defining a curved bot path and at least another is a trajectory that defines a linear bot path.

* * * * *